United States Patent [19]

Mitsutani et al.

[11] Patent Number: 5,724,809
[45] Date of Patent: Mar. 10, 1998

[54] DEVICE FOR DETERMINING DETERIORATION OF A CATALYTIC CONVERTER FOR AN ENGINE

[75] Inventors: Noritake Mitsutani; Shin Adachi, both of Toyota, Japan

[73] Assignee: Toyota Jidosha Kabushiki Kaisha, Toyota, Japan

[21] Appl. No.: 659,628

[22] Filed: Jun. 6, 1996

[30] Foreign Application Priority Data

| Jun. 12, 1995 | [JP] | Japan | 7-144690 |
| Jul. 27, 1995 | [JP] | Japan | 7-191527 |
| Mar. 13, 1996 | [JP] | Japan | 8-055891 |

[51] Int. Cl.$^6$ .................................................. F01N 3/18
[52] U.S. Cl. ................................................ 60/276; 60/277
[58] Field of Search ........................... 60/276, 277, 285, 60/299

[56] References Cited

U.S. PATENT DOCUMENTS

| 5,134,847 | 8/1992 | Ogawa et al. | 60/277 |
| 5,279,116 | 1/1994 | Shimizu et al. | 60/277 |
| 5,282,383 | 2/1994 | Kayanuma | 73/118.1 |
| 5,301,501 | 4/1994 | Shimizu et al. | 60/274 |
| 5,303,548 | 4/1994 | Shimizu et al. | 60/277 |
| 5,337,555 | 8/1994 | Tokuda et al. | 60/276 |
| 5,351,484 | 10/1994 | Wade | 60/274 |
| 5,359,853 | 11/1994 | Shimizu | 60/276 |
| 5,381,657 | 1/1995 | Takizawa et al. | 60/276 |
| 5,386,693 | 2/1995 | Orzel | 60/274 |
| 5,412,941 | 5/1995 | Suzuki et al. | 60/276 |
| 5,414,996 | 5/1995 | Sawada et al. | 60/277 |
| 5,526,643 | 6/1996 | Mukaihira et al. | 60/277 |
| 5,595,061 | 1/1997 | Toyoda | 60/277 |
| 5,602,737 | 2/1997 | Sindano et al. | 60/277 |
| 5,610,321 | 3/1997 | Shinmoto | 60/277 |

FOREIGN PATENT DOCUMENTS

| A-63-97852 | 4/1988 | Japan . |
| A-5-248227 | 6/1993 | Japan . |

*Primary Examiner*—Willis R. Wolfe
*Attorney, Agent, or Firm*—Oliff & Berridge, PLC

[57] ABSTRACT

The device according to the present invention determines whether the catalytic converter has deteriorated based on the outputs of an upstream air-fuel ratio sensor and a downstream air-fuel ratio sensor only when the flow rate of the intake air is within an allowable flow range. Further, the allowable range is determined in accordance with operating conditions of the engine, for example, the temperature of the catalytic converter. Since the $O_2$ storage capability of the catalytic converter changes in accordance with the temperature of the catalytic converter, different determination results may be obtained for the same catalytic converter if the determination is carried out at different temperature. In this invention, for example, the flow range is selected in accordance with the temperature of the catalytic converter in such a manner that a normal catalytic converter is always determined as being normal and a deteriorated catalytic converter is always determined as being deteriorated. Therefore, in the present invention, the deterioration of the catalytic converter is correctly determined regardless of a change in the operating conditions of the engine.

8 Claims, 33 Drawing Sheets

DEVICE FOR DETERMINING DETERIORATION OF A CATALYTIC CONVERTER FOR AN ENGINE

BACKGROUND OF THE INVENTION

1. Field of the Invention

The present invention relates to a device for determining deterioration of a catalytic converter for an engine. More specifically, the present invention relates to a device which controls the air-fuel ratio of the engine based on at least the output of an air-fuel ratio sensor disposed in an exhaust gas passage upstream of a catalytic converter and detects deterioration of the catalytic converter based on at least the output of an air-fuel ratio sensor disposed in the exhaust gas passage downstream of the catalytic converter.

2. Description of the Related Art

A method for determining deterioration of a catalytic converter based on the output signals of air-fuel ratio sensors disposed in an exhaust gas upstream and downstream of a catalytic converter of an engine is known in the art. In this method, usually, deterioration of the catalytic converter is determined based on at least the output signal of the downstream air-fuel ratio sensor when the air-fuel ratio of the exhaust gas flowing into the catalytic converter is feedback controlled to a stoichiometric mixture based on at least the output of the upstream air-fuel ratio sensor.

A three-way catalytic converter usually has an $O_2$ storage capability, i.e., a capability for absorbing oxygen in the exhaust gas when the air-fuel ratio of the exhaust gas flowing into the catalytic converter is lean compared to the stoichiometric air-fuel ratio and for releasing the absorbed oxygen when the air-fuel ratio of the exhaust gas flowing into the catalytic converter is rich compared to the stoichiometric air-fuel ratio. Due to this $O_2$ storage capability, if the catalytic converter has not deteriorated, the fluctuation of the air-fuel ratio of the exhaust gas upstream of the catalytic converter is smoothed by the catalytic converter and, thereby, the air-fuel ratio of the exhaust gas downstream of the catalytic converter fluctuates in a relatively small amplitude and in a relatively low frequency compared to those of the exhaust gas upstream of the catalytic converter.

However, the $O_2$ storage capability of the catalytic converter deteriorates as the deterioration of the catalytic converter proceeds, and the amount of oxygen absorbed or released by the catalytic converter becomes small when the catalytic converter has deteriorated. This causes the air-fuel ratio of the exhaust gas downstream of the catalytic converter to fluctuate in a manner similar to the fluctuation of the air-fuel ratio of the exhaust gas upstream of the catalytic converter. Namely, since the amount of oxygen absorbed by the catalytic converter becomes small when the $O_2$ storage capability deteriorates, the deteriorated catalytic converter releases all the oxygen it has absorbed in a short time when the air-fuel ratio of the exhaust gas fluctuates to a rich side compared to the stoichiometric air-fuel ratio, and after that, the catalytic converter does not release oxygen even if the air-fuel ratio of the exhaust gas stays on the rich side. In this case, therefore, the air-fuel ratio flowing out from the catalytic converter also becomes rich shortly after the air-fuel ratio of the exhaust gas flowing into the catalytic converter becomes rich. In contrast to this, when the air-fuel ratio of the exhaust gas flowing into the catalytic converter fluctuates to a lean side compared to the stoichiometric, the deteriorated catalytic converter absorbs oxygen to the maximum capacity in a short time, and after that, the catalytic converter does not absorb oxygen in the exhaust gas. Therefore, the air-fuel ratio flowing out from the catalytic converter also becomes lean shortly after the air-fuel ratio of the exhaust gas flowing into the catalytic converter becomes lean. Thus, when the catalytic converter has deteriorated, the manner of the fluctuation of the air-fuel ratio of the exhaust gas downstream of the catalytic converter becomes similar to that of the exhaust gas upstream of the catalytic converter, i.e., the amplitude and the frequency of the fluctuation of the air-fuel ratio of the exhaust gas downstream of the catalytic converter becomes larger.

Therefore, when the air-fuel ratio of the exhaust gas flowing into the catalytic converter fluctuates regularly in a relatively short cycle period, the deterioration of the catalytic converter can be determined by monitoring the output of the downstream air-fuel ratio.

However, when the deterioration of the catalytic converter is determined by the output of the downstream air-fuel ratio sensor, the result of the determination is affected by the flow rate of the exhaust gas. The amount of oxygen absorbed or released by the catalytic converter per unit time changes in accordance with the flow rate of the exhaust gas even if the $O_2$ storage capability is the same. For example, when the flow rate of the exhaust gas is large, the amount of oxygen released by the catalytic converter becomes large. Therefore, when the flow rate of the exhaust gas is very large, even a normal catalytic converter releases all the oxygen it has absorbed shortly after the period in which the air-fuel ratio of the exhaust gas flowing into the catalytic converter fluctuates to a rich side compared to the stoichiometric air-fuel ratio (i.e., "a rich period") starts, and the catalytic converter cannot release oxygen during the rest of the rich period. Similarly, the normal catalytic converter absorbs oxygen to its maximum capacity after the period in which the air-fuel ratio of the exhaust gas fluctuates to a lean side (i.e., "a lean period") starts, and the catalytic converter cannot absorbs oxygen during the rest of the lean period. Therefore, when the flow rate of the exhaust gas is very large, the fluctuation of the air-fuel ratio of the exhaust gas downstream of the catalytic converter becomes large even though the catalytic converter has not deteriorated.

On the contrary, when the flow rate of the exhaust gas is small, even a deteriorated catalytic converter does not release all the oxygen it has absorbed during the rich period of the exhaust gas fluctuation, and does not absorb oxygen to its maximum capacity during the lean period of the exhaust gas fluctuation. In this case, fluctuation of the air-fuel ratio of the exhaust gas downstream of the catalytic converter becomes small even though the catalytic converter has deteriorated.

Namely, if the deterioration of the catalytic converter is determined from the output of the downstream air-fuel ratio sensor, a normal catalytic converter may be incorrectly determined as being deteriorated when the exhaust gas flow rate is large, and a deteriorated catalytic converter may be incorrectly determined as being normal when the exhaust gas flow rate is small.

To solve these problems, Japanese Unexamined Patent Publication (Kokai) No. 63-97852 suggests to carry out the determination of the deterioration of the catalytic converter only when the amount of the intake air flow is within a predetermined range. In the '852 publication, the catalytic converter is determined as being deteriorated when the period of the fluctuation cycle of the output of the downstream air-fuel ratio sensor becomes shorter than a predetermined value, and the determination of the deterioration of the catalytic converter is carried out only when the flow rate of intake air (i.e., the flow rate of the exhaust gas) is within a predetermined range to eliminate the possibility of the error caused by a excessively large or a excessively small exhaust gas flow rate.

However, even if the determination is carried out in a predetermined exhaust gas flow range as suggested by the '852 publication, an error in the determination still may occur due to various factors. For example, the $O_2$ storage capability of the catalytic converter depends on not only the deterioration of the catalytic converter but also the temperature of the catalytic converter. When the temperature of the catalytic converter is high, the $O_2$ storage capability becomes large, and when the temperature is low, the $O_2$ storage capability becomes small. Therefore, when the temperature of the catalytic converter is high, a deteriorated catalytic converter may be incorrectly determined as being normal since the $O_2$ storage capability of the deteriorated catalytic converter may increase at a high temperature, to a sufficient level to cause the fluctuation of the air-fuel ratio of the downstream exhaust gas to be small. Similarly, when the temperature of the catalytic converter is low, a normal catalytic converter may be determined as being deteriorated due to a decrease in the $O_2$ storage capability.

Japanese Unexamined Patent Publication (Kokai) No. 5-248227 suggests changing the threshold value for determining the deterioration of the catalytic converter in accordance with the temperature of the catalytic converter. Namely, device in the '227 publication determines that the catalytic converter has deteriorated when the cycle period of the fluctuation of the output of the downstream air-fuel ratio sensor (or alternatively, the difference between the area surrounded by the output response curve of the upstream air-fuel ratio sensor and the area surrounded by the output response curve of the downstream air-fuel ratio sensor) becomes smaller than a predetermined threshold value, and this threshold value is determined in accordance with the temperature of the catalytic converter. However, in the device in the '227 publication, since the temperature of the catalytic converter varies due to changes in the operating conditions of the engine, if the temperature of the catalytic converter changes during the determining operation, an error is involved in the determination. Further, the measured cycle period of the fluctuation of the air-fuel ratio sensor, or the area surrounded by the output response curve thereof, disperse widely, and the degree of the dispersion of the measured value changes in accordance with the exhaust gas flow rate, as explained later. Therefore, if the determination of the deterioration is carried out in the exhaust gas flow range in which the dispersion of the measured value is large, an error in the determination may occur even if the threshold value is determined in accordance with the catalytic converter temperature.

Further, as explained later, it is found that various factors may affect the manner of the fluctuation of the output of the downstream air-fuel ratio sensor. For example, the fluctuation of the output of the downstream air-fuel ratio changes in accordance with the engine speed even if the exhaust gas flow rate is the same. Namely, the fluctuation of the downstream exhaust gas becomes large when the engine speed becomes low even if the intake air flow rate (i.e., exhaust gas flow rate) is the same. Therefore, even if the determination of the deterioration is carried out in the same flow range, the determination result may be different if the engine speed is not the same.

Also, the amount of oxygen absorbed or released by the catalytic converter per unit time changes in accordance with the air-fuel ratio of the exhaust gas during the rich period and the lean period in the fluctuation. Namely, the amount of oxygen released by the catalytic converter per unit time becomes large when the degree of richness of the exhaust gas during the rich period of the fluctuation becomes high (i.e., the air-fuel ratio of the exhaust gas during the rich period deviates mostly from the stoichiometric to the rich side), and the amount of oxygen absorbed by the catalytic converter per unit time becomes larger as the degree of leanness of the exhaust gas during the lean period becomes high (i.e., the air-fuel ratio of the exhaust gas during the lean period deviates mostly from the stoichiometric air-fuel ratio to the lean side). Therefore, if the degree of richness and the degree of leanness of the exhaust gas during the rich period and the lean period of the fluctuation are high, fluctuation of the output of the downstream air-fuel ratio sensor becomes large even if the catalytic converter has not deteriorated and, if the degree of richness and the degree of leanness of the exhaust gas during the rich period and the lean period of the fluctuation is low, the fluctuation of the output of the downstream air-fuel ratio sensor becomes small even if the catalytic converter has deteriorated. Therefore, even if the determination of the deterioration of the catalytic converter is carried out in the same flow range, the result of the determination may be different if the deviation of the air-fuel ratio of the exhaust gas from the stoichiometric air-fuel ratio is not the same.

SUMMARY OF THE INVENTION

The object of the present invention is to solve one or more of the problems set forth above, and to provide a device for determining deterioration of the catalytic converter precisely regardless of the operating conditions of the engine.

This object is achieved by a device for determining deterioration of a catalytic converter having an $O_2$ storage capability and disposed in an exhaust gas passage of an engine. The device comprises an upstream air-fuel ratio sensor disposed in an exhaust gas passage of an engine upstream of a catalytic converter for detecting an air-fuel ratio of an exhaust gas upstream of the catalytic converter, a downstream air-fuel ratio sensor disposed in the exhaust gas passage of the engine downstream of the catalytic converter for detecting the air-fuel ratio of the exhaust gas downstream of the catalytic converter, air-fuel ratio feedback control means for controlling the air-fuel ratio of the exhaust gas flowing into the catalytic converter based on at least an output signal of the upstream air-fuel ratio sensor in such a manner that the air-fuel ratio of the exhaust gas flowing into the catalytic converter becomes a predetermined target value, determining means for determines whether the catalytic converter has deteriorated based on at least an output of the downstream air-fuel ratio sensor when the air-fuel ratio of the exhaust gas is controlled by the air-fuel ratio feedback control means, air flow detecting means for detecting the flow rate of intake air drawn into the engine, prohibiting means for prohibiting the determining means from performing the determining operation of deterioration of the catalytic converter when the amount of the intake air flow of the engine is larger than or smaller than a predetermined allowable flow range and determining condition setting means for setting the allowable flow range in accordance with the operating conditions of the engine.

According to the present invention, the determination whether the catalytic converter has deteriorated is carried out only when the flow rate of intake air of the engine (i.e., the exhaust gas flow rate) is within the allowable range, and this allowable flow range, instead of the threshold value for determining the deterioration of the catalytic converter is changed in accordance with the operating conditions of the engine. The operating conditions of the engine include, for example, the temperature of the catalytic converter, the temperature of the engine, the engine speed and air-fuel ratio of the exhaust gas upstream of the catalytic converter, etc. Since the range of the flow rate of intake air in which the determination of the deterioration of the catalytic converter changes in accordance with the operating conditions of the engine, the flow range suitable for determination of the deterioration must be determined in accordance with the operating conditions of the engine in order to eliminate an error from the determination result. Therefore, in this embodiment, by selecting a suitable flow range of intake air in accordance with the operating conditions of the engine, the deterioration of the catalytic converter can be determined correctly.

BRIEF DESCRIPTION OF THE DRAWINGS

The present invention will be better understood from the description as set forth hereinafter, with reference to the accompanying drawings in which.

DESCRIPTION OF THE PREFERRED EMBODIMENT

Figure 1:
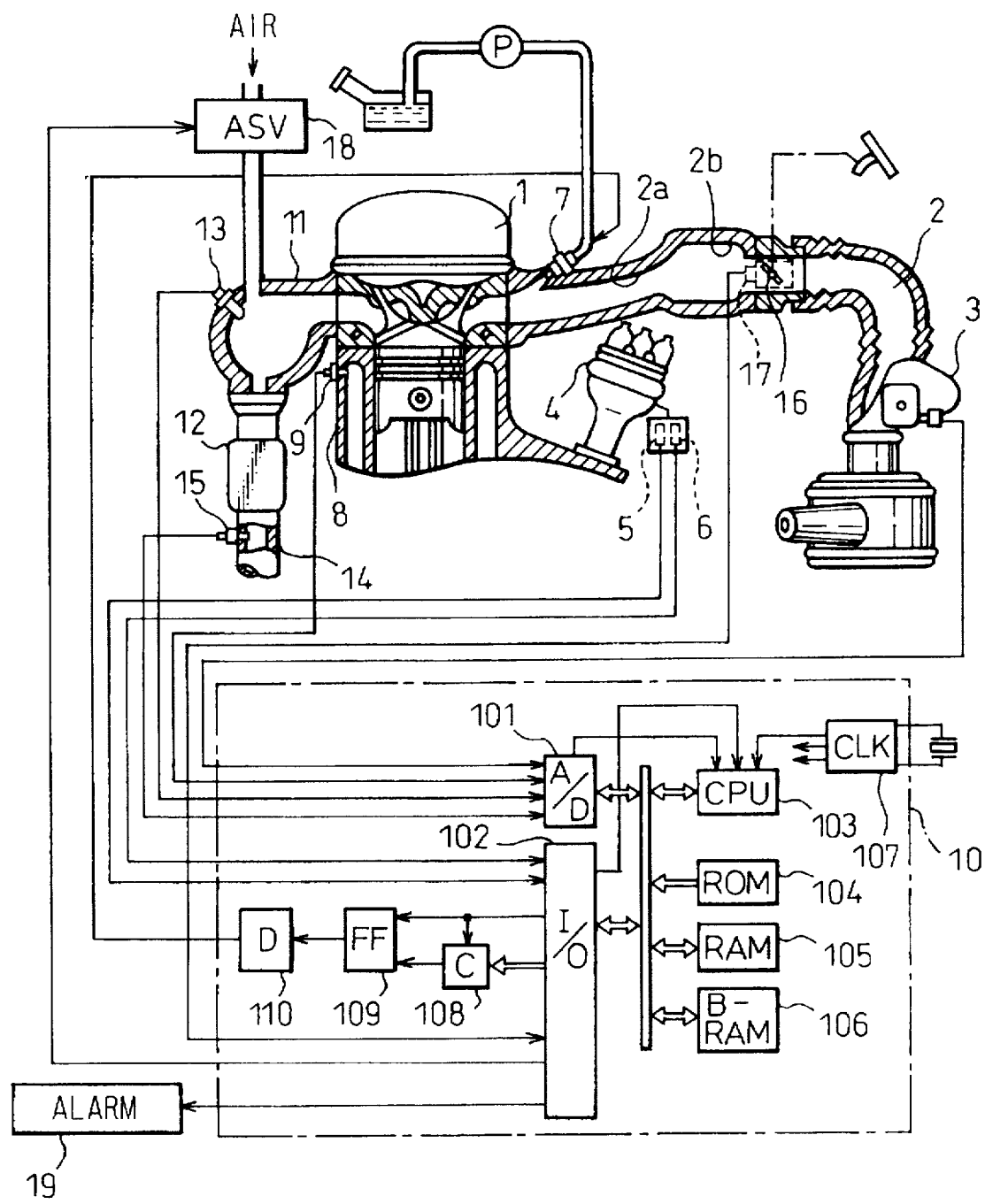
FIG. 1 schematically illustrates an embodiment of the present invention when applied to an automobile engine.

FIG. 1 schematically illustrates an embodiment of the device for determining the deterioration of the catalytic converter when the present invention is applied to an automobile engine.

In FIG. 1, reference numeral 1 represents an internal combustion engine for an automobile and, numeral 2 represents an intake air passage of the engine 1. The intake air passage 2 is connected to inlet ports of the respective cylinders of the engine 1 (in FIG. 1, only one cylinder of the engine 1 is shown) via a surge tank 2b and an intake manifold 2a. The air intake passage 2 is provided with, for example, a vane type airflow meter 3 having a potentiometer. The airflow meter 3 generates an analog voltage signal which is proportional to the flow rate of intake air drawn into the engine 1. The signal from the airflow meter 3 is transmitted to a multiplexer-incorporating analog-to-digital (A/D) converter 101 of a control circuit 10.

Crank angle sensors 5 and 6, for detecting the angle of the crankshaft (not shown) of the engine 1, are disposed at a distributor 4 of the engine 1.

In this embodiment, the crank angle sensor 5 generates a pulse signal at every 720° crank angle and the crank angle sensor 6 generates a pulse signal at every 30° crank angle. The pulse signals from the crank angle sensors 5 and 6 are supplied to an input/output (I/O) interface 102 of the control circuit 10. Further, the pulse signal of the crank angle sensor 6 is then supplied to an interruption terminal of a central processing unit (CPU) 103.

In the intake manifold 2a, a fuel injection valve 7 is provided at an inlet port of each cylinder of the engine 1, for supplying pressurized fuel from the fuel system to the cylinders of the engine 1. The amount of fuel injected from the fuel injection valve 7 is controlled by a control signal from the control circuit 10. The fuel injection control is explained later in detail.

A coolant temperature sensor 9 for detecting the temperature of the coolant is disposed in a water jacket of a cylinder block 8 of the engine 1. The coolant temperature sensor 9 generates an analog voltage signal in response to the temperature THW of the coolant, and transmits this signal to the A/D converter 101 of the control circuit 10.

In FIG. 1, numeral 11 designates an exhaust manifold connected to exhaust ports of the respective cylinders of the engine 1. The exhaust manifold 11 is connected to an exhaust passage 14. A three-way reducing and oxidizing catalytic converter 12 is disposed in the exhaust passage 14 downstream of the exhaust manifold 11. The catalytic converter 12 has an $O_2$ storage capacity and is capable of removing three pollutants in the exhaust gas, i.e., CO, HC and $NO_x$, at the same time when the air-fuel ratio of the exhaust gas flowing into the catalytic converter 12 is a stoichiometric air-fuel ratio.

Numeral 18 in FIG. 1 designates a secondary air supply valve (ASV). The secondary supply valve 18 is connected to an air source (not shown) such as an air pump, and introduces secondary air into the exhaust manifold 11 during the deceleration of the automobile and the idling operation of the engine 1 to reduce the emission of HC and CO in the exhaust gas.

An upstream air-fuel ratio sensor 13 is provided at the exhaust manifold 11, i.e., upstream of the catalytic converter 12. A downstream air-fuel ratio sensor 15 is disposed at an exhaust pipe 14 downstream of the catalytic converter 12. In this embodiment, $O_2$ sensors which generate output signals corresponding to the concentration of the oxygen component in the exhaust gas are used for the upstream air-fuel ratio sensor 13 and the downstream air-fuel ratio sensor 15. More specifically, the $O_2$ sensors 13 and 15 generate output voltage signals that change in accordance with whether the air-fuel ratio of the exhaust gas is rich or lean compared to the stoichiometric air-fuel ratio. In this specification, the term "air-fuel ratio of the exhaust gas" means the ratio of the amounts of air and fuel supplied to the engine and exhaust gas passage upstream of a considered point. Therefore, if secondary air or fuel are not supplied to the exhaust gas passage, the air-fuel ratio of the exhaust gas agrees with an operating air-fuel ratio of the engine (i.e., air-fuel ratio of the air-fuel mixture supplied to the engine). The signals output by the $O_2$ sensors 13 and 15 are transmitted to the A/D converter 101 of the control circuit 10.

The control circuit 10, which may consist of a microcomputer, further comprises a central processing unit (CPU) 103, a read-only-memory (ROM) 104 for storing a main routine and interrupt routines such as a fuel injection routine and an ignition timing routine, and constants, etc., a random-access-memory (RAM) 105 for storing temporary data, a backup RAM 106, and a clock generator 107 for generating various clock signals. The backup RAM 106 is directly connected to a battery (not shown), and therefore, the contents of the backup RAM 106 are preserved even when the main switch of the engine (not shown) is turned off.

A throttle valve 16, operated by the automobile driver, is provided in the intake air passage 2, together with an idle switch 17 for detecting the opening of the throttle valve and generating a signal ("LL signal") when the throttle valve 16 is fully closed. This LL signal is supplied to the I/O interface 102 of the control circuit 10.

Reference 19 designates an alarm that is activated when the catalytic converter 12 is determined as being deteriorated.

A down counter 108, a flip-flop 109, and a drive circuit 110 are provided in the control circuit 10 for controlling the fuel injection valve 7.

When a fuel injection amount TAU is calculated in a fuel injection amount calculation routine explained later, the amount TAU is preset in the down counter 108, and simultaneously, the flip-flop 109 is set, and as a result, the drive circuit 110 initiates the activation of the fuel injection valve 7. The down counter 108 counts up the clock signal from the clock generator 107, and finally, a logic 1 signal is generated from the terminal of the down counter 108, to reset the flip-flop 109, so that the drive circuit 110 stops the activation of the fuel injection valve 7, whereby an amount of fuel corresponding to the fuel injection amount TAU is supplied to the cylinders.

Interruptions occur at the CPU 103 when the A/D converter 101 completes an A/D conversion and generates an interrupt signal; when the crank angle sensor 6 generates a pulse signal; and when the clock generator 107 generates a special clock signal.

The intake air flow rate data Q from the airflow meter 3 and the coolant temperature data THW from the coolant sensor 9 are fetched by an A/D conversion routine(s) executed at predetermined intervals, and then stored in the RAM 105; i.e., the data Q and THW in the RAM 105 are updated at predetermined intervals. The engine speed Ne is calculated by an interruption routine executed at every 30° crank angle, i.e., at every pulse signal of the crank angle sensor 6, and is stored in the RAM 105.

The I/O interface 102 of the control circuit is connected to the secondary air supply valve 18 and the alarm 19 via respective drive circuits (not shown) to control the activation of the valve 18 and the alarm 19.

In this embodiment, the control circuit 10 controls the air-fuel ratio of the engine 1 based on the output signals of the $O_2$ sensors 13 and 15 in such a manner that the air-fuel ratio of the exhaust gas flowing into the catalytic converter 12 fluctuates regularly between a rich side and a lean side compared to the stoichiometric air-fuel ratio. Further, as explained later, the control circuit 10 detects the temperature of the catalytic converter 12 indirectly from the operating conditions of the engine 1, and determines an allowable flow range of intake air. When the air-fuel ratio of the engine 1 is feedback controlled based on the outputs of the $O_2$ sensors 13 and 15, and the flow rate of intake air is within the allowable flow range determined from the temperature of the catalytic converter 12, the control circuit 10 performs the determining operation of the catalytic converter 12 based on the ratio of the length LVOS of the output response curve of the downstream $O_2$ sensor 15 to the length LVOM of the output response curve of the upstream $O_2$ sensor 13, i.e., the value LVOS/LVOM.

Figure 2A:
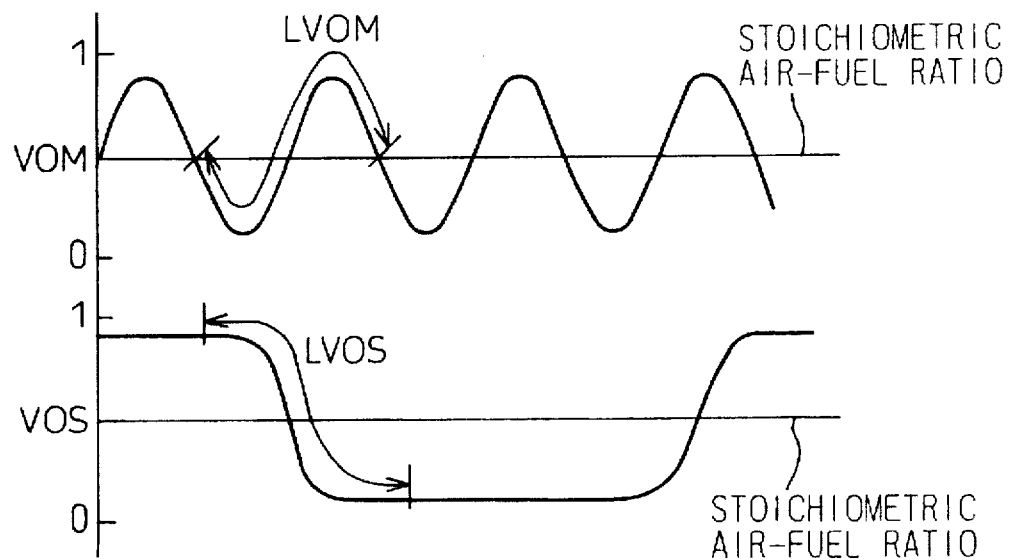
FIGS. 2A and 2B illustrate the principal used for determining the deterioration of the catalytic converter based on the length of the response curve of the output of a downstream air-fuel ratio sensor.
Figure 2B:
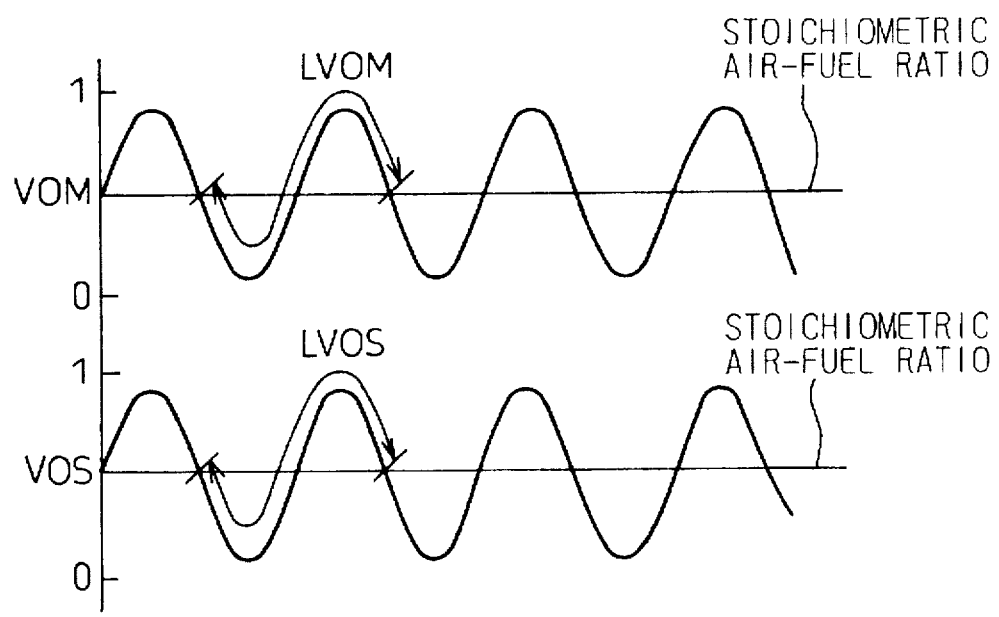

FIGS. 2A and 2B show the changes of the lengths LVOS (downstream $O_2$ sensor 15) and LVOM (upstream $O_2$ sensor 13) due to the deterioration of the catalytic converter 12. FIG. 2A illustrates the lengths LVOS and LVOM when the catalytic converter 12 has not deteriorated. As explained before, when the catalytic converter 12 has not deteriorated, since the O₂ storage capability of the catalytic converter 12 is large, the output VOS of the downstream O₂ sensor fluctuates over a long period due to the second air-fuel ratio control, as explained later even if the output VOM of the upstream O₂ sensor fluctuates between a rich air-fuel ratio side and a lean air-fuel ratio side in a relatively short cycle period. In this case, the length LVOS of the downstream O₂ sensor 15 becomes much smaller compared to the length LVOM of the upstream O₂ sensor 13 due to the long cycle period of the fluctuation of the output VOS. Therefore, when the catalytic converter 12 has not deteriorated, the ratio LVOS/LVOM becomes much smaller than 1.0.

On the contrary, when the catalytic converter 12 has deteriorated, the output LVOS of the downstream O₂ sensor 15 fluctuates in the similar manner to the output LVOM of the upstream O₂ sensor 13, as shown in FIG. 2B. Therefore, the length LVOS of the downstream O₂ sensor 15 approaches to the length LVOM of the upstream O₂ sensor 13, thereby the ratio LVOS/LVOM increases and approaches to 1.0 as the deterioration of the catalytic converter 12 proceeds.

In this embodiment, as explained later in detail, the control circuit 10 calculates the lengths LVOS and LVOM and determines that the catalytic converter 12 has deteriorated when the ratio LVOS/LVOM becomes larger than a predetermined threshold value.

To determine the deterioration of the catalytic converter 12 by the above-explained method, it is required that the operating air-fuel ratio of the engine is feedback controlled in such a manner that the air-fuel ratio of the exhaust gas flowing into the catalytic converter 12 fluctuates between a rich air-fuel ratio side and a lean air-fuel ratio side regularly, i.e., the air-fuel ratio feedback control of the engine 1 is a prerequisite for the determining operation of the catalytic converter. Therefore, the air-fuel ratio feedback control of the present embodiment is explained before explaining the actual determining operation of the catalytic converter.

Figure 3:
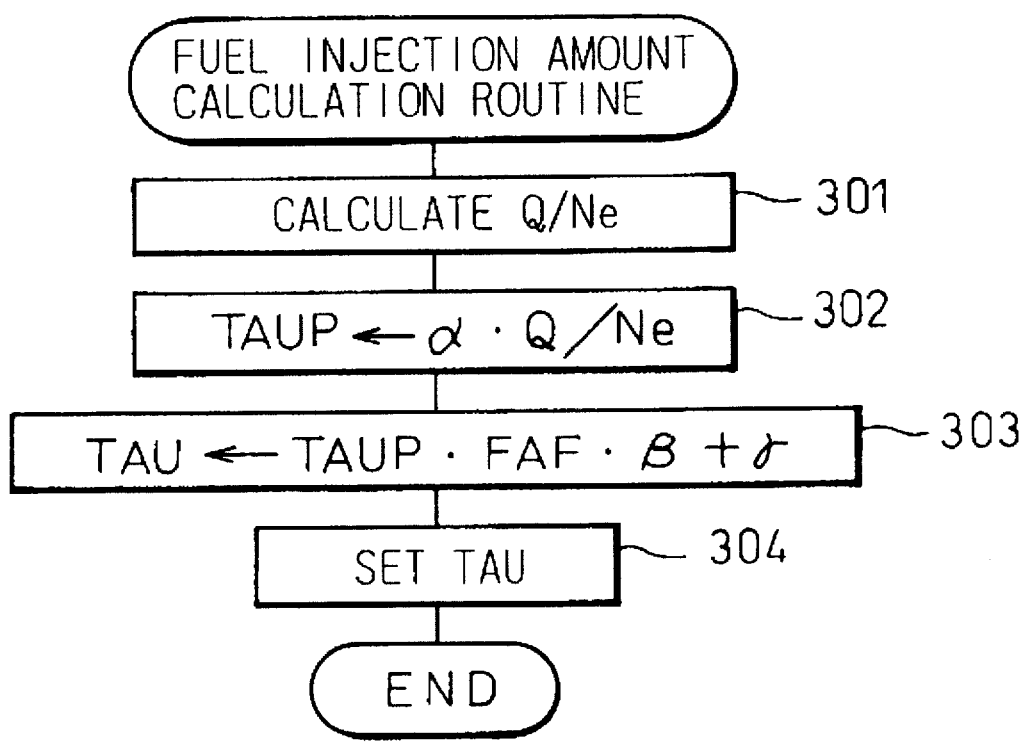
FIG. 3 is a flowchart illustrating an example of the calculation of the fuel injection amount of the engine.

FIG. 3 shows a flowchart of a fuel injection amount calculation routine of the present embodiment. The routine in FIG. 3 is processed by the control circuit 10 at predetermined crank rotation angles (for example, every 360° rotation of the crankshaft). In the routine in FIG. 3, the fuel injection amount TAU, i.e., the length of the period in which the fuel injection valve 7 injects fuel, is calculated in accordance with the amount of intake air per one revolution of the engine Q/Ne and an air-fuel ratio correction factor FAF which is explained later. Namely, in the routine in FIG. 3, the intake air flow rate data Q and the engine speed data Ne are read from the predetermined storage area of the RAM 105, and the value Q/Ne is calculated (step 301). Then a basic fuel injection amount TAUP is calculated in accordance with the value Q/Ne by TAUP=α×Q/Ne (at step 302). The basic fuel injection amount TAUP is a fuel injection amount required to make the air-fuel ratio of the air-fuel mixture supplied to the combustion chamber of the engine 1 stoichiometric, and α is a constant.

The actual fuel injection amount TAU is calculated from the basic fuel injection TAUP and the air-fuel ratio correction factor FAF by the following formula (step 303).

$$TAU = TAUP \times FAF \times \beta + \gamma$$

β and γ are constants determined in accordance with the operating conditions of the engine. When the fuel injection amount TAU is calculated by the above explained steps, the value TAU is preset at the down counter 108 at step 304 and, thereby, the amount of fuel corresponding to the value TAU is injected from the fuel injection valve 7.

Figure 4:
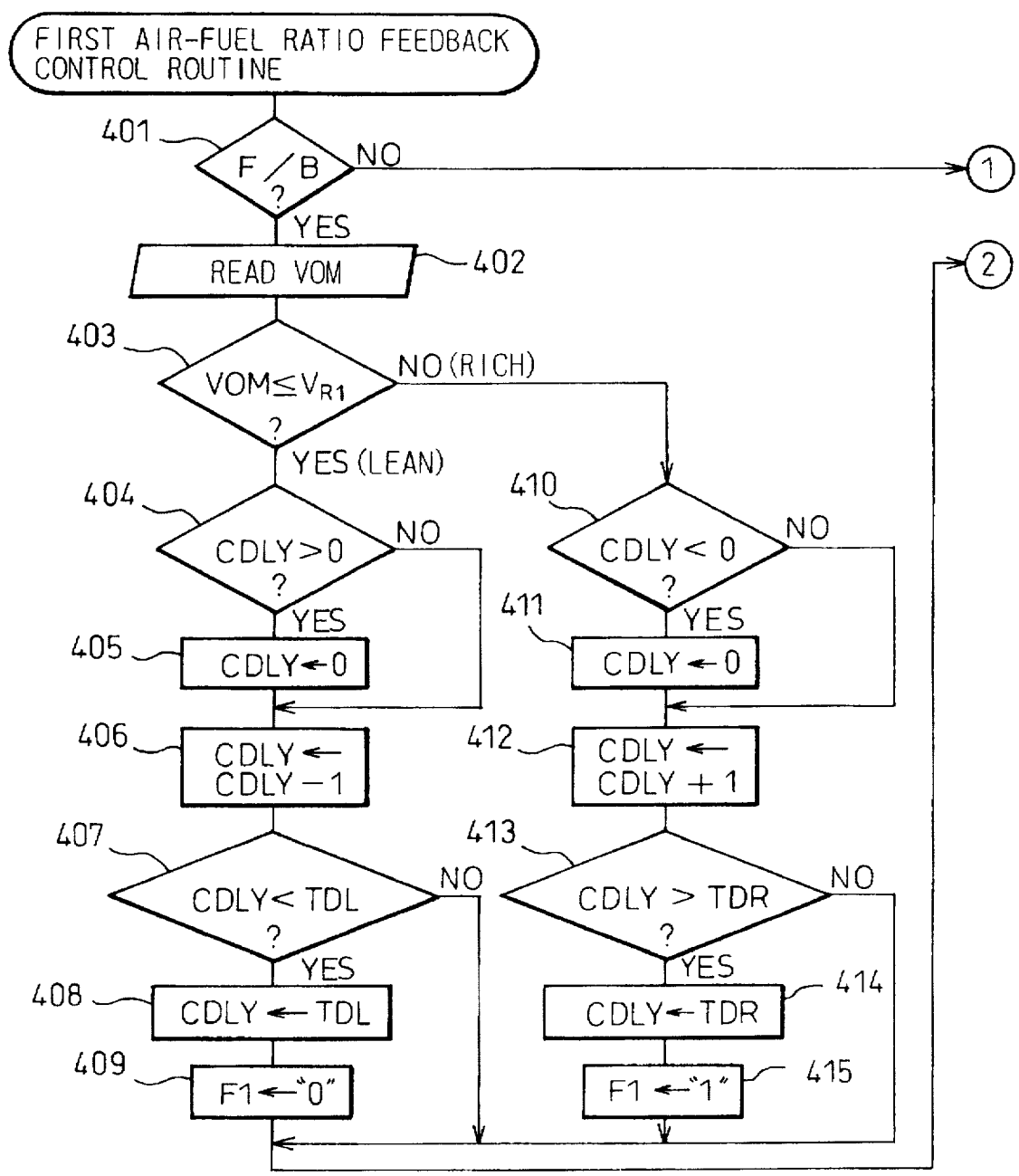
FIGS. 4 and 5 are a flowchart illustrating an example of the first air-fuel ratio feedback control based on the output of the upstream air-fuel ratio sensor.
Figure 5:
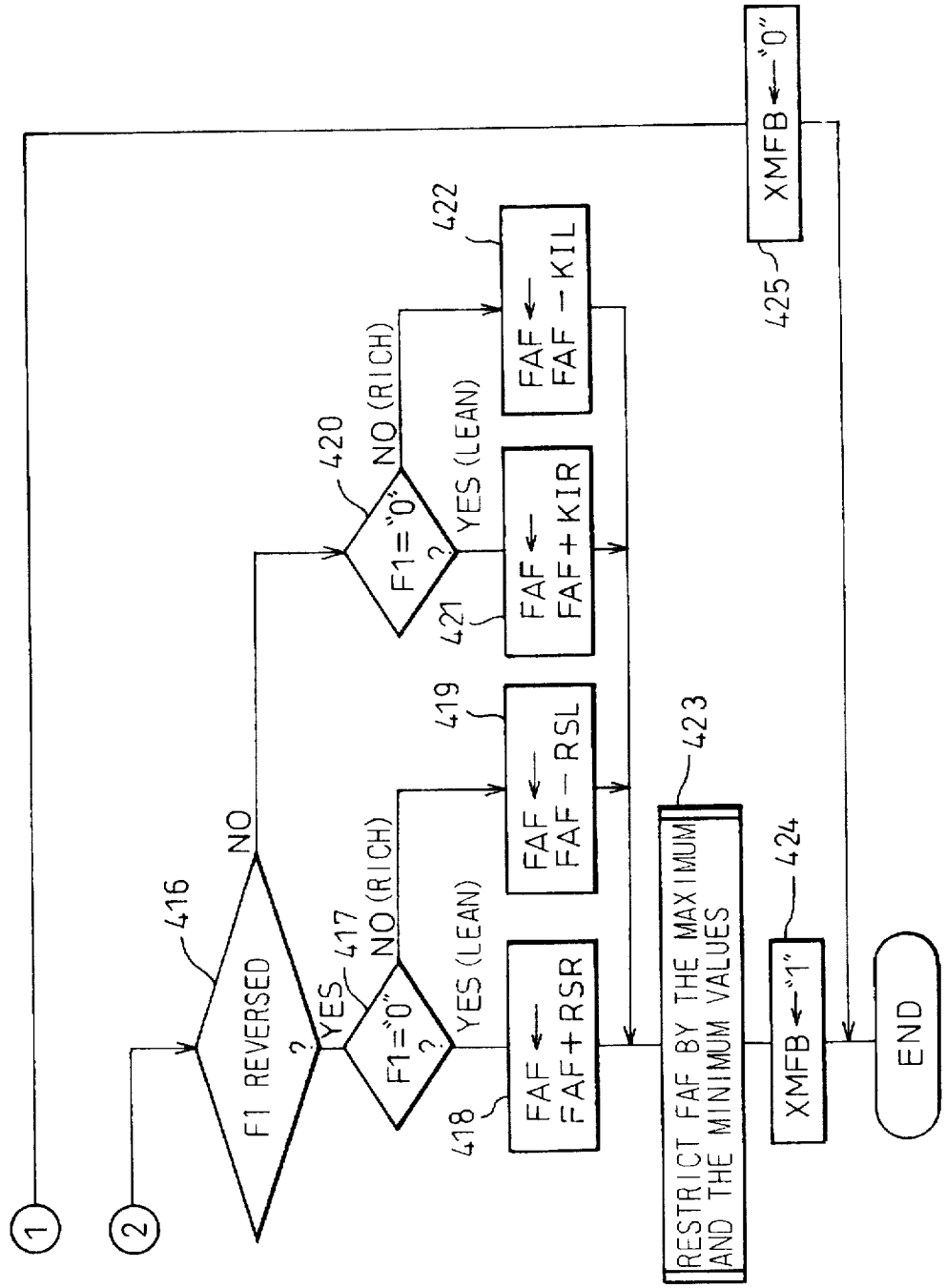

FIGS. 4 and 5 illustrate a first air-fuel ratio feedback control routine in which the value of the air-fuel ratio correction factor FAF is determined in accordance with the output signal of the upstream O₂ sensor 13. The routine in FIGS. 4 and 5 is processed by the control circuit 10 at a predetermined intervals (for example, every 4 ms).

In this routine, the value of the air-fuel ratio correction factor FAF is decreased when an output voltage signal VOM of the O₂ sensor 13 is higher than a reference voltage $V_{R1}$ (i.e., VOM>$V_{R1}$), and is increased when the output VOM is lower than or equal to the reference voltage $V_{R1}$ (i.e., VOM≤$V_{R1}$). The reference voltage $V_{R1}$ is an output voltage of the O₂ sensor 13 which corresponds to the stoichiometric air-fuel ratio. The O₂ sensor 13 outputs voltage signal of, for example, 0.9 V when the air-fuel ratio of the exhaust gas is on a rich side compared to the stoichiometric air-fuel ratio, and of 0.1 V, for example, when the air-fuel ratio of the exhaust gas is on a lean side compared to the stoichiometric air-fuel ratio. The reference voltage $V_{R1}$ of the O₂ sensor is set at 0.45 V, for example, in this embodiment. By adjusting the value of FAF in accordance with the air-fuel ratio of the exhaust gas, the air-fuel ratio of the engine is maintained near the stoichiometric air-fuel ratio even if the characteristics of the elements in the fuel supply system such as the airflow meter 3 and the fuel injection valve 7 deviate from the design characteristics by a certain amount.

The flowchart in FIGS. 4 and 5 is explained in brief. When the routine starts in FIG. 4, at step 401, it is determined whether the conditions for performing the air-fuel ratio feedback control are satisfied. The conditions determined at step 401 are, for example, whether the O₂ sensor 13 is activated, whether the engine 1 is warmed up and whether a predetermined time has elapsed since a fuel cut operation (in which the fuel injection is interrupted), such as in an engine brake operation, is terminated. If these conditions are satisfied at step 401, the routine executes steps 402 and other steps, to calculate the value of FAF. If any of the conditions are not satisfied, the routine terminates after setting the value of a flag XMFB at 0 at step 425 in FIG. 5. XMFB is a flag which represents whether the first air-fuel ratio control is being performed, and XMFB=0 means that the first air-fuel ratio control is interrupted.

Steps 402 through 415 in FIG. 4 are steps for determining the air-fuel ratio of the exhaust gas. F1 in steps 409 and 415 is a flag representing whether the air-fuel ratio of the exhaust gas is on a rich side (F1=1) or on a lean side (F1=0) compared to the stoichiometric air-fuel ratio. The value of F1 is switched (reversed) from 0 to 1 (a lean condition to a rich condition) when the O₂ sensor 13 continuously outputs a rich signal (i.e., VOM>$V_{R1}$) for more than a predetermined time period (TDR) (steps 403 and 404 through 409). Similarly, the value of F1 is switched (reversed) from 1 to 0 (a rich condition to a lean condition) when the O₂ sensor 13 continuously outputs a lean signal (VOM≤$V_{R1}$) for more than a predetermined time period (TDL) (steps 403 and 410 through 415). CDLY in the flowchart is a counter for determining the timing for reversing the value of the flag F1. In this embodiment, TDL in step 407 is a negative constant and TDR in step 413 is a positive constant.

At steps 416 through 424 in FIG. 5, the value of FAF is adjusted in accordance with the value of the flag F1 set by the steps explained above. At step 416, it is determined whether the air-fuel ratio of the exhaust gas is reversed (i.e., changed from a rich air-fuel ratio to a lean air fuel ratio, or vice versa) since the routine was last executed, by determining whether the value of F1 changed from 1 to 0 or 0 to 1). If the value of F1 changed from 1 to 0 (a rich condition to a lean condition) since the routine was last executed (steps 416 and 417), the value of FAF is increased step-wise by a relatively large amount RSR (step 418), and if the value of F1 changed from 0 to 1 (a lean condition to a rich condition) since the routine was last executed (steps 416 and 417), the value of FAF is decreased step-wise by a relatively large amount RSL (step 419). If the value of F1 did not change since the routine was last executed, and if the value of F1 is 0, the value of FAF is increased by a relatively small amount KIR every time the routine is executed, as long as the value of F1 is 0 (steps 416, 420 and 421). Similarly, if the value of F1 did not change, and if the value of F1 is 1, the value of FAF is decreased by a relatively small amount KIL every time the routine is executed (steps 416, 420 and 422). Namely, when the value of F1 did not reverse, the value of FAF is gradually increased or decreased in accordance with whether the air-fuel ratio of exhaust gas (F1) is rich or lean. Further, the value of FAF is restricted by the maximum value (for example, 1.2) and the minimum value (for example, 0.8) to keep the value of FAF within the range determined by the maximum and the minimum values (step 423). Then, the routine terminates this time, after setting the value of the flag XMFB at 1 at step 424.

Figure 6:
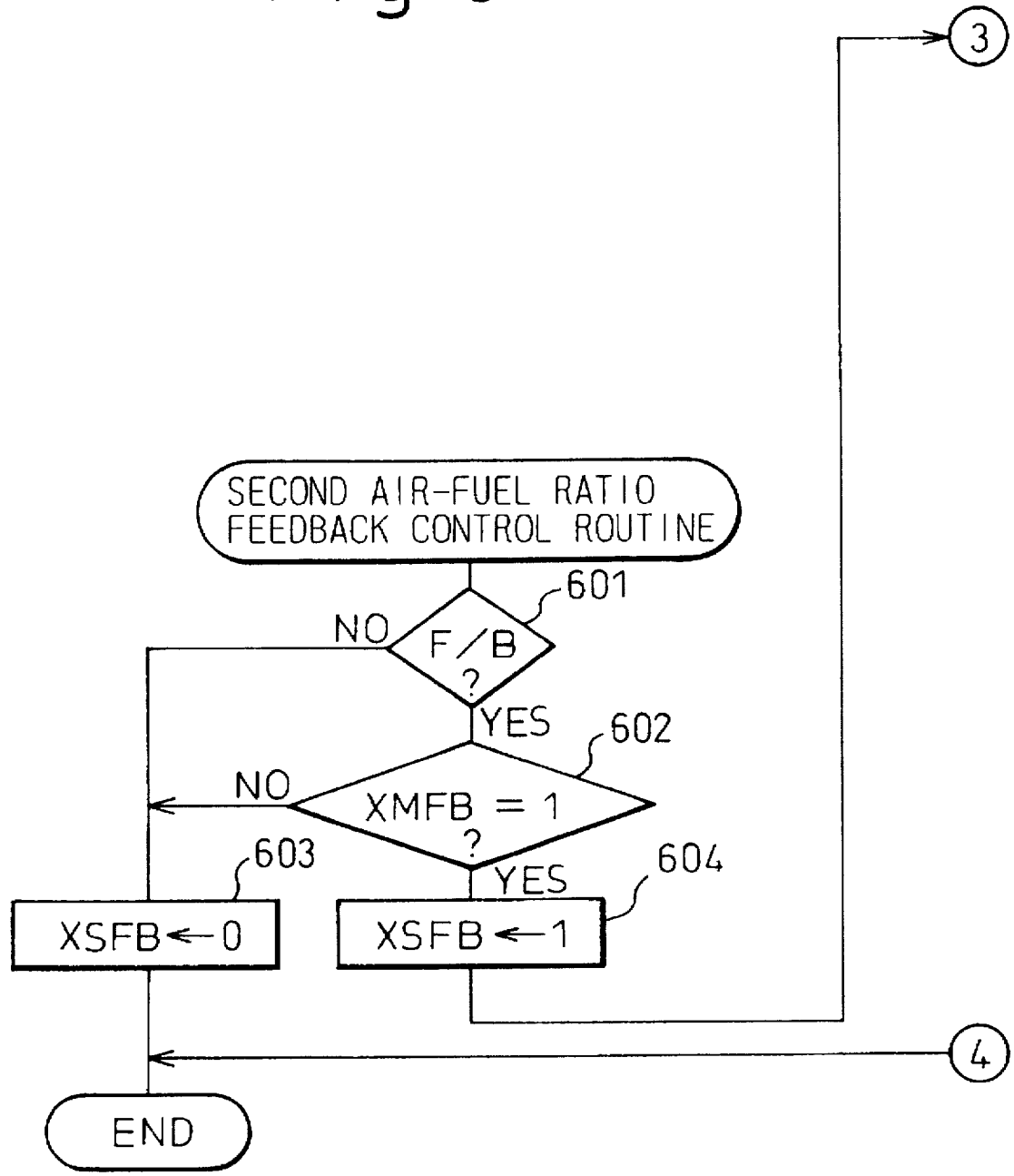
FIGS. 6 and 7 are a flowchart illustrating an example of the second air-fuel ratio feedback control based on the output of the downstream air-fuel ratio sensor.
Figure 7:
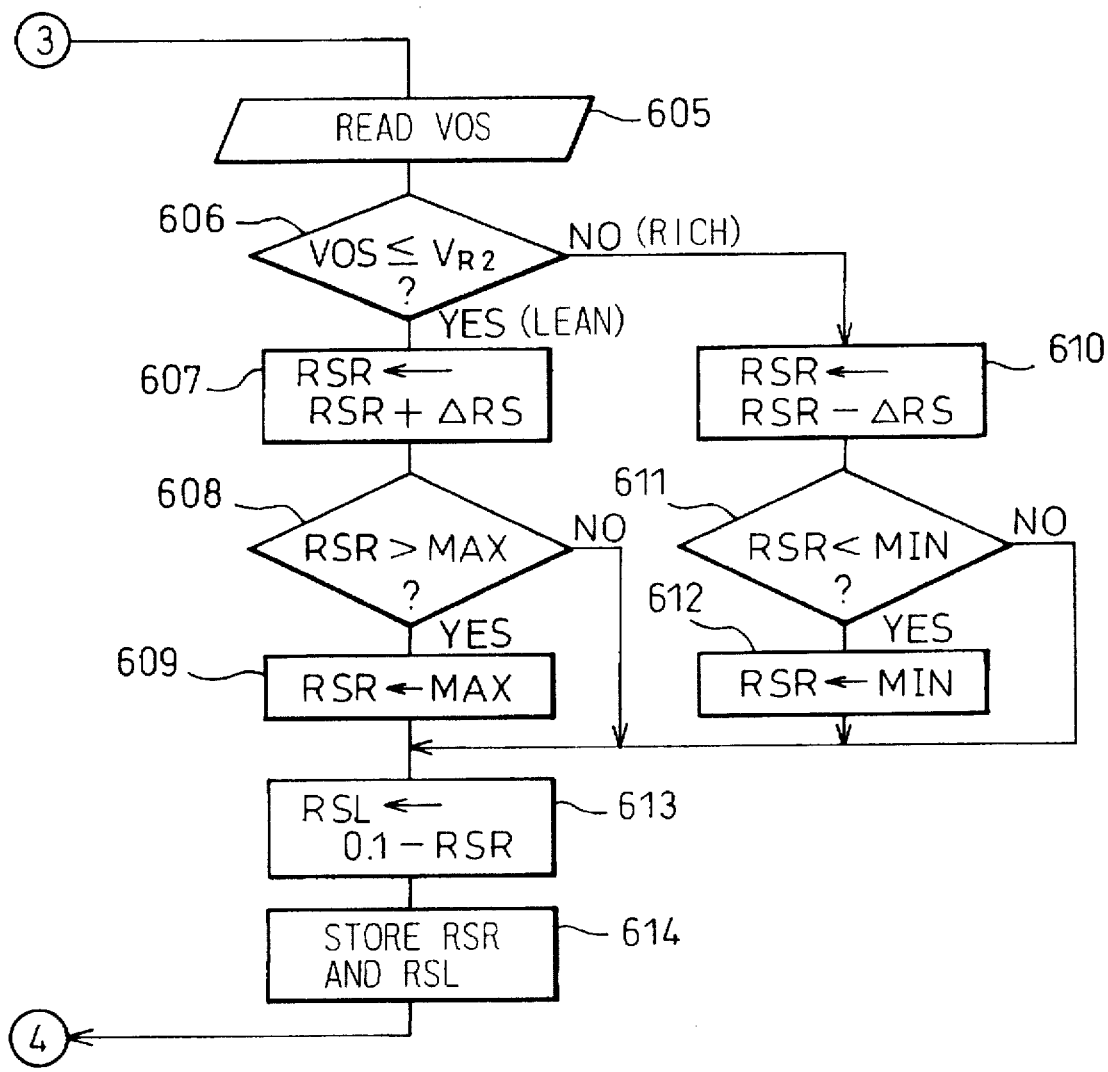

Next, a second air-fuel ratio control, in which the values of RSR and RSL are determined in accordance with the output VOS of the downstream $O_2$ sensor 15, is explained. FIGS. 6 and 7 are a flowchart illustrating the second air-fuel ratio control routine of the present embodiment. In this routine, values of second air-fuel ratio correction factors RSR and RSL are calculated in accordance with the output of the downstream $O_2$ sensor 15. This routine is normally processed at intervals longer than that of the first air-fuel ratio control routine control (for example, every 500 ms).

In this routine, the output voltage VOS of the downstream $O_2$ sensor 15 is compared with a reference voltage $V_{R2}$, and the amounts RSR and RSL used in the first air-fuel ratio control routine are changed in accordance with whether VOS is larger, or smaller, than $V_{R2}$. The reference voltage $V_{R2}$ is an output voltage of the downstream $O_2$ sensor 15 which corresponds to the stoichiometric air-fuel ratio. When VOS>$V_{R2}$, i.e., when the air-fuel ratio of the exhaust gas downstream of the catalytic converter is rich compared to the stoichiometric air-fuel ratio, the amount RSR is decreased, and at the same time, the amount RSL is increased. Similarly, when VOS≦$V_{R2}$, i.e., when the air-fuel ratio of the exhaust gas downstream of the catalytic converter is lean compared to the stoichiometric air-fuel ratio, the amount RSR is increased and the amount RSL is decreased simultaneously. When the amount RSR becomes larger, the value of FAF also becomes larger and, thereby, the fuel injection amount determined by the routine in FIG. 3 becomes larger. On the contrary, when the amount RSL becomes larger, the value of FAF becomes smaller, and the fuel injection amount becomes smaller. Therefore, even when the characteristics of the elements in the fuel system changes, the deviation from the design characteristics is corrected by the change in the values of RSR and RSL and, thereby the air-fuel ratio of the engine is maintained at the stoichiometric air-fuel ratio.

The flowchart of the second air-fuel ratio control routine FIGS. 6 and 7 is explained hereinafter in brief.

In FIG. 6, at steps 601 and 602, it is determined whether the conditions for performing the second air-fuel ratio control is satisfied. The conditions determined at step 601 are similar to the conditions determined at step 401 in FIG. 4. However, in this routine, it is determined at step 602, whether the first air-fuel ratio control routine is being carried out, based on the value of the flag XMFB. If all the conditions in step 601 are satisfied, and the first air-fuel ratio control routine is being carried out, a value of the flag XFSB is set at 1 at step 604, and the values of RSR and RSL are adjusted at steps 605 through 614 in FIG. 7. If any of conditions in step 601 are not satisfied, or if the first air-fuel ratio control routine is interrupted, the value of the flag XFSB is set at 0 at step 603, and the routine terminates immediately. XFSB is a flag representing whether the second air-fuel ratio control is being carried out, and XFSB=1 means that the second air-fuel ratio control is being carried out, and XFSB=0 means that the second air-fuel ratio control is interrupted.

At steps 605 through 614, the value of RSR is increased or decreased in accordance with whether the air-fuel ratio of the exhaust gas detected by the downstream $O_2$ sensor 15 is rich or lean. Namely, at step 605, the output VOS of the downstream $O_2$ sensor 15 is read through the A/D converter. At step 606, VOS is compared with the reference voltage $V_{R2}$, to determine whether the air-fuel ratio of the exhaust gas downstream of the catalytic converter is rich or lean. If VOS≦$V_{R2}$ (lean), the value of RSR is increased by an amount ΔRS at step 607, and after that, the value of RSR is restricted by the maximum value MAX at steps 608 and 609. Similarly, the value of RSR is decreased by the amount ΔRS if VOS>$V_{R2}$ (rich) at step 610, and after that, the value of RSR is restricted by the minimum value MIN at steps 611 and 612 (for example, MIN=0.01 in this embodiment). The value of RSL is, then, calculated at step 613 by RSR=0.1−RSL. Namely, the sum of the values of RSR and RSL is always maintained at a constant value 0.1. Therefore, in the second air-fuel ratio control, when the downstream $O_2$ sensor outputs a rich air-fuel ratio signal (i.e., VOS>$V_{R2}$), RSR is decreased and RSL is increased simultaneously, and when the downstream $O_2$ sensor outputs a lean air-fuel ratio signal (i.e., VOS≦$V_{R2}$), RSR is increased and RSL is decreased simultaneously.

After calculating the values of RSR and RSL, the values of RSR and RSL are stored in the RAM 105 at step 614, and the routine terminates this time.

Figure 8:
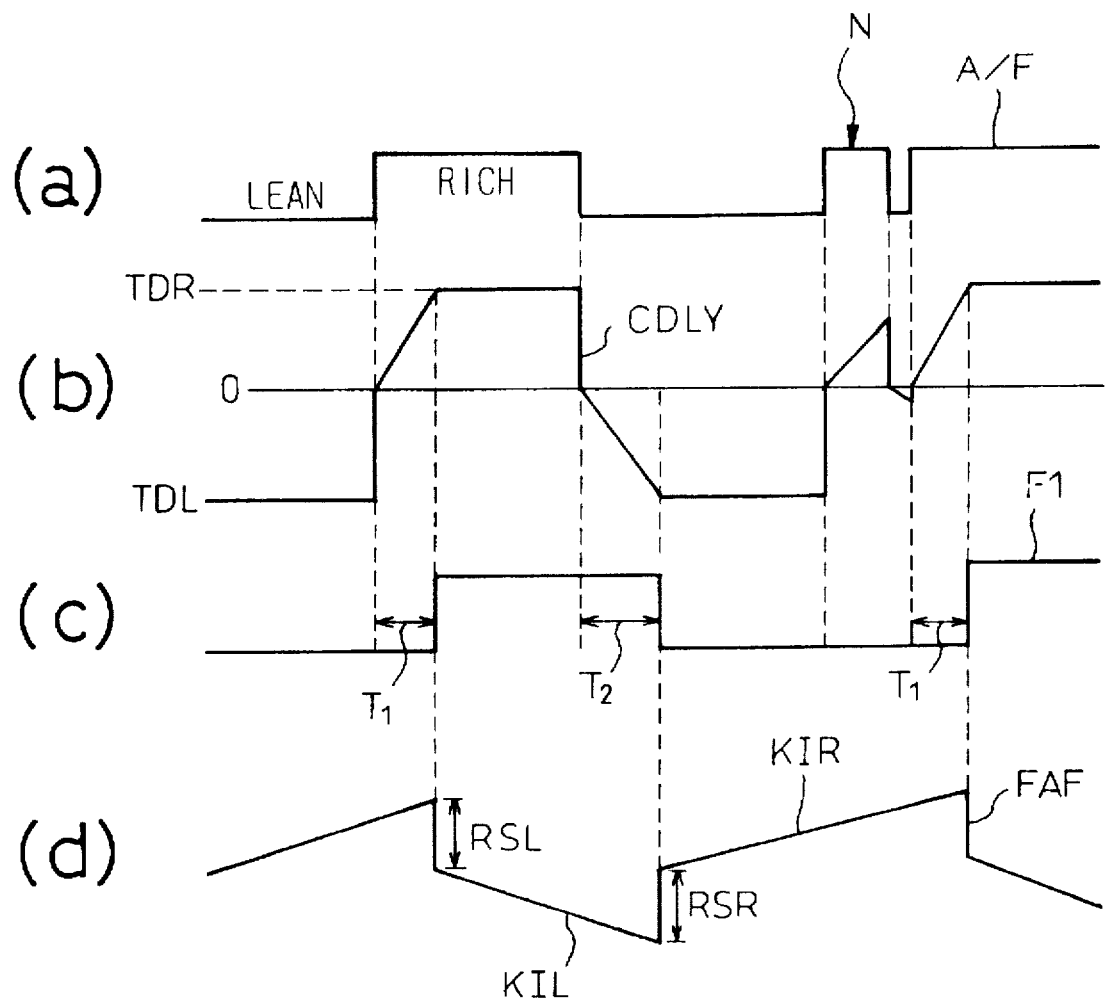
FIG. 8 is a timing diagram explaining the air-fuel ratio control in FIGS. 4 through 7.

FIG. 8 shows changes in the values of the counter CDLY (the curve (b) in FIG. 8), the flag F1 (the curve (c) in FIG. 8) and FAF (the curve (d) in FIG. 8) in accordance with the change in the air-fuel ratio (A/F) detected by the upstream $O_2$ sensor 13 (the curve (a) in FIG. 8) when the air-fuel ratio is controlled by the routines in FIGS. 4, 5 and 6, 7. As shown by the curve (c) in FIG. 8, the value of the flag F1 does not immediately change from 0 to 1 even when the air-fuel ratio A/F detected by the upstream $O_2$ sensor 13 changes from a lean air-fuel ratio to a rich air-fuel ratio. The value of F1 changed from 0 to 1 only when the value of the counter CDLY increases from 0 to TDR (TDR>0), i.e., the value of F1 changes from 0 to 1 when a period corresponding to the value of TDR (shown by $T_1$ in FIG. 8) has elapsed after A/F changed from a lean air-fuel ratio to a rich air-fuel ratio. Similarly, the value of F1 changes from 1 to 0 when a period (shown by $T_2$ in FIG. 8) corresponding to the value of TDL (TDL<0) has elapsed after A/F changed from a rich air-fuel ratio to a lean air-fuel ratio. Consequently, the value of F1 does not change even if A/F changes for a short time (shown by N in FIG. 8) due to, for example, noise in the output signal of the upstream $O_2$ sensor and, thereby, the stability of the air-fuel ratio control in FIGS. 4 through 7 are increased.

As a result of the first and the second air-fuel ratio feedback control, the air-fuel ratio correction factor FAF fluctuates regularly around a center value 1.0, and the operating air-fuel ratio of the engine alternates between a rich air-fuel ratio and a lean air-fuel ratio regularly. Further, as seen from the curve (d) in FIG. 8, if the value of RSR is increased and the value of RSL is decreased simultaneously by the second air-fuel ratio control in FIGS. 5 and 6, the value of FAF fluctuates largely to a rich air-fuel ratio side than to a lean air-fuel ratio side and, thereby, the air-fuel ratio of the engine, as a whole, shifts to a rich air-fuel ratio side. Similarly, when the value of RSR is decreased (the value of RSL is increased) by the second air-fuel ratio control, the air-fuel ratio of the engine, as a whole, shifts to a lean air-fuel ratio side. Therefore, when the values of RSR and RSL are changed by the second air-fuel ratio control, the air-fuel ratio of the exhaust gas flowing into the catalytic converter shifts to a rich air-fuel ratio side or lean air-fuel ratio side. Though the factors RSR and RSL are changed by the second air-fuel ratio control in FIGS. 6 and 7 in this embodiment, other factors (such as KIR and KIL, TDR and TDL, or the reference voltage $V_{R1}$) may be changed in accordance with the output VOS in order to control the air-fuel ratio of the engine.

Next, the detecting operation of the catalytic converter 12 and the allowable flow range of intake air in which the detecting operation is permitted is explained.

In this embodiment, deterioration of the catalytic converter is determined based on the ratio LVOS/LVOM of the $O_2$ sensors 13 and 15 as explained by FIGS. 2A and 2B. However, it is found that the fluctuation of the output of the downstream $O_2$ sensor 15 is affected by various factors. The factors which largely affect the fluctuation of the output of the downstream $O_2$ sensor 15 are the temperature of the catalytic converter 12 and the flow rate of the exhaust gas (i.e., the flow rate of intake air). For example, since the $O_2$ storage capability of the catalytic converter becomes larger as the temperature of the catalytic converter becomes higher, the output VOS of the downstream $O_2$ sensor 15 fluctuates in a longer cycle period when the temperature of the catalytic converter 12 is high, and fluctuates in a shorter cycle period when the temperature of the catalytic converter 12 is low. Therefore, the ratio LVOS/LVOM becomes smaller when the temperature is high and becomes larger when the temperature is low even if the degree of deterioration of the catalytic converter 12 is the same.

On the other hand, since the catalytic converter releases oxygen in a shorter time when the exhaust gas flow rate is large, the output VOS of the downstream $O_2$ sensor 15 fluctuates in a shorter cycle period when the exhaust gas flow rate is high. Therefore, the ratio LVOS/LVOM becomes larger when the exhaust gas flow rate is large and becomes smaller when the exhaust gas flow rate is small even if the degree of deterioration of the catalytic converter 12 is the same.

Figure 9A:
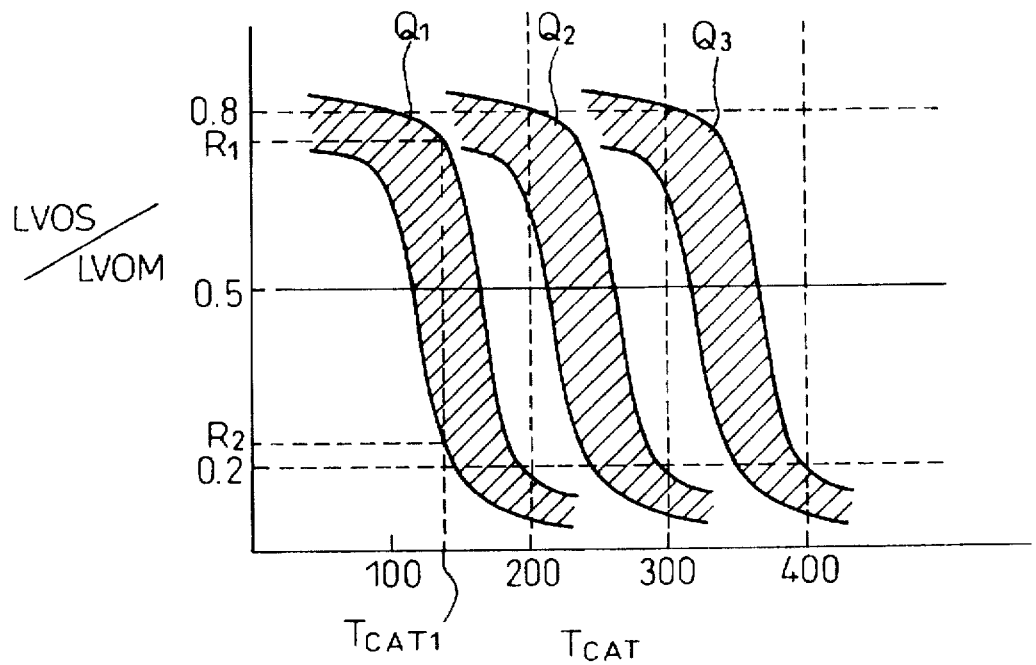
FIGS. 9A and 9B show the change in the ratio of the lengths of the output response curves of the upstream air-fuel ratio sensor and the downstream air-fuel ratio sensor caused by the changes in the intake air flow rate and the temperature of the catalytic converter.
Figure 9B:
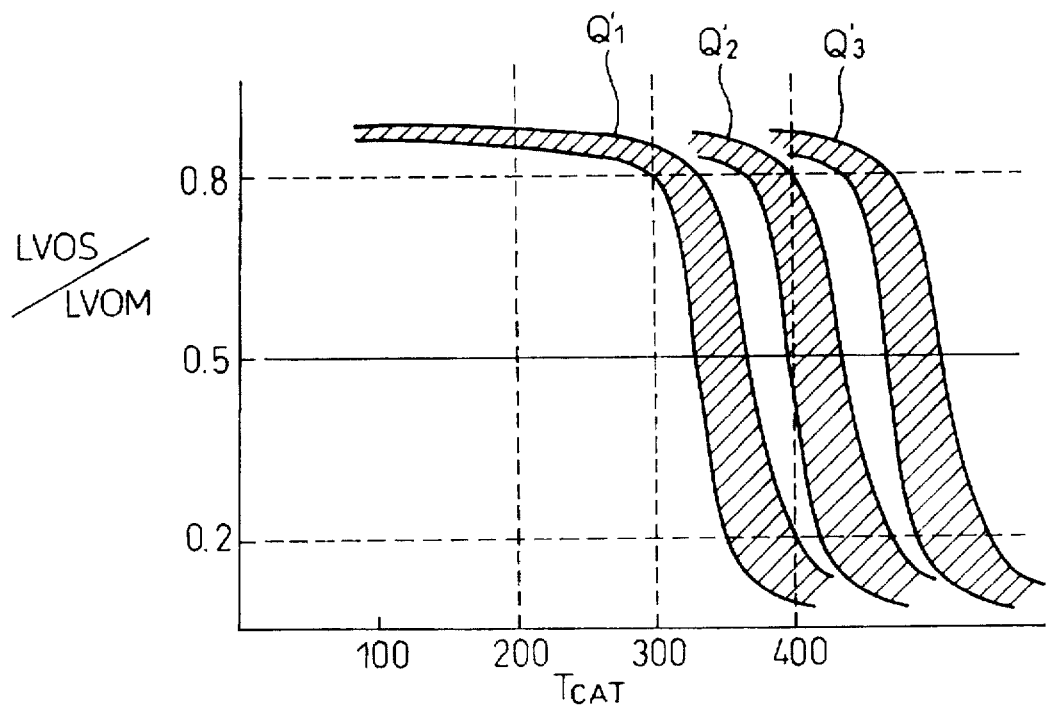

Further, it is found that the value LVOS/LVOM calculated from the actual outputs of the $O_2$ sensors 13 and 15 disperses widely even when the temperature of the catalytic converter 12 and the exhaust gas flow rate are kept constant. FIGS. 9A and 9B show the values LVOS/LVOM actually obtained by experiment using a normal catalytic converter (FIG. 9A) and a deteriorated catalytic converter (FIG. 9B). In FIGS. 9A and 9B, the value LVOS/LVOM are measured in a various conditions in which the flow rate Q of inlet air (.i.e., exhaust gas flow rate) and the temperature $T_{cat}$ of the catalytic converter are changed.

As seen from FIG. 9A (a normal catalytic converter), the ratio LVOS/LVOM changes largely (within the area shown by the hatched portion in FIG. 9A) even if the catalytic converter is the same when the flow rate Q ($Q_1 < Q_2 < Q_3$) or the temperature $T_{cat}$ changes. In addition to this, the value LVOS/LVOM disperses largely even when the Q and the $T_{cat}$ is kept at the same.

For example, referring the case in FIG. 9A in which the flow rate is $Q_1$ and the temperature is $T_{cat1}$ it is seen that the value LVOS/LVOM scatters between the maximum value R1 and the minimum value R2, and the maximum span of the dispersion is approximately plus and minus 0.3 with respect to the center value of the dispersion. The magnitude of dispersion becomes smaller as the temperature $T_{cat}$ becomes higher. For example, as seen from FIG. 9A, when the flow rate is $Q_1$, the dispersion of the value LVOS/LVOM becomes relatively small when the temperature $T_{cat}$ becomes higher than 200° C. This is true for the cases in which the flow rate Q is larger than $Q_1$ (i.e., $Q=Q_2$ or $Q_3$). Namely, the magnitude of the dispersion in the actual value of LVOS/LVOM changes depending on the combinations of the temperature $T_{cat}$ and the exhaust gas flow rate Q.

In general, in an ideal condition in which there is no dispersion of the value LVOS/LVOM, it can be considered that the catalytic converter is normal when the ratio LVOS/LVOM is smaller than 0.5. However, since the actual value of LVOS/LVOM disperses ±0.3 at maximum as shown in FIG. 9A, even if the measured value of LVOS/LVOM is equal to 0.5 in the actual determining operation, the true value of the ratio LVOS/LVOM may be somewhere between 0.2 (0.5−0.3) and 0.8 (0.5+0.3). Due to this dispersion of the measured value of LVOS/LVOM, it is difficult to determine the deterioration of the catalytic converter even if the threshold value for determining the deterioration (0.5 in the above example) is changed in accordance with the temperature $T_{cat}$ or the flow rate Q.

In order to always determine the normal catalytic converter as being normal, it is necessary to carry out the determination of the deterioration at the combination of the temperature $T_{cat}$ and the flow rate Q in which the measured value LVOS/LVOM of a normal catalytic converter always becomes less than 0.2 (i.e., the threshold value 0.5 minus maximum magnitude of dispersion 0.3). If the determination of the deterioration is carried out in other conditions, a normal catalytic converter may be incorrectly determined as being deteriorated. (For example, if the determination is carried out in the condition in which the temperature is $T_{cat1}$ and the flow rate is $Q_1$, the measured value of LVOS/LVOM of a normal catalytic converter can be anywhere between $R_1$ and $R_2$, and the LVOS/LVOM of a normal catalytic converter can be larger than the threshold value of 0.5).

Considering this condition, the combination of $T_{cat}$ and Q which always determine the normal catalyst as being normal is, for example, the combination of the temperature $T_{cat}$ of 400° C. and the flow rate Q smaller than $Q_3$ in FIG. 9A, since the value LVOS/LVOM always becomes smaller than 0.2 in this condition. Similarly to this, when the temperature $T_{cat}$ is 300° C., the flow rate must be smaller than $Q_2$, and when the temperature $T_{cat}$ is 200° C., the flow rate must be smaller than $Q_1$, to always determine a normal catalytic converter as being normal.

Next, the combinations of $T_{cat}$ and Q in which a deteriorated catalytic converter is always determined as being deteriorated is considered with reference to FIG. 9B. In FIG. 9B the relationships between the flow rates $Q_1$, $Q_2$, $Q_3$ and $Q_1'$, $Q_2'$, $Q_3'$ are $Q_1' < Q_2' < Q_1 < Q_3' < Q_2 < Q_3$. It will be understood from FIGS. 9A and 9B that the range of the $T_{cat}$ and Q in which the value LVOS/LVOM becomes small, shifts to high temperature side and large flow rate side when a catalytic converter has deteriorated.

In order to always determine a deteriorated catalytic converter as being deteriorated, it is necessary to select the combinations of $T_{cat}$ and Q which enable the value LVOS/LVOM to become always larger than 0.8, i.e., the threshold value (0.5) plus the magnitude of dispersion (0.8). As seen from FIG. 9B, in order to satisfy this condition, the flow rate Q must be larger than $Q_3'$ when the temperature $T_{cat}$ is 400° C., and must be larger than $Q_2'$ and $Q_1'$ when the temperature $T_{cat}$ is 300° C. and 200° C., respectively. If the combinations of $T_{cat}$ and Q are in these range, the possibility that a deteriorated catalytic converter is determined as being normal can be eliminated.

In order to determine the deterioration of the catalytic converter correctly, i.e., to determine a normal catalytic converter always as being normal and to determine a deteriorated catalytic converter always as being deteriorated, the combinations of $T_{cat}$ and Q at which the determination is carried out must be selected from the above-mentioned ranges. In this case, it may be possible to select only one combination of $T_{cat}$ and Q which can determine both a normal catalytic converter and a deteriorated catalytic converter correctly. For example, if the determination is carried out only when the $T_{cat}$ is between 200° C. and 300° C. and the Q is between $Q_2'$ and $Q_1$, both a normal and a deteriorated catalytic converter are always determined correctly. However, if only one combination of $T_{cat}$ and Q is selected as a prerequisite for the determining operation, the frequency of the determining operations in the actual operation of the engine becomes low. Therefore, in this embodiment, the flow rate Q which allows the correct determination is selected for the respective temperatures $T_{cat}$ to increase the frequency of the determining operation.

Figure 10:
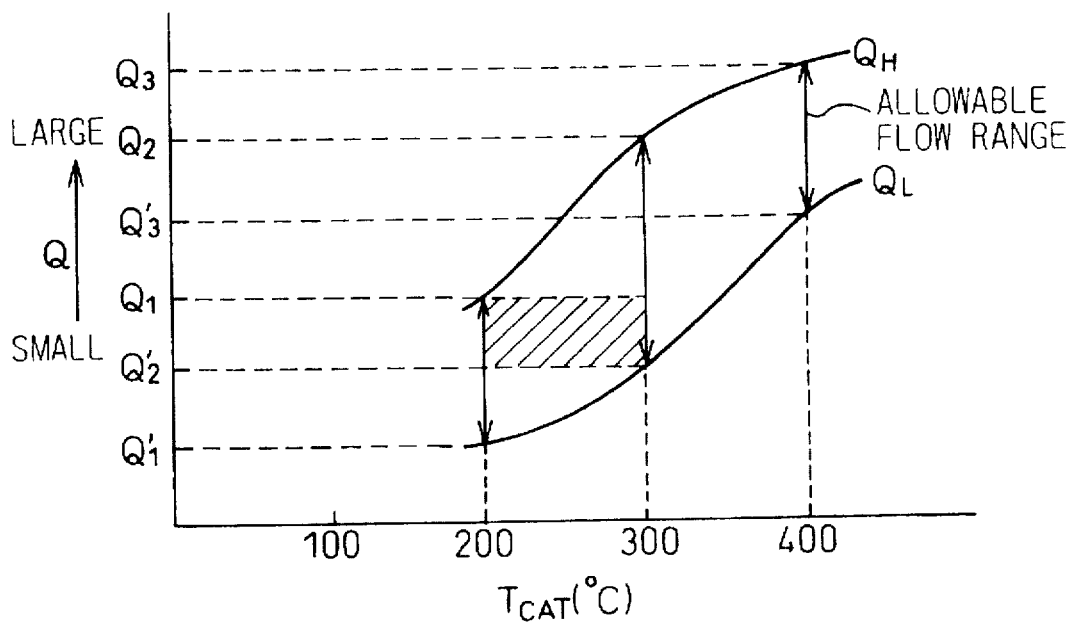
FIG. 10 shows the change in the allowable range of the intake air flow rate in accordance with the temperature of the catalytic converter.

FIG. 10 illustrates the range of the flow rate Q which allows the correct determination at each catalytic converter temperature $T_{cat}$ in this embodiment. In FIG. 10, the curve $Q_H$ shows the maximum flow rate at the respective catalytic converter temperature $T_{cat}$ which allows a normal catalytic converter to be determined always as being normal, and the curve $Q_L$ shows the minimum flow rate at the respective catalytic converter temperature $T_{cat}$ which allows a deteriorated catalytic converter to be determined always as being deteriorated. For example, in FIG. 10, when the catalytic converter temperature $T_{cat}$ is 300° C., the deterioration of the catalytic converter can be determined correctly if the determination is carried out between the maximum flow rate $Q_2$ and the minimum flow rate $Q_2'$. As seen from FIG. 10, by setting the maximum flow rate $Q_H$ and the minimum flow rate $Q_L$ for performing the determining operation at the respective catalytic converter temperature $T_{cat}$, the frequency of determining operation in the actual engine operation is largely increased compared to the case in which only one combination of $T_{cat}$ and Q (for example, $Q_2' \leq Q \leq Q_1$ and 200° C. $\leq T_{cat} \leq$ 300° C., i.e., the hatched area in FIG. 10) is selected as the condition for performing the determining operation.

In this embodiment, the control circuit 10 detects the temperature $T_{cat}$ of the catalytic converter 12 and the flow rate Q of the exhaust gas during the engine operation, and determines the maximum flow rate $Q_H$ and the minimum flow rate $Q_L$ based on the detected temperature $T_{cat}$ using the relationship shown in FIG. 10. If the detected flow rate Q is between the determined $Q_H$ and $Q_L$, the control circuit 10 carries out the determining operation of the catalytic converter.

The exhaust gas flow rate Q is the same as the flow rate of intake air, therefore, the flow rate detected by the airflow meter 3 can be used as the exhaust gas flow rate. The temperature $T_{cat}$ may be detected directly by disposing a temperature sensor in the catalyst bed of the catalytic converter 12. However, in this embodiment, the temperature $T_{cat}$ is detected (determined) indirectly from the engine load conditions to eliminate the cost increase incurred by the temperature sensor.

Next, the method for determining the temperature $T_{cat}$ in this embodiment is explained.

Figure 11:
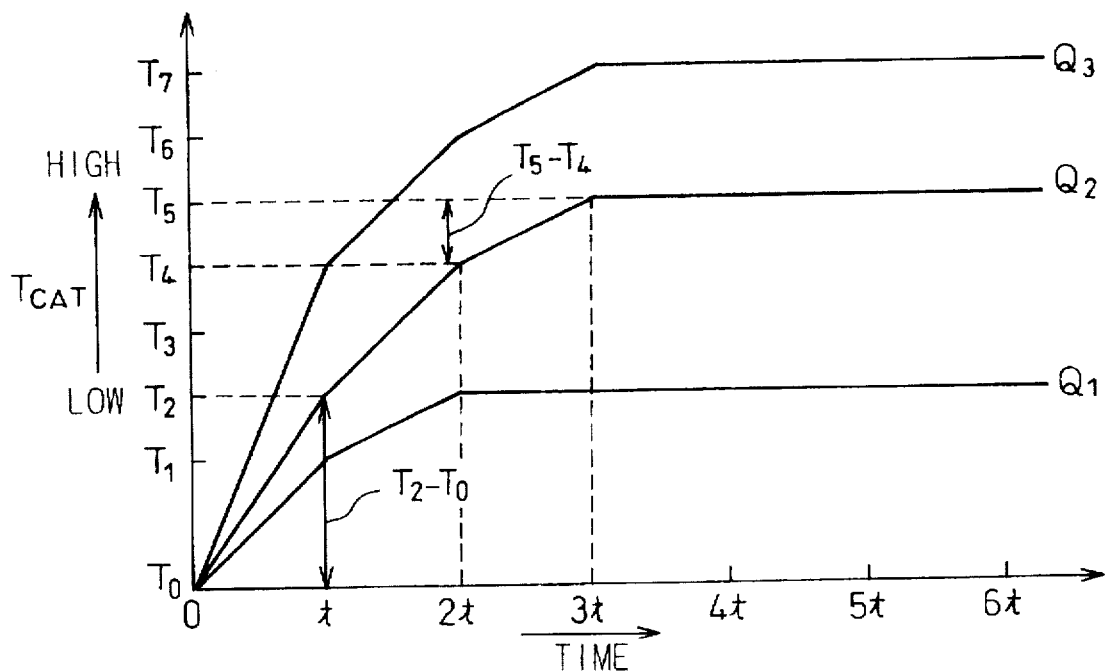
FIGS. 11 and 12 show examples of the relationship between the rate of change in the temperature of the catalytic converter and the flow rate of intake air.
Figure 12:
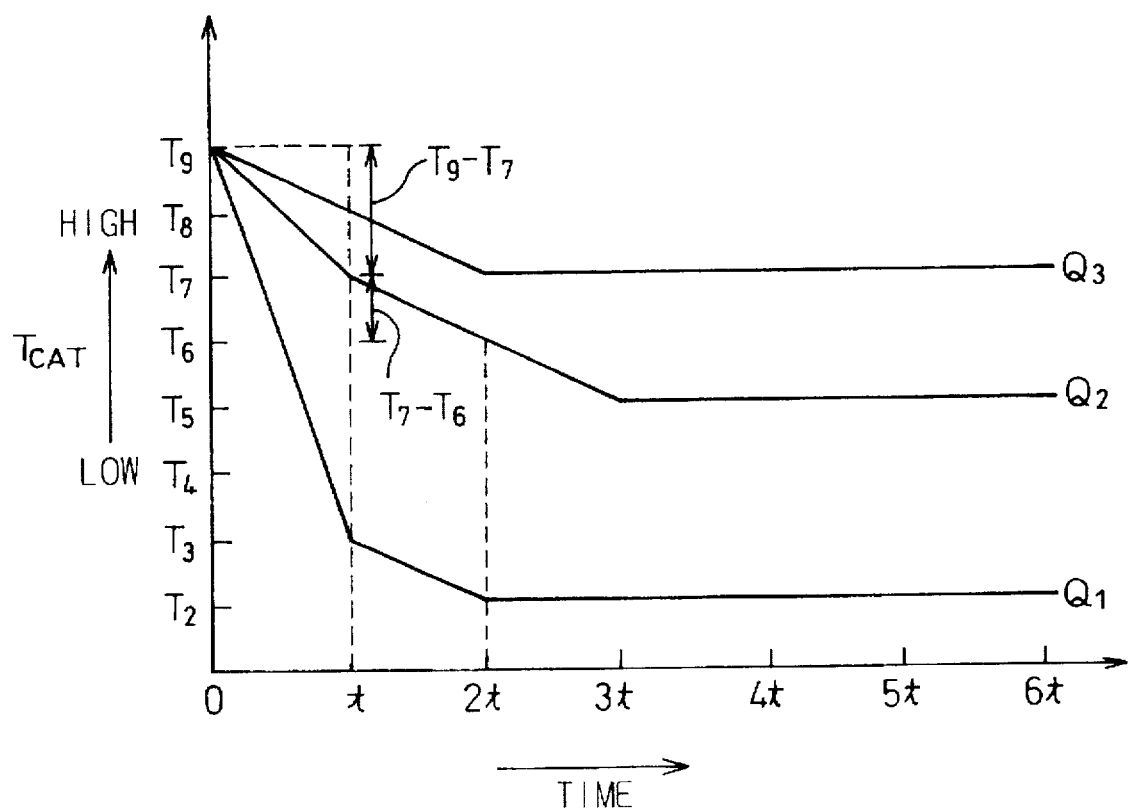

During the actual operation of the engine, the temperature of the catalytic converter changes in accordance with the operating conditions of the engine. However, when the air-fuel ratio feedback control in FIGS. 4 through 7 is carried out, the exhaust gas temperature does not change largely. Therefore, the rate of change in the temperature of the catalytic converter is determined by the exhaust gas (intake air) flow rate and the temperature of the catalytic converter. FIGS. 11 and 12 show the relationships between the rate of change in the temperature $T_{cat}$ and the flow rate Q. FIG. 11 shows the case in which the temperature $T_{cat}$ increases (i.e., the catalytic converter is heated), and FIG. 12 shows the case in which the temperature $T_{cat}$ decreases (i.e., the catalytic converter is cooled). In FIGS. 11 and 12, the horizontal axis represents time expressed by unit time "t". Unit time "t" is equal to the interval of the execution of the temperature determining routine which is explained later.

As seen from FIG. 11, the temperature of the catalytic converter increases rapidly when the temperature $T_{cat}$ is low and the flow rate Q is large, and the rate of increase of the temperature becomes smaller as the temperature of the catalytic converter becomes higher, then, the temperature $T_{cat}$ approaches a final temperature determined by the flow rate Q as the time elapsed. For example, in FIG. 11, if the flow rate is $Q_2$, the temperature $T_{cat}$ increases by $(T_2-T_0)$ per unit time t when the temperature $T_{cat}$ is $T_0$. However, when the temperature $T_{cat}$ is $T_4$, the temperature increase per unit time decreases to $(T_5-T_4)$, and when the temperature $T_{cat}$ is $T_5$ (i.e., final temperature at flow rate $Q_2$), the temperature increase per unit time becomes 0. Similarly to this, when the catalytic converter is cooled (FIG. 12), the temperature of the catalytic converter decreases rapidly when the temperature $T_{cat}$ is high and the flow rate Q is small, and the rate of decrease of the temperature becomes smaller as the temperature $T_{cat}$ becomes lower, and the temperature $T_{cat}$ approaches the final temperature determined by the flow rate Q.

Figure 13:
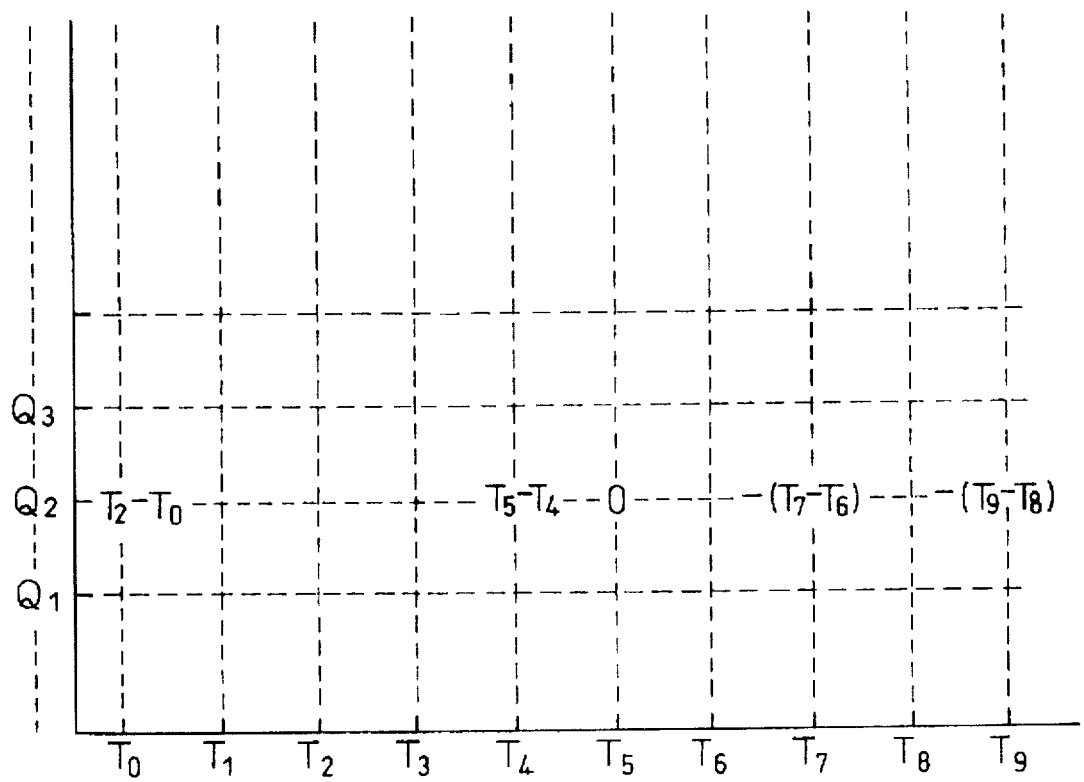
FIG. 13 shows an example of the form of the numerical map used in the flowchart in FIG. 14.

In this embodiment, the relationships in FIGS. 11 and 12 are obtained by experiment, and the change $\Delta T_{cat}$ per unit time is stored in the ROM 104 in the control circuit 10 as a numerical table (map) using the temperature $T_{cat}$ and the flow rate Q in the form as shown in FIG. 13. Further, though FIGS. 11 and 12 show the temperature change when the air-fuel ratio feedback control is carried out, similar relationships as those in FIGS. 11 and 12 during the fuel increment operation (for example, during warming up and full power operation of the engine 1), and the fuel cut operation (for example, during engine braking) are also obtained by experiment, and stored in the ROM 104 as the numerical tables in the form as shown in FIG. 13. The control circuit 10 determines the amount of the temperature change $\Delta T_{cat}$ per unit time using these numerical tables at regular interval, and determines the temperature $T_{cat}$ of the catalytic converter 12 by accumulating the value $\Delta T_{cat}$ during the engine operation.

Figure 14:
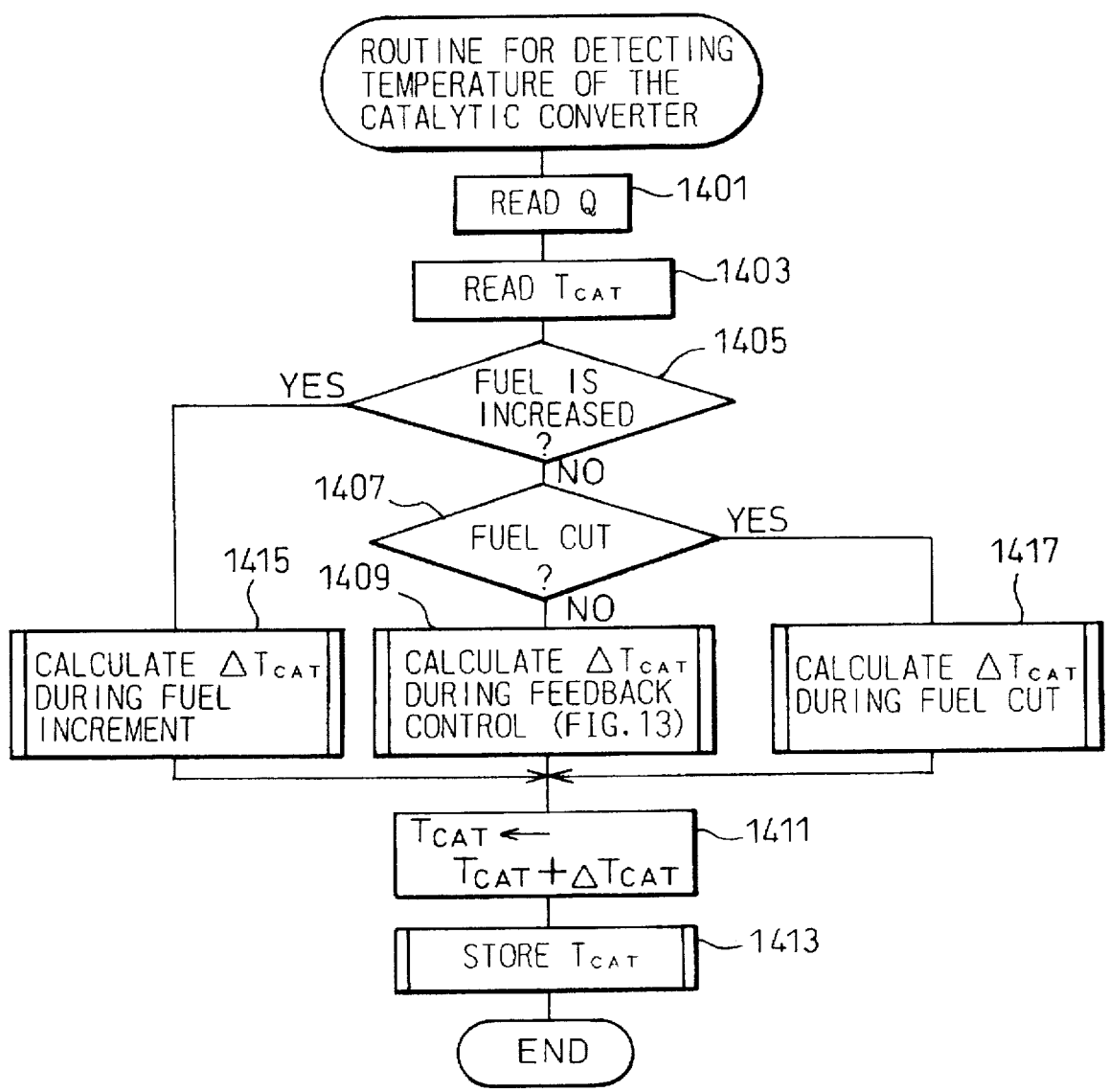
FIG. 14 is a flowchart illustrating an example of the routine for detecting the temperature of the catalytic converter.

FIG. 14 is a flowchart showing the temperature detecting routine executed by the control circuit 10 at a regular interval (time t in FIGS. 11 and 12) for detecting the temperature $T_{cat}$ of the catalytic converter.

In FIG. 14, the inlet air flow Q and the temperature $T_{cat}$ of the catalytic converter 12 when the routine was last executed are read from the RAM 105 at steps 1401 and 1403, respectively. In this embodiment, the temperature of intake air or the cooling water, whichever is higher, is used as an initial value of $T_{cat}$ when the routine is first executed. At steps 1403 and 1405, it is determined whether the fuel increment operation (step 1403) in which the fuel injection amount is increased, or the fuel cut operation (step 1405) in which fuel injection is interrupted are being performed. When neither the fuel increment nor the fuel cut operation is being performed, since it is considered that the air-fuel ratio feedback control in FIGS. 4 through 7 is being performed, the routine executes step 1409 to determine the rate of change $\Delta T_{cat}$ based on the present temperature $T_{cat}$ and the flow rate Q. When the fuel increment or the fuel cut operation is being performed, $\Delta T_{cat}$ is determined using the numerical table corresponding to the fuel increment condition or the fuel cut condition (step 1415 or step 1417).

After determining $A_{car}$, the present temperature $T_{cat}$ of the catalytic converter is calculated by $T_{cat}=T_{cat}+\Delta T_{cat}$ at step 1411, and stored in the RAM 105 at step 1413. By accumulating the amount $\Delta T_{cat}$ of the change in the temperature of the catalytic converter from the start of the engine 1 at step 1411, the present temperature $T_{cat}$ of the catalytic converter 12 is always stored in the RAM 105.

Figure 15:
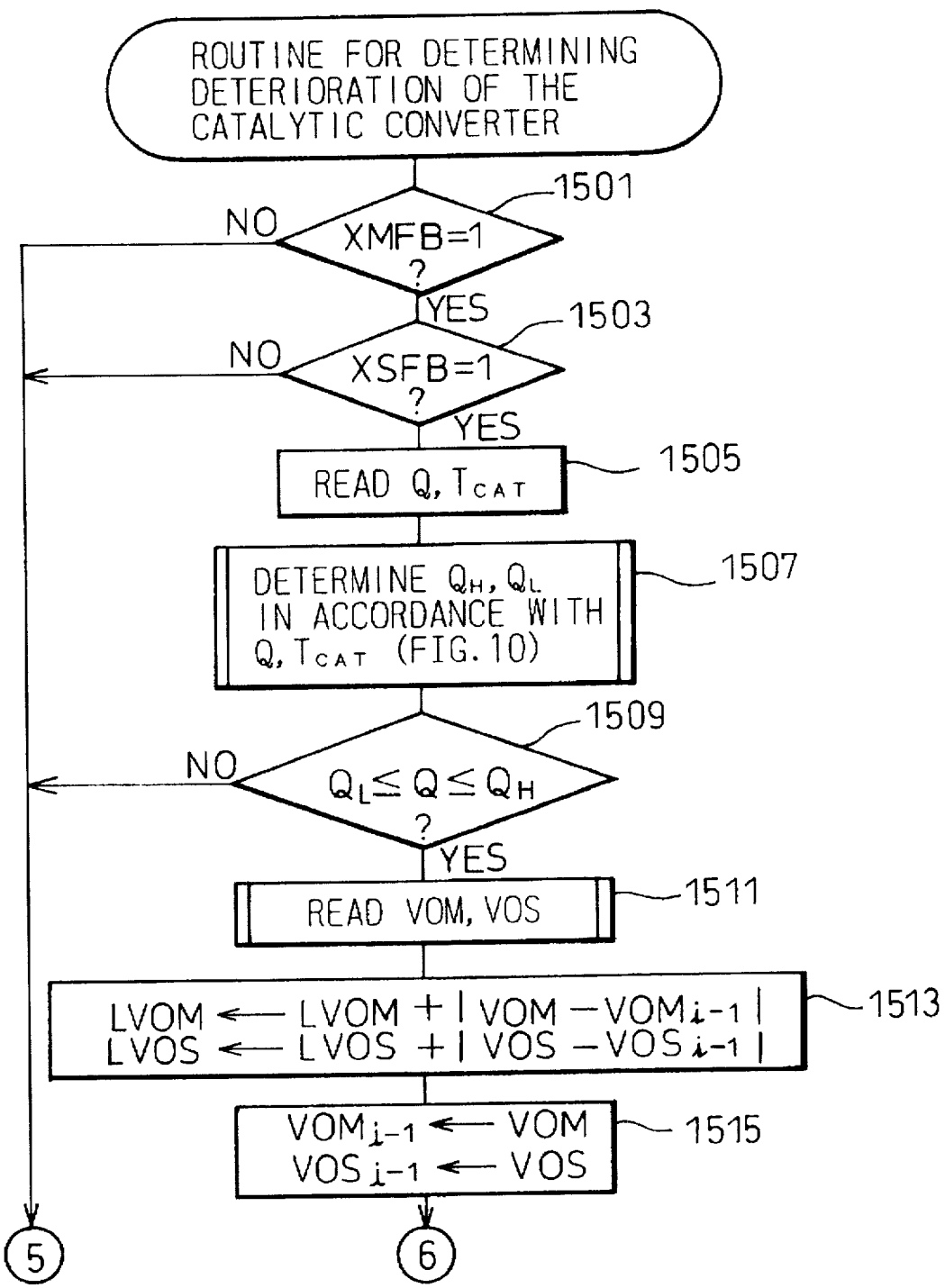
FIGS. 15 and 16 show a flowchart illustrating an embodiment of the determining operation of the deterioration of the catalytic converter.
Figure 16:
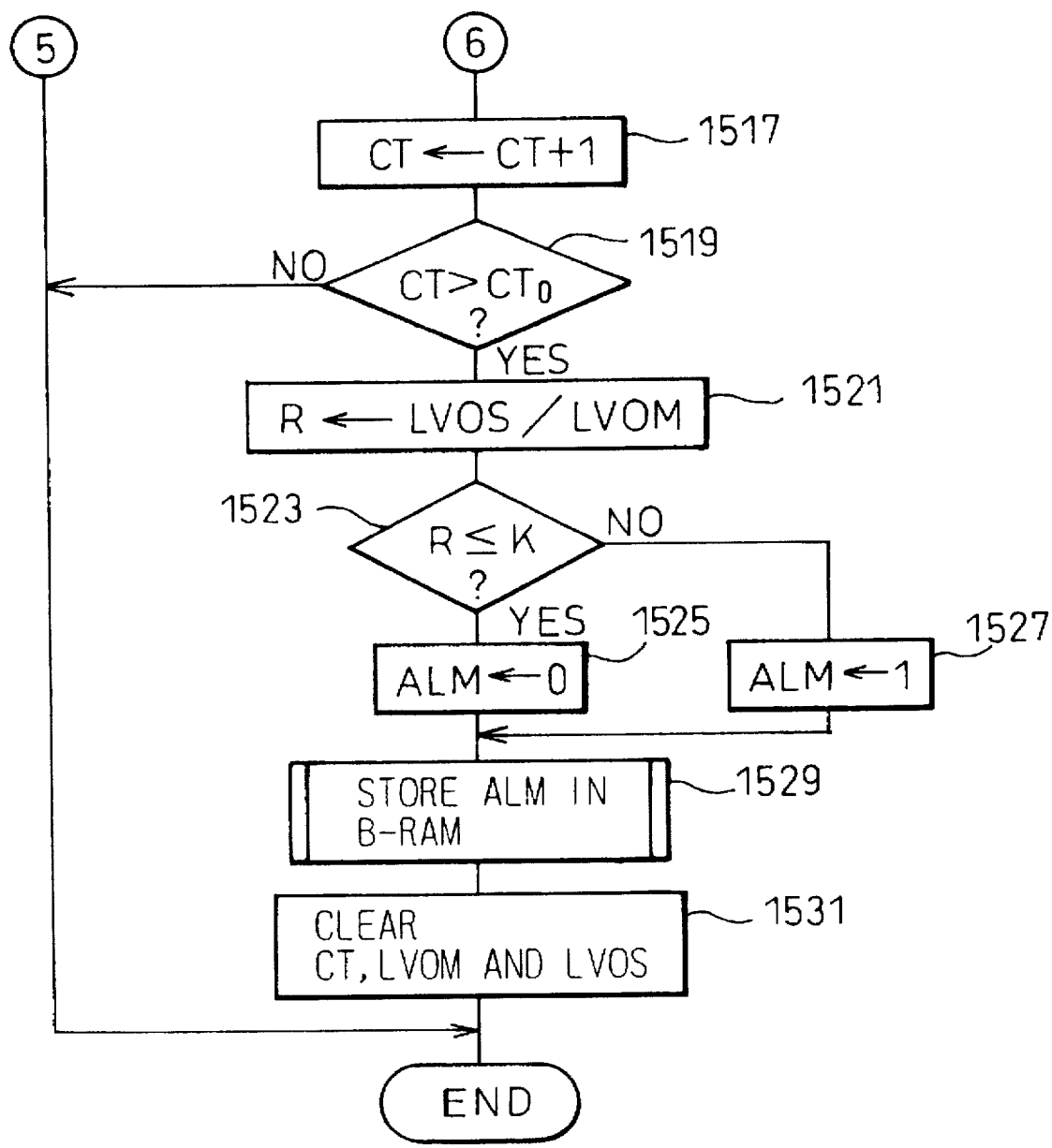

FIGS. 15 and 16 show a flowchart of the routine executed by the control circuit 10 at predetermined regular intervals for determining whether the catalytic converter 12 has deteriorated.

As explained before, the determination of the deterioration is carried out only when the flow rate of intake air is within the allowable range determined by the temperature $T_{car}$ In FIG. 15, at steps 1501 and 1503, it is determined whether the prerequisite conditions for determining operation are satisfied. These conditions are: the first air-fuel ratio feedback control (FIGS. 4 and 5) is being performed (i.e., the value of the flag XMFB is 1 at step 1501); and the second air-fuel ratio feedback control is being performed (i.e., the value of the flag XFSB is 1 at step 1503). If either of step 1501 and 1503 is not satisfied, the routine immediately terminates without performing the determining operation.

If both the conditions in steps 1501 and 1503 are satisfied, the routine executes step 1505 which reads the present value of the temperature $T_{cat}$ and the flow rate Q from the RAM 105. At step 1507, the allowable maximum and minimum flow rate $Q_H$ and $Q_L$ are determined in accordance with the temperature $T_{cat}$ using the relationship in FIG. 10. Then, at step 1509, the present flow rate Q is tested whether it is within the allowable range ($Q_L \leq Q \leq Q_H$). If the present flow rate Q is larger than $Q_H$, or smaller than $Q_L$, since the deterioration of the catalytic converter 12 cannot be determined correctly, the routine terminates without performing the determining operation of steps 1511 through 1531.

Figure 17:
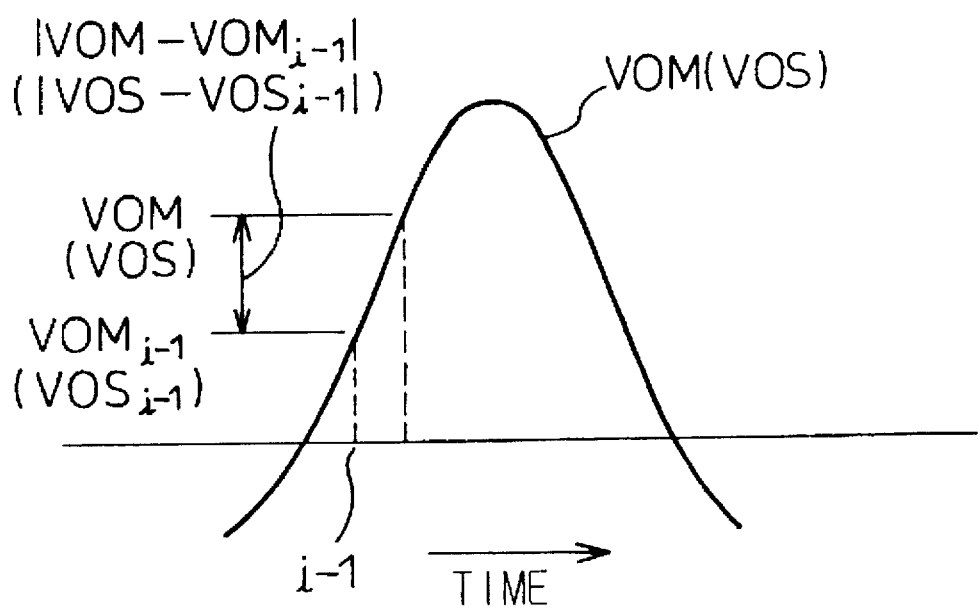
FIG. 17 is a diagram illustrating an example of the method for calculating the length of the output response curve of the air-fuel ratio sensor.

At step 1511, the A/D converted values of the outputs VOM and VOS of the upstream $O_2$ sensor 13 and the downstream $O_2$ sensor 15, respectively, are read through the A/D converter 101, and the length LVOM and LVOS are calculated at step 1513. At step 1513, the lengths LVOM and LVOS of the output response curves of $O_2$ sensors 13 and 15 are calculated as accumulated values of |VOM−VOM$_{i-1}$| and |VOS−VOS$_{i-1}$|, respectively. Namely, LVOM and LVOS are calculated by LVOM=LVOM+|VOM−VOM$_{i-1}$|, and LVOS=LVOS+|VOM−VOS$_{i-1}$| at step 1513. VOM$_{i-1}$ and VOS$_{i-1}$ are the values of VOM and VOS when the routine was last executed (refer to FIG. 17).

After calculating LVOM and LVOS, the values of VOM$_{i-1}$ and VOS$_{i-1}$ are replaced by the present value of VOM and VOS at step 1515, to prepare for the next execution of the routine.

Steps 1517 through 1531 are steps for determining the deterioration of the catalytic converter 12 based on the ratio LVOS/LVOM. In this routine, the values of LVOM and LVOS are calculated until a total time period in which the conditions in steps 1501, 1503 and 1509 are satisfied reaches a predetermined time period. The control circuit 10 determines the deterioration of the catalytic converter based on the ratio LVOS/LVOM when the total time period reaches the predetermined time. Since the total (accumulated) time period is used, the conditions in steps 1501, 1503 and 1509 are not necessarily satisfied continuously, and the determination is carried out when the total (accumulation) of the period in which the above conditions are satisfied becomes a predetermined value. Therefore, the frequency for performing the determining operation in the actual engine operation is increased.

At step 1517 in FIG. 16, a counter CT for measuring the above-explained total time period is increased by 1, and at step 1519, it is determined whether the value of the counter CT reaches a predetermined value $CT_0$, i.e., whether the total time period reaches a predetermined value. The value of $CT_0$ corresponds to the number of execution of the routine in about 20 seconds period. Namely, if the present routine is executed at every 50 ms, the value of $CT_0$ is set at about 400 (=20/0.05).

If $CT \leq CT_0$ at step 1519, this means that the accumulated period does not reach the predetermined time period, i.e., the values of LVOM and LVOS are still not sufficiently accumulated, the routine terminates without determining the deterioration. In this case, though the accumulation of the values of LVOM and LVOS are carried out, the determination is not performed.

If $CT > CT_0$ at step 1519, the ratio LVOS/LVOM is calculated at step 1521, and the determination whether the catalytic converter has deteriorated is performed at step 1523 by comparing the ratio R (=LVOS/LVOM) with a threshold value K. As explained before, the threshold value K for determining the deterioration of the catalytic converter is set at a fixed value 0.5 in this embodiment as shown in FIGS. 9A and 9B.

When the ratio R is larger than K at step 1523, this means that the catalytic converter has deteriorated, the value of an alarm flag ALM is set at 1 at step 1527, and if R is not larger than K, the value of the flag ALM is set at 0 at step 1525. In this embodiment, when the value of the flag ALM is set at 1, the alarm 19 in FIG. 1 is activated to inform the driver of the automobile that the catalytic converter has deteriorated. Then, at step 1529, the value of the flag ALM is stored in the backup RAM 106 to prepare for maintenance and repair. When the determination is carried out at step 1523, the values of the counter CT and the lengths LVOM and LVOS are all cleared at step 1531 before the routine is terminated.

As explained above, in this embodiment, by changing the flow range of the intake air which permits the determining operation of the deterioration of the catalytic converter, instead of the threshold value for the determination, in accordance with the temperature of the catalytic converter, the deterioration of the catalytic converter can be determined correctly without reducing the frequency of the determining operation in the actual engine operation.

Next, another embodiment of the present invention is explained. In this embodiment, the construction of the device for determining the deterioration of the catalytic converter is the same as that shown by FIG. 1. Further, the first and second air-fuel ratio feedback control same as those in FIGS. 4 through 7 are also performed in this embodiment. Therefore, the detailed explanation of the construction of the device and the air-fuel ratio feedback control performed by the device are not repeated here.

In the previous embodiment, the allowable flow range of intake air in which the determining operation of the deterioration of the catalytic converter is permitted is determined in accordance with the temperature $T_{cat}$ of the catalytic converter. The embodiment explained hereinafter is different from the previous embodiment in that the allowable flow range is determined in accordance with the engine speed without detecting the temperature of the catalytic converter.

As explained before, it was found that the fluctuation of the air-fuel ratio of the exhaust gas downstream of the catalytic converter changes in accordance with the engine speed even though the exhaust gas flow rate is the same. The fluctuation of the air-fuel ratio of the exhaust gas downstream of the catalytic converter becomes larger as the engine speed becomes lower, and becomes smaller as the engine speed is higher. The reason why the fluctuation of the air-fuel ratio of the downstream exhaust gas changes in accordance with the engine speed is not clear at present. However, it is considered that the phenomena is caused by the fact that the temperature of the catalytic converter becomes lower as the engine speed decreases even if the exhaust gas flow rate is kept constant.

For example, if the engine speed is high, the exhaust gas from the respective cylinders flows into the catalytic converter at short intervals. This cause the cycle of heat input to the catalytic converter (the heat received from exhaust gas and the heat generated by the oxidation of HC and CO components in the exhaust gas) and the heat output from the catalytic converter (heat dissipation) to be shorter. Due to this short heat cycle, the temperature of the catalytic converter may become higher as the engine speed becomes higher.

Further, when the engine speed is high, the cycle period of the first air-fuel ratio feedback control (FIGS. 4 and 5) becomes shorter since the exhaust gas from the respective cylinders reaches the upstream $O_2$ sensor 13 at short intervals even though the exhaust gas flow rate is the same. When the cycle period of the first air-fuel ratio feedback control is different, the magnitude of the deviation of the instantaneous air-fuel ratio of the exhaust gas flowing into the catalytic converter may become different even if the average air-fuel ratio is kept at the same value. This instantaneous deviation of the air-fuel ratio of the exhaust gas causes the difference in the amount of the heat generated by oxidation of the HC and CO in the exhaust gas on the catalytic converter. Therefore, the temperature of the catalytic converter may be changed in accordance with the engine speed. In the actual operation of the engine, it is considered that the temperature of the catalytic converter is affected by the engine speed by one or more reasons explained above. Since the $O_2$ storage capability of the catalytic converter changes in accordance with the temperature of the catalytic converter as explained before, the deterioration of the catalytic converter cannot be determined correctly in the different engine speed conditions even if the exhaust gas flow rate is the same.

Figure 18:
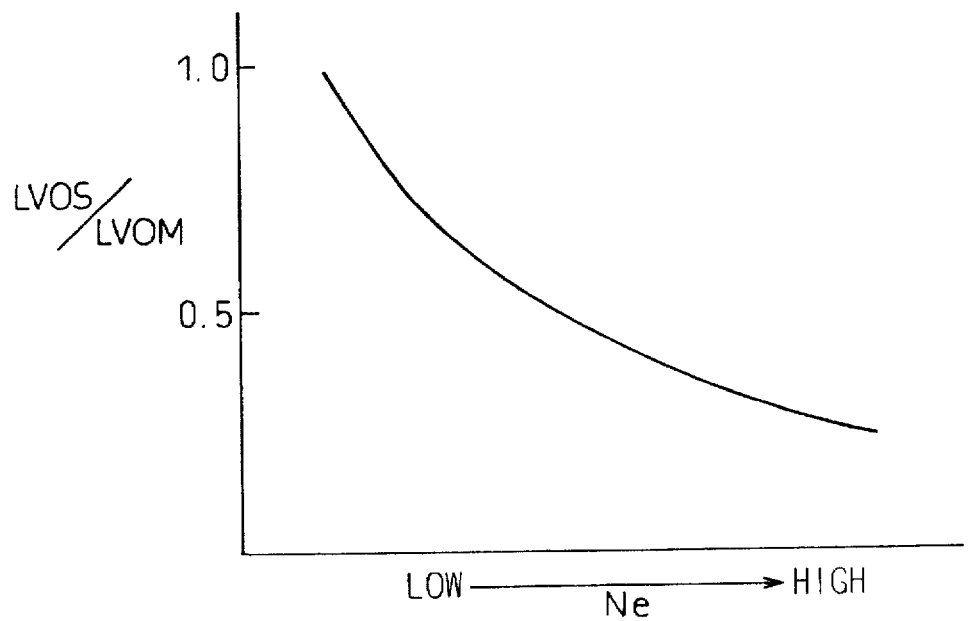
FIG. 18 shows the change in the ratio of the lengths of the output response curves of the upstream and downstream air-fuel ratio sensor caused by the change in the engine speed.

FIG. 18 shows the change in the ratio LVOS/LVOM measured in experiment using the actual engine and the catalytic converter. In this experiment, the ratio LVOS/LVOM is measured in the different engine speed conditions while keeping the exhaust gas flow rate at the same value.

As shown in FIG. 18, since the fluctuation of the air-fuel ratio of the exhaust gas downstream of the catalytic converter becomes larger (i.e., LVOS becomes larger) as the engine speed Ne becomes lower, the ratio LVOS/LVOM also becomes larger as the engine speed Ne becomes lower even if the level of deterioration of the catalytic converter and the exhaust gas flow rate is the same. As explained in the previous embodiment, LVOS becomes large as the exhaust gas flow rate is large. Therefore, if the exhaust, gas flow rate is large, the ratio LVOS/LVOM further becomes larger than the ratio LVOS/LVOM shown by FIG. 18. This means that, when the engine speed is low, the maximum exhaust gas flow rate which allows the correct determination of the deterioration becomes smaller than the maximum exhaust gas flow rate when the engine speed is high. Therefore, in order to determine the deterioration of the catalytic converter correctly, it is necessary to set the maximum allowable flow rate $Q_H$ in such a manner that $Q_H$ becomes smaller as the engine speed decreases.

Figure 19:
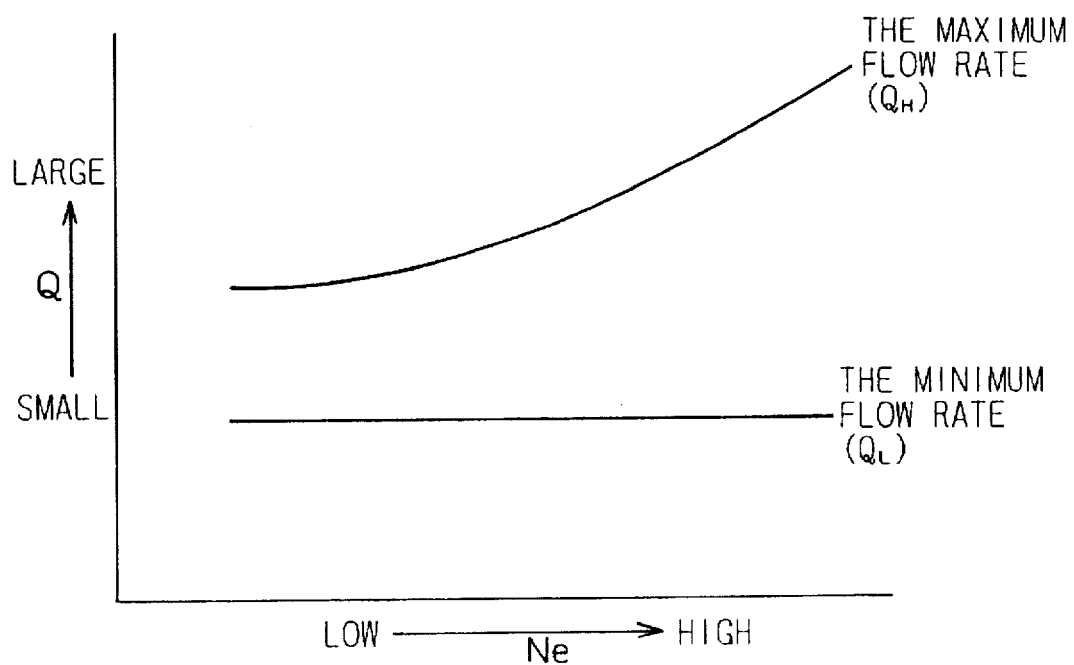
FIG. 19 is an example of the relationship between the allowable flow range and the engine speed.

FIG. 19 shows the allowable flow range of the exhaust gas (i.e., intake air) in this embodiment. In FIG. 19, the range between $Q_H$ and $Q_L$ shows the allowable flow range at the respective engine speed. As shown in FIG. 19, the maximum flow rate $Q_H$ which allows the determining operation is set at a smaller value as the engine speed Ne becomes lower in this embodiment. However, the minimum flow rate $Q_L$ in this embodiment is set at a constant value regardless of the engine speed. Since the fluctuation of the air-fuel ratio of the exhaust gas downstream of the catalytic converter becomes smaller as the exhaust gas flow rate becomes smaller, the effects of the flow rate and the engine speed cancel each other when both the exhaust gas flow rate and the engine speed are lowered. Therefore, the minimum flow rate can be set at constant value regardless of the engine speed.

Figure 20:
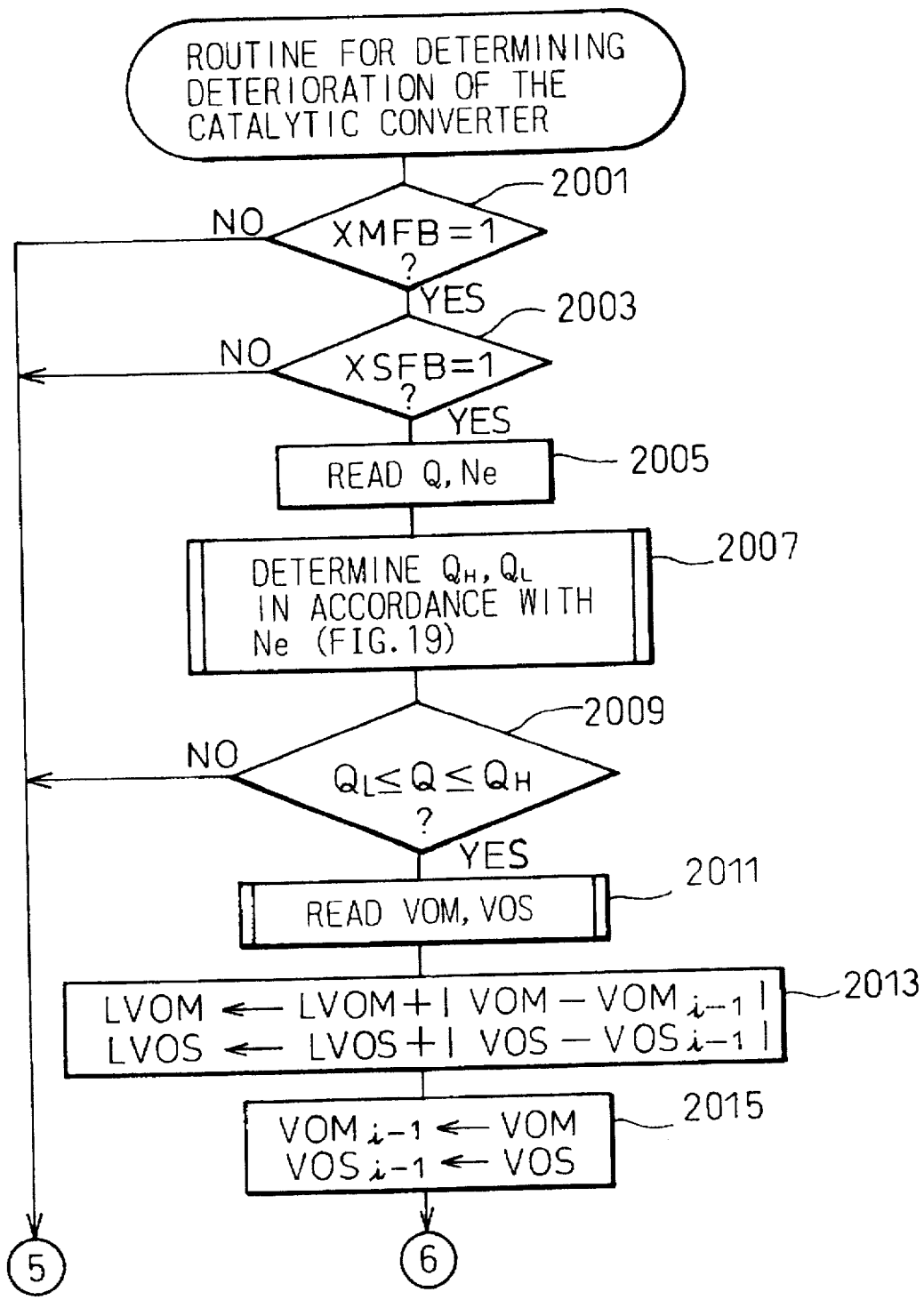
FIGS. 20 and 21 show a flowchart illustrating another embodiment of the determining operation of the deterioration of the catalytic converter.
Figure 21:
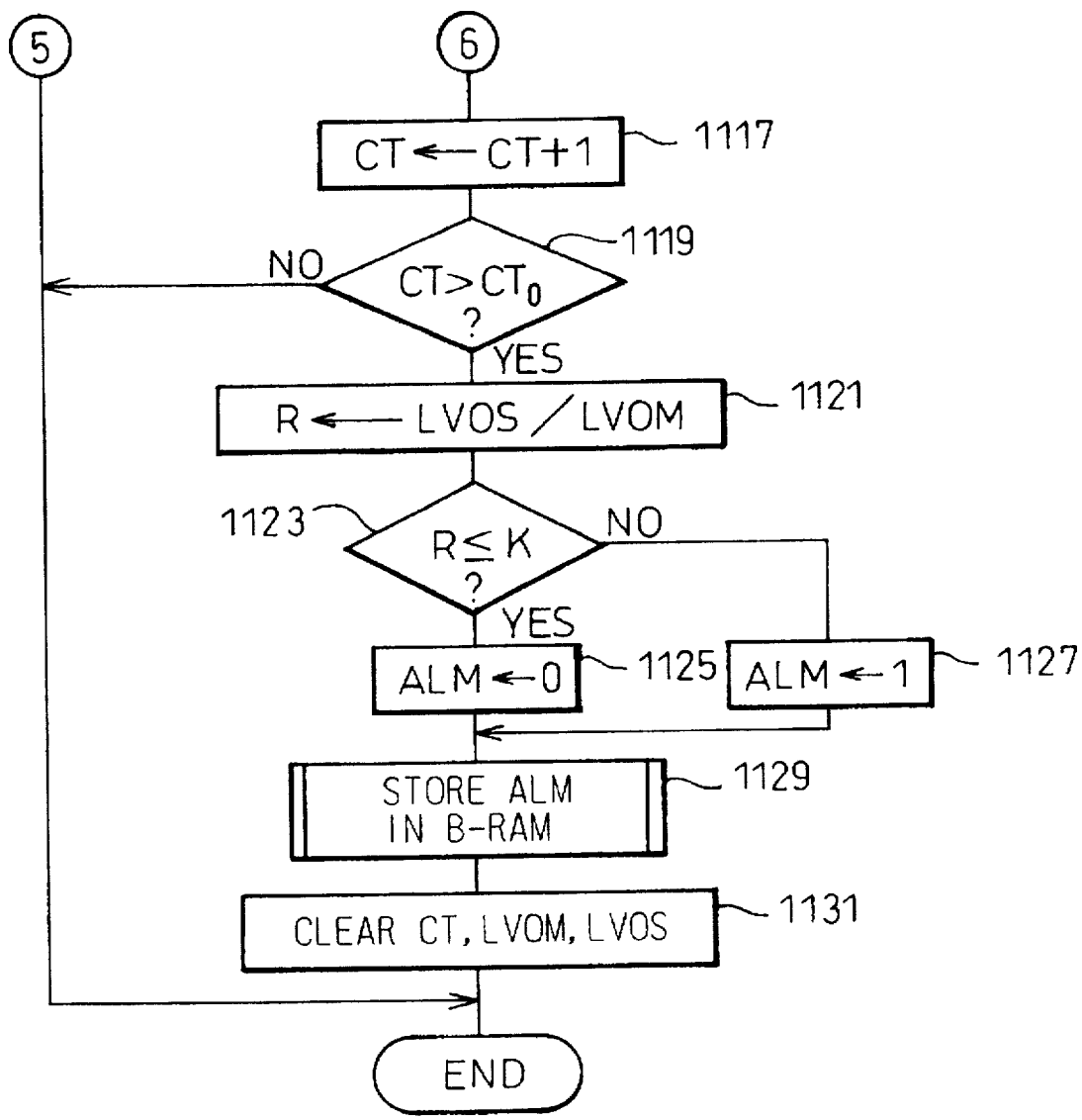

FIGS. 20 and 21 show a flowchart of the determining operation of the deterioration of the catalytic converter in this embodiment. This routine is performed by the control circuit 10 in FIG. 1 at regular intervals.

The flowchart of FIGS. 20 and 21 is the substantially the same as the flowchart of FIGS. 15 and 16 except steps 2005 and 2007. Namely, at step 2005, the flow rate of intake air Q and the engine speed Ne are read, and the maximum and the minimum flow rates $Q_H$ and $Q_L$ are determined in accordance with the engine speed Ne at step 2007 using the relationship in FIG. 19. Then the present flow rate Q is compared with the determined $Q_H$ and $Q_L$ at step 2009. In this embodiment, the calculations of LVOM and LVOS (step 2013) and the determination of the deterioration (step 2023) are also carried out only when the flow rate Q is within the allowable range (i.e., $Q_L \leq Q \leq Q_H$).

According to this embodiment, since the allowable flow range for the determination of the deterioration of the catalytic converter is changed in accordance with the engine speed, the deterioration of the catalytic converter can be determined correctly regardless of the engine speed.

Next, another embodiment of the present invention is explained. Though the allowable flow range is changed in accordance with the engine speed in the above embodiment, the temperature of the catalytic converter is also affected by other conditions. For example, when the ambient temperature is low, the temperature of intake air and, accordingly, the exhaust gas temperature becomes low. Further, the amount of heat dissipated from the catalytic converter to the atmosphere becomes larger. Therefore, when the ambient temperature (i.e., intake air temperature) is low, the temperature of the catalytic converter becomes low. Similarly to this, when the engine temperature (cooling water temperature or lubricating oil temperature) is low, the temperature of the catalytic converter also becomes low. Further, when the automobile is running at higher speed, the catalytic converter is exposed to a stronger wind than when the automobile's running speed is low. Therefore, if other conditions are the same, the temperature of the catalytic converter becomes lower as the speed of the automobile becomes higher.

Considering these conditions, the device in this embodiment first determines the allowable flow range in accordance with the engine speed using the method explained in the previous embodiment (FIG. 19), and corrects this flow range based on the engine operating conditions which affect the temperature of the catalytic converter, such as the intake air temperature THA, the cooling water temperature THW and the engine speed SPD.

Figure 22:
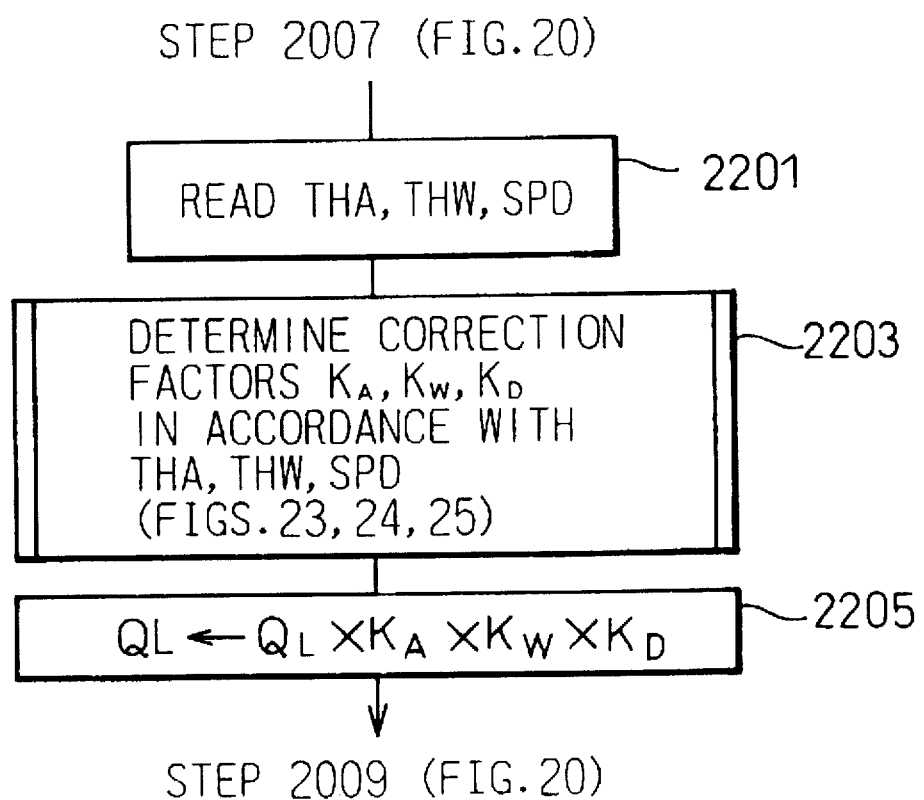
FIG. 22 shows a flowchart illustrating another embodiment of the determining operation of the deterioration of the catalytic converter.

FIG. 22 shows a flowchart explaining the determining operation of this embodiment. In this embodiment, the determining operation of the deterioration of the catalytic converter is performed by adding steps 2201, 2203 and 2205 in FIG. 22 between steps 2207 and 2209 in the flowchart of FIG. 20. Therefore, though FIG. 22 shows only steps 2201, 2203 and 2205, other steps of the flowchart is the same as that in FIGS. 20 and 21.

In the flowchart in FIG. 22, the allowable flow range determined by step 2007 in FIG. 20 are corrected in accordance with the intake air temperature THA, the cooling water temperature THW and the traveling speed SPD of the automobile. Namely, after determining $Q_H$ and $Q_L$ at step 2007 in FIG. 20, the values of THA, THW and SPD are read at step 2201. The intake air temperature THA is detected by the temperature sensor incorporated in the airflow meter 3 in FIG. 1 (not shown). Further, at step 2201, the correction factors $K_A$, $K_W$ and $K_D$ are determined in accordance with the values THA, THW and SPD. Then, the minimum flow rate $Q_L$ is corrected by multiplying $Q_L$ by the factors $K_A$, $K_W$ and $K_D$ (i.e., $Q_L = Q_L \times K_A \times K_W \times K_D$) at step 2205. Steps 2009 (FIG. 20) is performed using this corrected value of $Q_L$.

Figure 23:
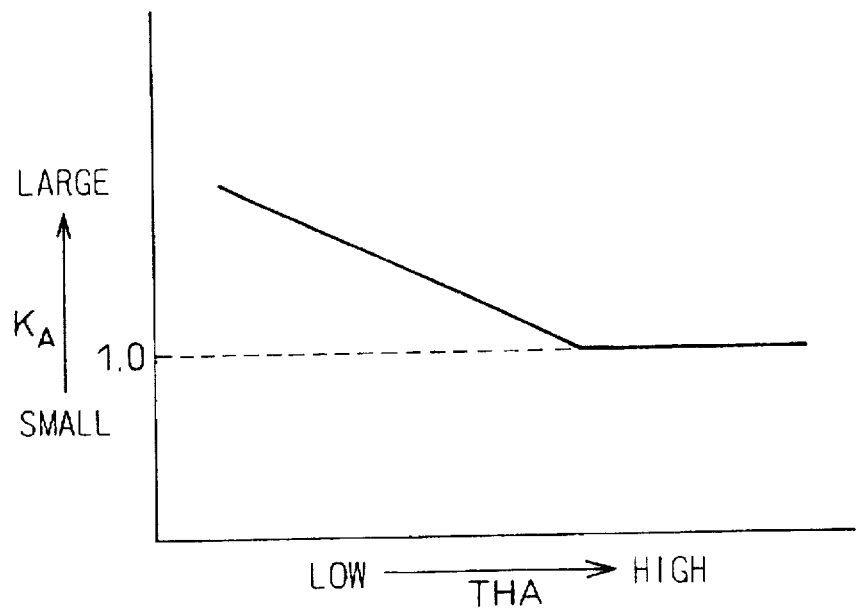
FIGS. 23 through 25 show the values of the coefficients used in the flowchart in FIG. 22.
Figure 24:
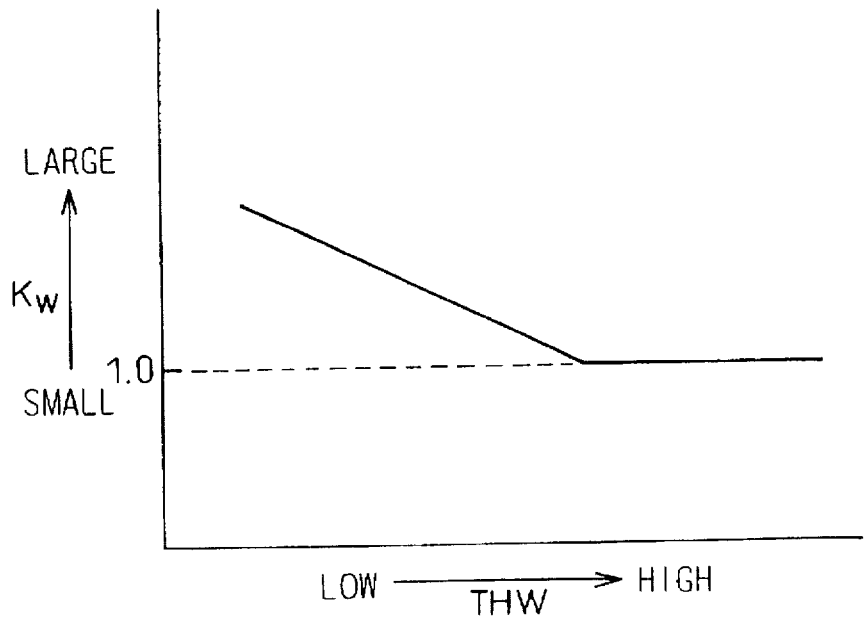

FIGS. 23 and 24 show the settings of the values of the factors $K_A$ and $K_W$.

Figure 25:
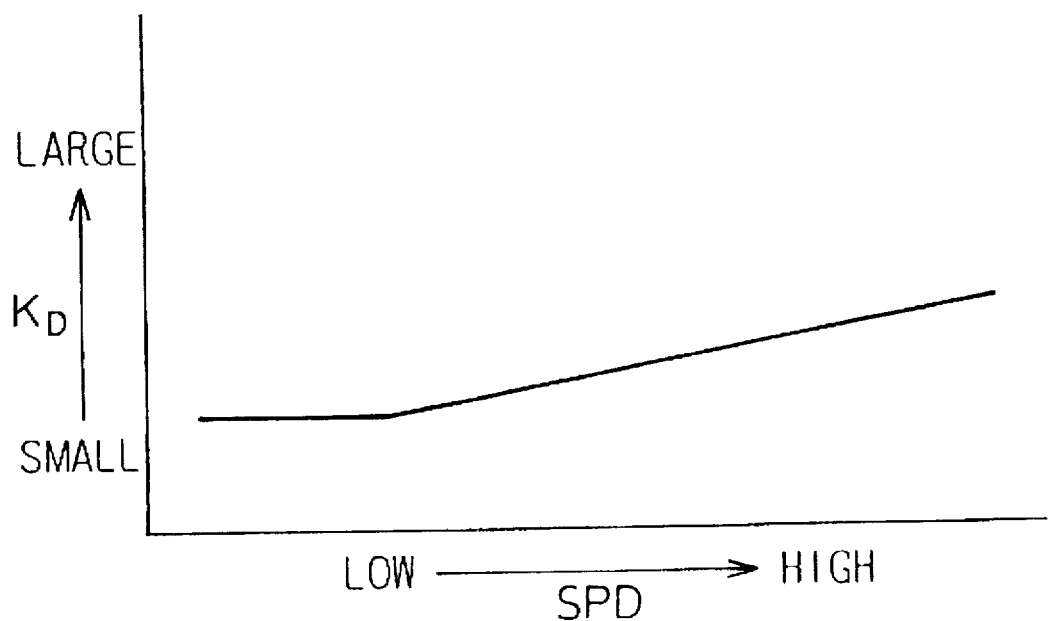

As shown in FIGS. 23 and 24, the values of $K_A$ and $K_W$ are set at values larger than 1.0 when the intake air temperature THA and cooling water temperature THW, respectively, are low. The values of $K_A$ and $K_W$ decrease as the temperatures THA and THW becomes higher, and become 1.0 when the temperature THA and THW becomes higher than a predetermined value. Since the temperature $T_{cat}$ of the catalytic converter becomes lower as the temperatures THA and THW become lower, the fluctuation of the output VOS of the downstream $O_2$ sensor may become large when the temperatures THA and THW are low even if the flow rate is larger than the minimum value $Q_L$ determined at step 2007 in FIG. 20. Therefore, in order to eliminate the error from the determination of deterioration, the minimum value $Q_L$ is increased when the temperatures THA and THW are low in this embodiment. FIG. 25 shows the setting of the value of the factor $K_D$. In contrast to the factors $K_A$ and $K_W$, the value of the factor $K_D$ is set at 1.0 when the traveling speed SPD of the automobile is low and, when the speed SPD becomes higher than a predetermined value, the value of $K_D$ is increased as SPD becomes higher. As shown by FIG. 25, since the speed SPD becomes higher, the temperature of the catalytic converter becomes lower, the minimum flow rate $Q_L$ is increased as the speed SPD becomes higher.

By performing steps 2201 through 2205 in FIG. 22, the minimum flow rate $Q_L$ is set at a higher value as either of the intake air temperature THA and the cooling water temperature THW becomes lower and the traveling speed SPD of the automobile becomes higher. Therefore, the error in the determination of the deterioration of the catalytic converter caused by the low temperature of the catalytic converter is prevented from occurring.

As explained above, only the minimum flow rate $Q_L$ is corrected in accordance with the temperatures THA, THW and speed SPD in this embodiment. The reason for this is that the temperature of the catalytic converter becomes relatively high when the exhaust gas flow rate approaches the maximum value $Q_H$ and it is considered that the influences of the temperatures THA and THW, or the speed SPD over the temperature of the catalytic converter become relatively small in this flow range. Though the value of $Q_L$ is corrected in accordance with three operating parameters, i.e., THA, THW and SPD in this embodiment, the value of $Q_L$ may be corrected using one or two of these operating parameters. Further, though the maximum flow rate $Q_H$ is not corrected in this embodiment, $Q_H$ may be corrected in the manner similar to that explained by FIGS. 23 through 25 to further increase the accuracy of the determination.

Next, another embodiment of the present invention is explained. In this embodiment, the construction of the device for determining the deterioration of the catalytic converter is also the same as that shown in FIG. 1. Further, the first and second air-fuel ratio feedback control same as those in FIGS. 4 through 7 are also performed in this embodiment. Therefore, the detailed explanation of the construction of the device and the air-fuel ratio feedback control performed by the device are not repeated here.

In the embodiments in FIGS. 19 through 25, the determining operation is carried out when the flow rate Q is within the allowable range regardless of the conditions in which the engine is operated before the determining operation starts. However, the temperature of the catalytic converter is affected by the operating conditions before the determining operation starts. For example, since the fuel cut operation of the engine, in which the fuel supply to the engine is stopped, is carried out during the deceleration of the automobile, if the automobile has decelerated for a long period (such as when the automobile descends a long slope) before the determining operation is started, the temperature of the catalytic converter becomes low even if the flow rate Q is within the allowable range. Similarly, the temperature of the catalytic converter becomes low if an idle operation of the engine continues for a long time. Further, the degree of decrease in the temperature of the catalytic converter during the deceleration of the automobile or the engine idle operation changes in accordance with whether the automobile is equipped with a manual transmission or equipped with an automatic transmission. For example, the fuel cut operation during the deceleration of the automobile with a manual transmission is carried out in the ranges of engine speed and automobile speed which are wider than that of the automobile with automatic transmission. Therefore, in general, the temperature drop of the catalytic converter becomes larger in the automobile with a manual transmission than the automobile with an automatic transmission. Also, since the position of gear shift in the automatic transmission is usually kept at D (drive) range during the idle operation of the engine, the engine load of the automobile with an automatic transmission becomes larger than that of the automobile with a manual transmission. Thus, in general, the temperature drop during the engine idle operation becomes smaller in the automobile with automatic transmission than in the automobile with a manual transmission. Therefore, the temperature of the catalytic converter after the deceleration of the automobile and the idle operation of the engine becomes different depending on whether the automobile is equipped with an automatic transmission or a manual transmission.

In this embodiment, therefore, a correction of the allowable flow range is performed after the decelerating operation of the automobile (hereinafter, the term "decelerating operation" is used for both the decelerating operation of the automobile and the idle operation of the engine) for a period determined by the length of the period in which the decelerating operation has continued. Further, in this period, the allowable flow range is corrected in different manners depending on whether the automobile is equipped with an automatic transmission or a manual transmission.

Figure 26:
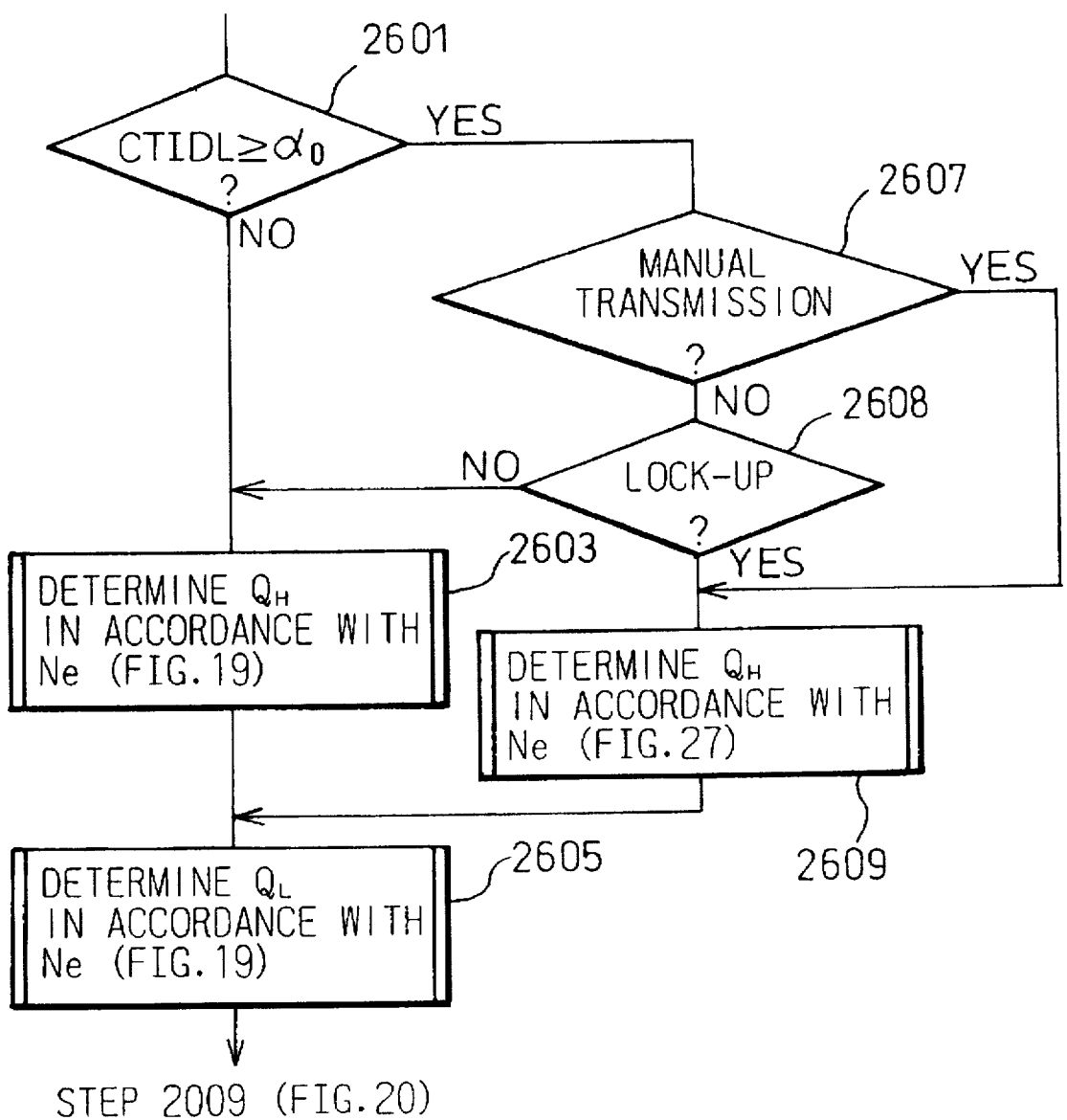
FIG. 26 shows a flowchart illustrating another embodiment of the determining operation of the deterioration of the catalytic converter.

FIG. 26 shows a flowchart explaining the determining operation of this embodiment. The flowchart in FIG. 26 is different from the flowchart in FIG. 20 in that step 2007 in FIG. 20 is replaced by steps 2601 through 2605 as shown in FIG. 26. Therefore, though FIG. 26 shows only steps 2601 through 2605, the rest of the flowchart is the same as that in FIGS. 20 and 21. In the flowchart of FIG. 26, step 2601 is executed after reading the intake air flow rate Q and the engine speed Ne at step 2005 in FIG. 20. At step 2601, it is determined whether the value of the counter CTIDL larger than or equal to a predetermined value $\alpha_0$.

The magnitude of the value of the counter CTIDL represents the magnitude of the influence of the decelerating operation carried out in the past exerted on the temperature of the catalytic converter, and when the value of CTIDL is larger than or equal to the value $\alpha_0$, it is considered that the influence of the decelerating operation is large and cannot be ignored. The setting of the value of the counter CTIDL is explained later in detail.

If CTIDL<$\alpha_0$ at step 2601, since it is considered that the influence of the past decelerating operation already becomes negligibly small, the routine executes steps 2603 and 2605 to determine the maximum flow rate $Q_H$ (step 2603) and the minimum flow rate $Q_L$ (step 2605) in accordance with the values of Q and Ne read at step 2005 and the relationship in FIG. 19. Then the routine proceeds to step 2009 in FIG. 20. In this case, therefore, the values of $Q_H$ and $Q_L$ are set at the same values as those in the flowchart in FIGS. 20 and 21 regardless of whether the automobile is equipped with an automatic transmission or a manual transmission.

Figure 27:
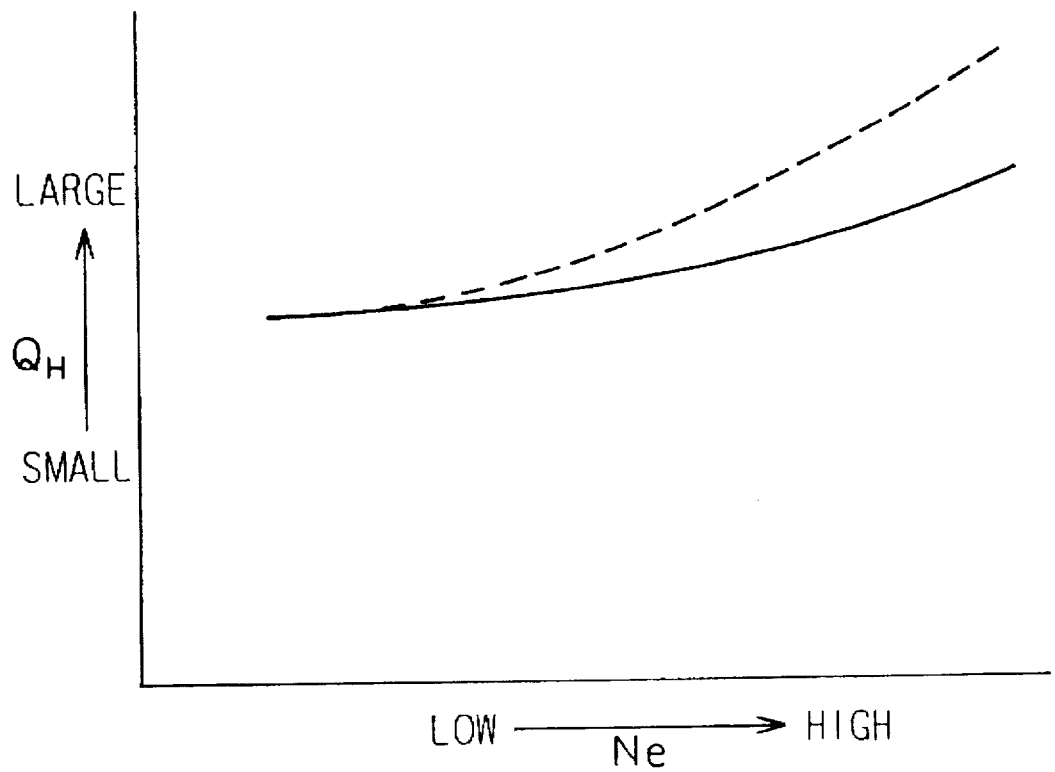
FIG. 27 shows the change in the allowable flow range of intake air between an automobile equipped with a manual transmission and an automobile equipped with an automatic transmission.

On the other hand, if CTIDL$\leq\alpha_0$ at step 2601, it means that the influence of the past decelerating operation is still large (i.e., the temperature of the catalytic converter is still low). Further, in this case, the temperature of the catalytic converter is lower in the automobile with a manual transmission than in the automobile with an automatic transmission. Therefore, when CTIDL<$\alpha_0$ at step 2601, the routine determines the maximum flow rate $Q_H$ at step 2609 if the automobile is equipped with a manual transmission (step 2607) using FIG. 27 instead of FIG. 19. FIG. 27 shows the setting of the maximum flow rate for the automobile with a manual transmission. In FIG. 27, the setting of $Q_H$ in FIG. 19 is shown by the broken line for reference. As seen from FIG. 27, the maximum flow rate $Q_H$ for the automobile with a manual transmission (the solid line in FIG. 27) is set at a value smaller than the value of $Q_H$ set by FIG. 19 (the broken line in FIG. 27).

Further, in this embodiment, even if the automobile is equipped with an automatic transmission, if a lock-up clutch of the automatic transmission is in the ON condition (step 2608), the value of $Q_H$ is determined based on FIG. 27 (step 2609). Namely, when the lock-up clutch is ON, the maximum flow rate Q is set at the same value as that of the automobile with a manual transmission even if the automobile is equipped with an automatic transmission. If the lock-up clutch is OFF at step 2608, the routine executes step 2603 to determine the maximum flow rate $Q_H$. In this case, therefore, $Q_H$ is set at the same value as that in the case CTIDL<$\alpha_0$. As explained above, only the maximum flow rate $Q_H$ is corrected at step 2609, and the minimum flow rate $Q_L$ is set by FIG. 19 (step 2605) regardless of the past operating conditions. This is, as shown in FIG. 19, the minimum flow rate $Q_L$ is not affected by the engine speed.

In this embodiment, when the automobile is equipped with an automatic transmission, and when the lock-up clutch is OFF, the correction of the maximum flow rate $Q_H$ is not carried out (step 2607, 2608 and 2603) since the temperature drop of the catalytic converter during the decelerating operation of the automobile with an automatic transmission is small if the lock-up clutch is OFF. The maximum flow $Q_H$ is corrected when the automobile is equipped with a manual transmission (step 2607 and 2609). Also the correction of $Q_H$ is carried out when the lock-up clutch is on if the automobile is equipped with an automatic transmission, since the engine is directly coupled with a drive shaft when the lock-up clutch is ON, and the characteristics of the automobile becomes similar to that of the automobile with a manual transmission.

Figure 28:
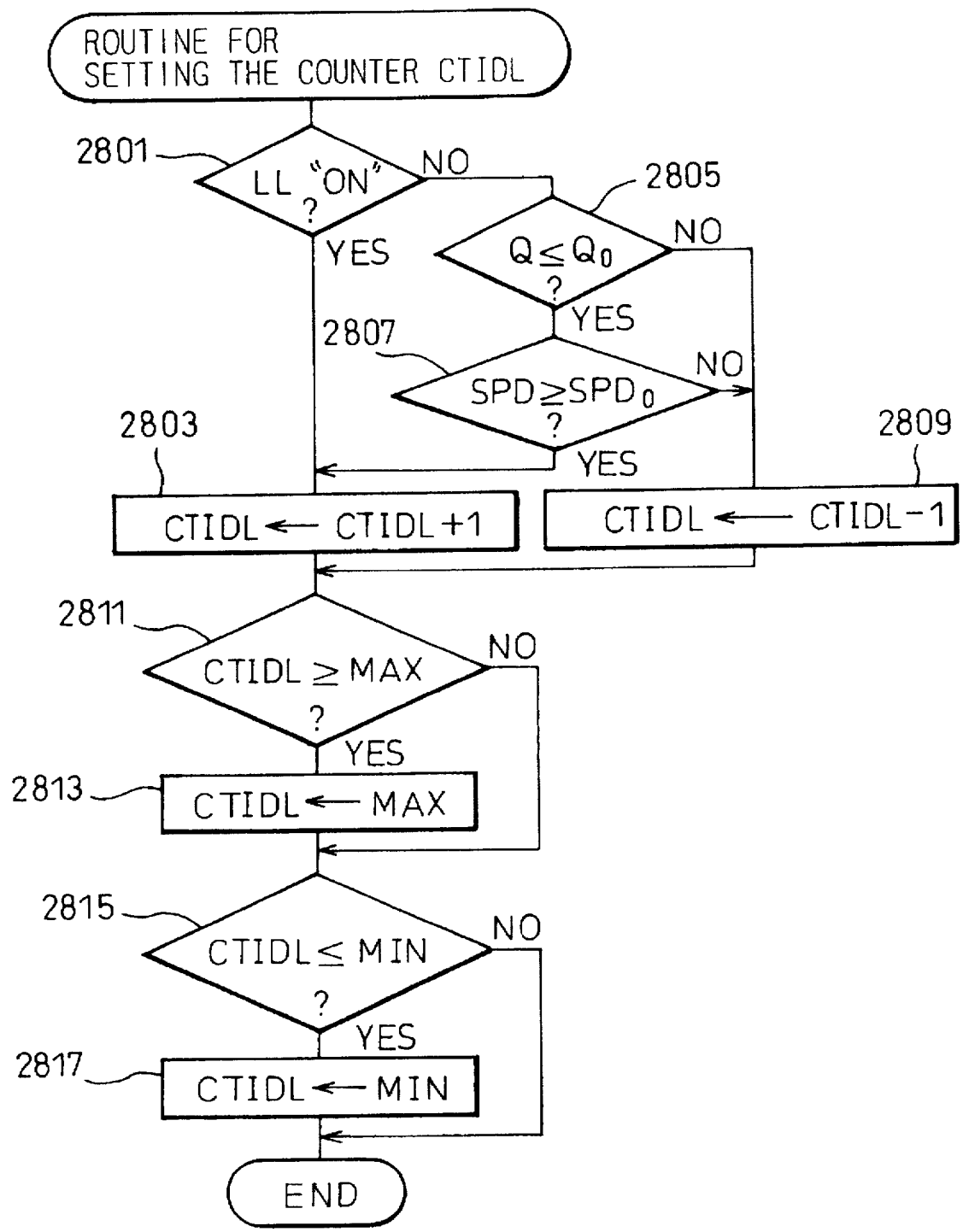
FIG. 28 shows a flowchart illustrating the operation for setting the value of the counter used in the flowchart in FIG. 27.

FIG. 28 shows a flowchart of setting operation of the counter CTIDL used in the flowchart in FIG. 26. This routine is executed by the control circuit 10 at regular intervals.

In FIG. 28, at step 2801, the routine determines whether the throttle valve 16 (FIG. 1) is fully closed based on the LL signal from the idle switch 17. When the throttle valve 16 is fully closed (i.e., when the LL signal is ON), it means that the decelerating operation (the fuel cut operation or the idle operation) is being carried out and that the temperature of the catalytic converter is decreasing. Therefore, in this case, the routine proceeds to step 2803 to increase the value of the counter CTIDL by 1. If the LL signal is OFF at step 2801, the routine executes steps 2805 and 2807 to determine whether the intake air flow rate Q is smaller than or equal to a predetermined value $Q_0$ (step 2805) and whether the traveling speed SPD of the automobile is higher than or equal to a predetermined value $SPD_0$ (step 2807). If both the conditions of steps 2805 and 2807 are satisfied, it means that the engine operating load is very small and the temperature of the catalytic converter is decreasing even though the throttle valve 16 is not fully closed. Therefore, in this case the routine also executes step 2803 to increase the value of the counter CTIDL by 1. If either of the conditions in steps 2805 and 2807 is not satisfied, since this means that the temperature of the catalytic converter is not decreasing, the routine proceeds to step 2809 to decrease the value of the counter CTIDL by 1.

After increasing or decreasing the value of the counter CTIDL at steps 2803 or 2809, the value of the counter CTIDL is restricted by the maximum value MAX and the minimum value MIN at steps 2811 through 2817, and the routine terminates this time. By executing the routine in FIG. 28, the value of the counter CTIDL represents the magnitude of the influence of the past decelerating operation on the temperature of the catalytic converter (i.e., temperature drop of the catalytic converter). Therefore, by using this counter, the value of the maximum flow range $Q_H$ is set in accordance with the temperature of the catalytic converter in the routine shown in FIG. 26.

Though the correction of the maximum flow rate $Q_H$ is performed using the counter CTIDL in this embodiment, the correction may be performed without using the counter CTDL. For example, since the temperature of the catalytic converter tends to become lower in the automobile with a manual transmission than in the automobile with an automatic transmission, the correction may be made only in accordance with whether the automobile is equipped with a manual transmission or an automatic transmission. In this case, $Q_H$ of the automobile with a manual transmission may be determined using FIG. 27, and $Q_H$ of the automobile with an automatic transmission may be determined using FIG. 19, regardless of the operating conditions of the engine in the past. This simplifies the determining operation of the deterioration of the catalytic converter.

Next, another embodiment of the present invention is explained.

Figure 29:
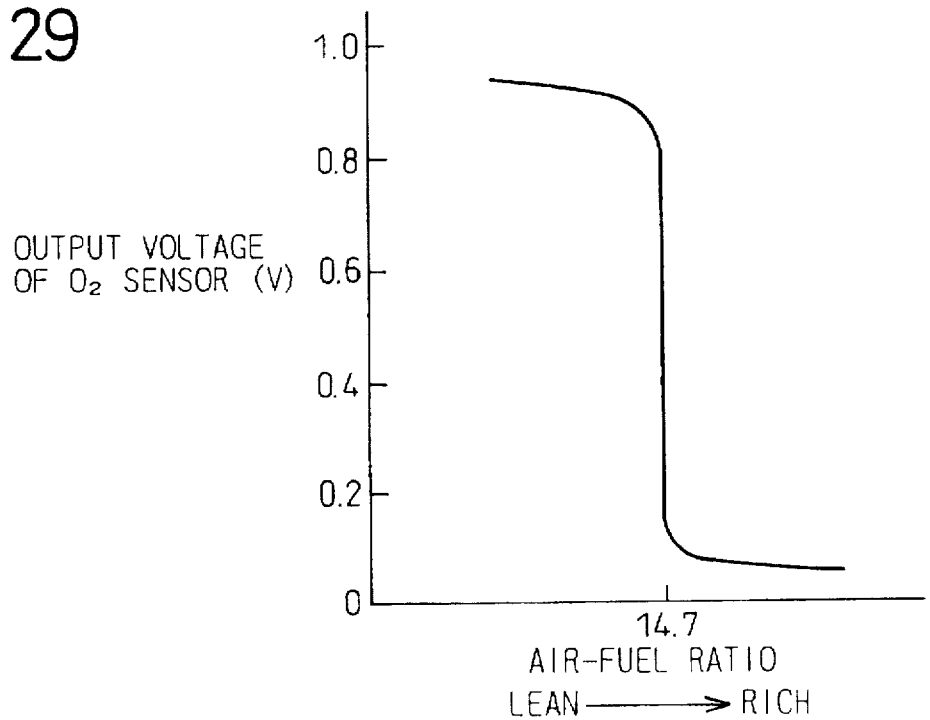
FIG. 29 is a graph schematically illustrating the output characteristics of an $O_2$ sensor.
Figure 30:
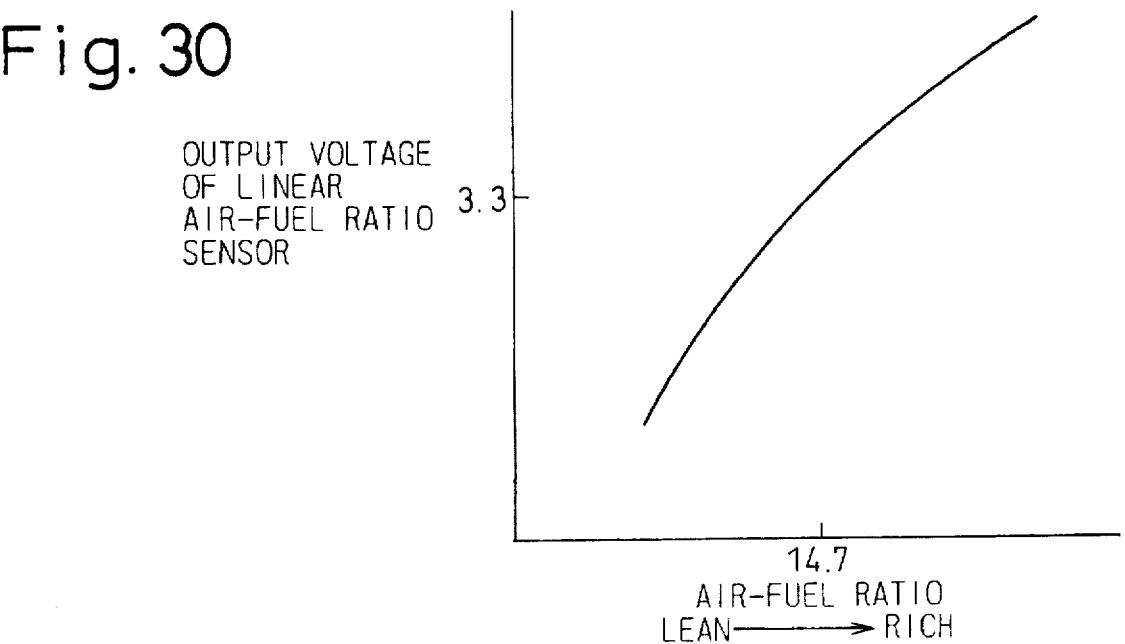
FIG. 30 is a graph schematically illustrating the output characteristics of a linear air-fuel ratio sensor.

In this embodiment, the construction of the device is the same as that in FIG. 1. However, a linear air-fuel ratio sensor instead of the $O_2$ sensor in the previous embodiments is used as the upstream air-fuel ratio sensor 13. The linear air-fuel ratio sensor generates an output voltage which changes almost in proportion to the change in the air-fuel ratio of the exhaust gas. FIGS. 29 and 30 schematically show the output characteristics of the $O_2$ sensor in the previous embodiment (FIG. 29) and the linear air-fuel ratio sensor used in the present embodiment (FIG. 30). As shown by FIG. 29, the output voltage of the $O_2$ sensor is determined by whether the air-fuel ratio of the exhaust gas is on a rich side or on a lean side compared to the stoichiometric air-fuel ratio. Namely, the output of the $O_2$ sensor is, for example, 0.9 V when the air-fuel ratio is rich compared to the stoichiometric air-fuel ratio regardless of the degree of richness, and 0.1 V when the air-fuel ratio is lean compared to the stoichiometric air-fuel ratio. When the air-fuel ratio changes from the lean side to the rich side compared to the stoichiometric air-fuel ratio, or vice versa, the output of the $O_2$ sensor changes suddenly between 0.9 V and 0.1 V as shown in FIG. 29. Therefore, it is difficult to determine the degree of richness or the degree of leanness of the exhaust gas based on the output of the $O_2$ sensor.

However, as shown by FIG. 30, the output of the linear air-fuel ratio sensor is nearly proportional to the air-fuel ratio of the exhaust gas. Therefore, not only whether the air-fuel ratio of the exhaust gas is rich or lean compared to the stoichiometric air-fuel ratio, but also the degree of richness or leanness (i.e., air-fuel ratio itself) can be determined from the output of the linear air-fuel ratio sensor.

In this embodiment, as stated above, the linear air-fuel ratio sensor is used as the upstream air-fuel ratio sensor 13, and the $O_2$ sensor is used as the downstream air-fuel ratio sensor 15, and an air-fuel ratio feedback control which is different from that in FIGS. 4 through 7 is performed using the outputs of the upstream linear air-fuel ratio sensor 13 and the downstream $O_2$ sensor 15. In this embodiment, the air-fuel ratio of the engine is feedback controlled by the control circuit 10 based on the output of the upstream linear air-fuel ratio sensor 13 in such a manner that the amount of oxygen held in the catalytic converter becomes about 50% of its maximum $O_2$ storage capacity. The output of the downstream $O_2$ sensor 15 is used for calibrating the output of the upstream linear air-fuel ratio sensor 13 during the air-fuel ratio feedback control.

As explained before, if the amount of oxygen absorbed by the catalytic converter is nearly 100% of its maximum $O_2$ storage capacity, the catalytic converter cannot absorb oxygen any more even if the air-fuel ratio of the exhaust gas flowing into the catalytic converter is lean. On the contrary, if the amount of oxygen held in the catalytic converter is nearly 0, the catalytic converter cannot release oxygen even if the air-fuel ratio of the exhaust gas flowing into the catalytic converter is rich. Therefore, it is preferable to maintain the amount of oxygen held in the catalytic converter at the value which allows both the absorption and releasing of oxygen in the exhaust gas to some extent in order to utilize the $O_2$ storage capability of the catalytic converter effectively. If the amount of oxygen held in the catalytic converter is maintained at about 50% of its maximum $O_2$ storage capability, the catalytic converter still has 50% of its maximum capacity for absorbing oxygen in the exhaust gas when a rich air-fuel ratio exhaust gas flows into the catalytic converter and, at the same time, the catalytic converter can release up to 50% of its maximum oxygen capacity when a lean air-fuel ratio exhaust gas flows into the catalytic converter. Therefore, when the amount of oxygen held in the catalytic converter is 50% of its maximum capacity, since the catalytic converter still retains both the absorbing capability and the releasing capability of oxygen to a practically sufficient levels in this condition, the $O_2$ storage capability of the catalytic converter can be utilized most efficiently.

The air-fuel ratio feedback control in the present embodiment is explained with reference to FIGS. 31 through 34.

Figure 31:
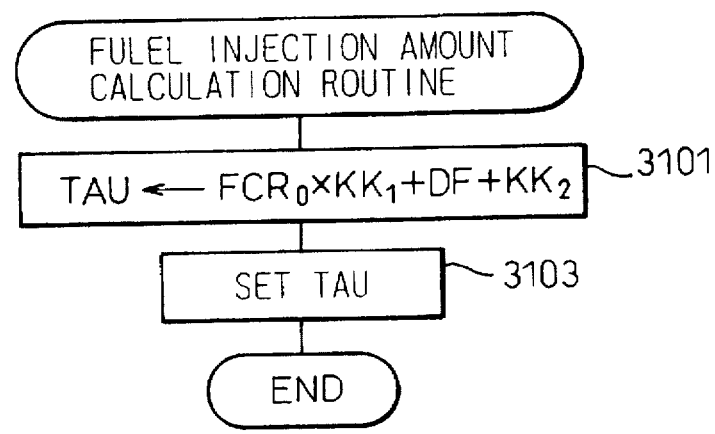
FIG. 31 is a flowchart illustrating the fuel injection amount calculation routine executed in an embodiment of the present invention.

FIG. 31 shows a flowchart illustrating the routine for calculating the fuel injection amount in this embodiment. This routine is executed by the control circuit 10 at a predetermined regular intervals. The fuel injection amount TAU in this embodiment is calculated by the following formula at step 3101 in FIG. 31.

$$TAU = FCR_0 \times KK_1 + DF + KK_2$$

$FCR_0$ in the above formula is a target value for the amount of the fuel actually supplied to the respective cylinders, and calculated by the routine in FIG. 32 as explained later. $KK_1$ and $KK_2$ are constants determined by the operating conditions (such as the cooling water temperature and the intake air temperature). DF is a fuel injection correction amount determined by the first air-fuel ratio feedback control based on the output of the upstream linear air-fuel ratio sensor 13.

In this embodiment, the correction amount DF is determined in such a manner that the amount of oxygen held in the catalytic converter is maintained at a constant value, and in this embodiment, determined by the PI (proportional integral) feedback control based on the deviation of the fuel amount actually burned in the cylinders and the fuel amount which is required for making the air-fuel ratio of the air-fuel mixture supplied to the cylinders stoichiometric air-fuel ratio.

Namely;

$$DF = K_{fp} \times FD + K_{fi} \times \Sigma FD$$

FD is the deviation of the amount of fuel actually burned in the cylinder from the amount of fuel required for stoichiometric combustion, and $\Sigma FD$ is the accumulated value (integrated value) of FD. Further, the deviation FD is calculated from the estimated amount of the intake air MC actually drawn into the cylinders and the target value FCR for the amount of the fuel actually supplied to the respective cylinders.

Figure 32:
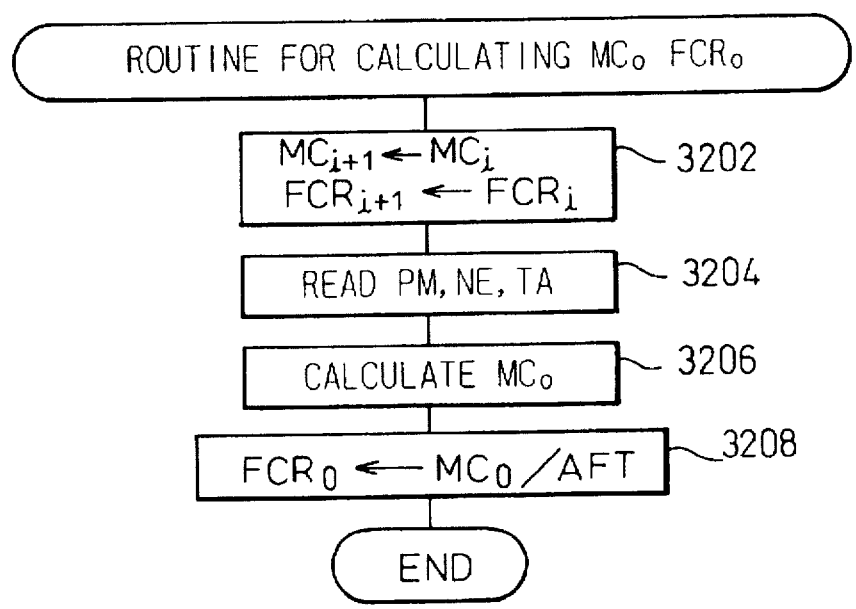
FIGS. 32 through 34 show flowcharts illustrating the air-fuel ratio feedback control of an embodiment of the present invention.

FIG. 32 shows a flowchart of the routine for calculating the values of the above-explained amounts MC and FCR. This routine is executed by the control circuit 10 at predetermined intervals.

When the routine start, at step 3202 in FIG. 32, the values of MC and FCR which are calculated before and stored in the RAM 105 are updated. In step 3202, the subscript "i" designates the value calculated by the routine executed "i" times before, and the subscript "i+1" designates the value calculated by the routine executed "i+1" times before. Therefore, the subscript "0" means that the value is calculated in this execution of the routine. In this embodiment, the values of MC and FCR calculated during the past n times executions of the routine are stored in the RAM 105 (i.e., the subscript "i" takes values 0 to n−1) and these values are all shifted at step 3202 to store $MC_0$ and $FCR_0$ calculated in this execution of the routine. At step 3204, the intake manifold pressure PM, engine speed Ne and the degree of opening TA of the throttle valve 16 are read from the respective sensors. The manifold pressure PM is an absolute pressure in the intake manifold $2a$ (FIG. 1) and detected by a pressure sensor (not shown in FIG. 1) disposed on the intake manifold $2a$. TA is detected by a throttle opening sensor (not shown in FIG. 1) disposed near the throttle valve 16.

Then, at step 3206, $MC_0$, which is the amount of air actually drawn into the cylinders, is calculated from the values of PM, Ne and TA. In this embodiment, the relationships between MC and PM, Ne, TA are previously determined by experiment, and stored in the ROM 104 of the control circuit 10.

Then the target amount of fuel $FCR_0$, which is the amount of fuel to make the air-fuel ratio of the combustion stoichiometric air-fuel ratio when the amount of the air is $MC_0$, is calculated by $FCR_0 = MC_0/AFT$. AFT is the value corresponding to stoichiometric air-fuel ratio (for example, AFT=14.7). After storing the calculated $MC_0$ and $FCR_0$ in the RAM 105, the routine terminates this time.

Figure 33:
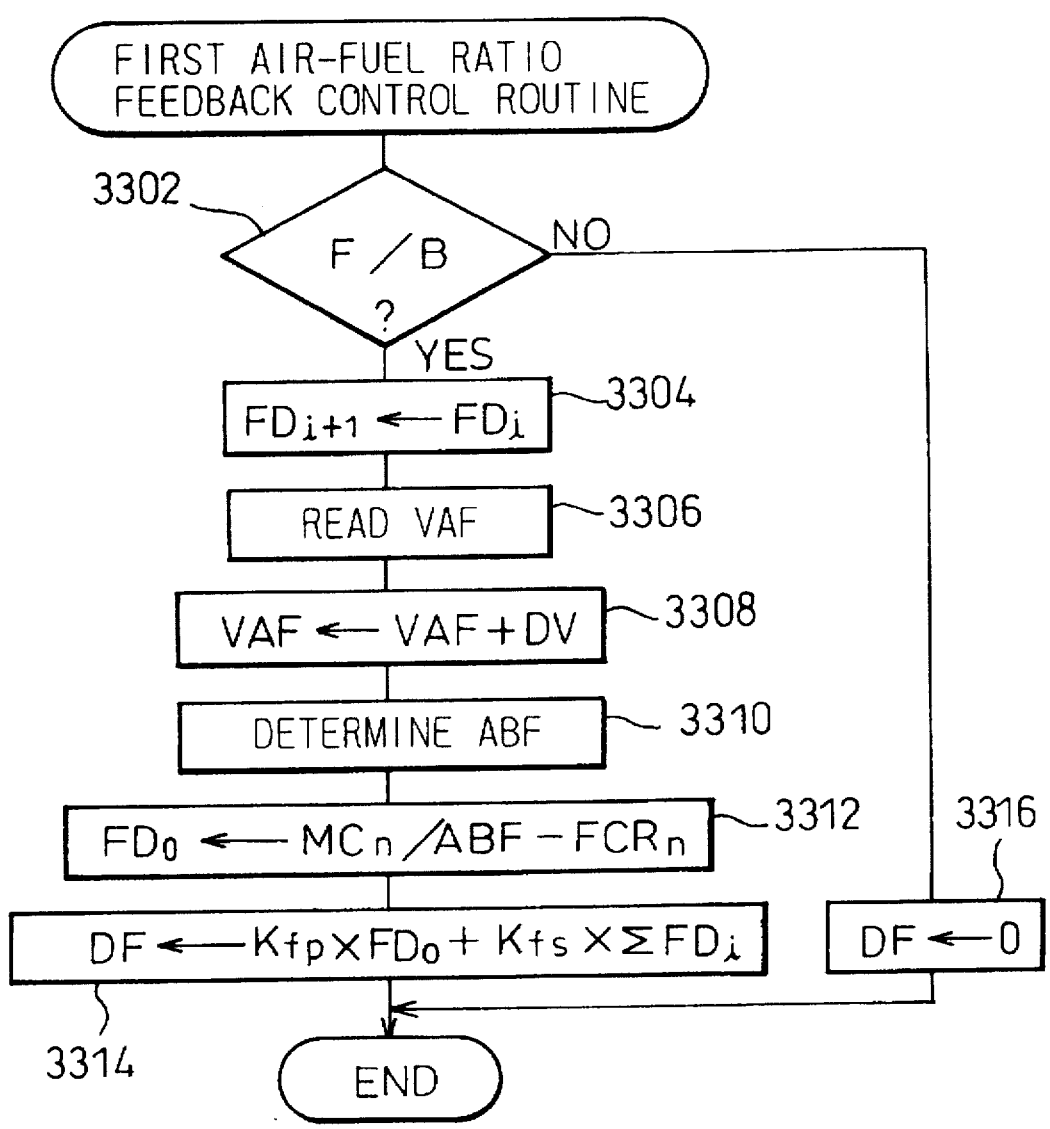

FIG. 33 shows a flowchart of the first air-fuel ratio feedback control routine based on the output VAF of the upstream linear air-fuel ratio sensor 13. This routine is executed by the control circuit 10 at predetermined intervals.

In this routine, the amount of the fuel actually burned in the cylinders is calculated from the intake air amount MC and the air-fuel ratio detected by the upstream linear air-fuel ratio sensor 13, and the fuel injection correction amount DF is calculated from the difference between the amount of the fuel actually burned in the cylinders and the amount of fuel supplied to the cylinders.

In FIG. 33, at step 3302, it is determined whether the conditions for the air-fuel ratio feedback control is satisfied. The conditions tested at step 3302 are the same as the conditions in step 401 in FIG. 4. If any of the conditions is not satisfied at step 3302, the routine terminates immediately after setting the value of DF to 0, i.e., air-fuel ratio feedback control is not carried out in this case. If all of the conditions are satisfied at step 3302, the routine executes step 3304 which renew the values of FD stored in the RAM 105. The meanings of the subscripts "i" and "i+1" are the same as those in FIG. 32 also in this flowchart. Since the integrated value of FD (i.e., $\Sigma FD_i$ in step 3314) is required for calculating the value of DF, the values of FD calculated during the past m times executions of the routine are stored in the RAM 105 in this embodiment (i.e., in this flowchart, the subscript "i" takes the values 0 to m).

At step 3306 the output VAF of the upstream linear air-fuel ratio sensor 13 is read, and at step 3306, the output VAF is corrected by the correction factor DV. The correction factor DV is calculated by the second air-fuel ratio feedback control (FIG. 34) based on the output VOS of the downstream $O_2$ sensor 15. At step 3308, actual air-fuel ratio ABF of the exhaust gas flowing into the catalytic converter 12 is obtained from the relationship in FIG. 30.

At step 3312, the difference $FD_0$ (the value of FD calculated in this execution of the routine) is obtained by the following formula.

$$FD_n = MC_n/ABF - FCR_n$$

$MC_n$ is the amount of air drawn into the cylinders when the routine in FIG. 32 was executed n times before, and the value $MC_n/ABF$ is the amount of fuel actually burned in the cylinders at that time. $FCR_n$ is the amount of fuel actually supplied to the cylinders when the routine in FIG. 32 was executed n times before. The values $MC_n$ and $FCR_n$ are stored in the RAM 105 by the routine in FIG. 32. Since the exhaust gas requires time to flow the distance between the cylinders and the upstream linear air-fuel ratio sensor 13, the values $MC_n$ and $FCR_n$, instead of $MC_0$ and $FCR_0$, are used at step 3312. Namely, in this embodiment, the time required for the exhaust gas to flow the distance between the cylinders and the sensor 13 is approximately equal to the time required for control circuit 10 to execute the routine in FIG. 32 n times.

Therefore, the value $FD_0$ calculated at step 3312 exactly represents the difference between the amount of fuel actually supplied to the cylinders and the target amount of fuel to be supplied to the cylinders.

Then, at step 3314, the correction amount DF (FIG. 31) is calculated as the sum of the proportional term $K_{fp} \times FD_0$ and the integral term $K_{fs} \times \Sigma FD_i$. $K_{fp}$ and $K_{fs}$ are constants which correspond to a proportional gain and a integral gain, respectively.

Figure 34:
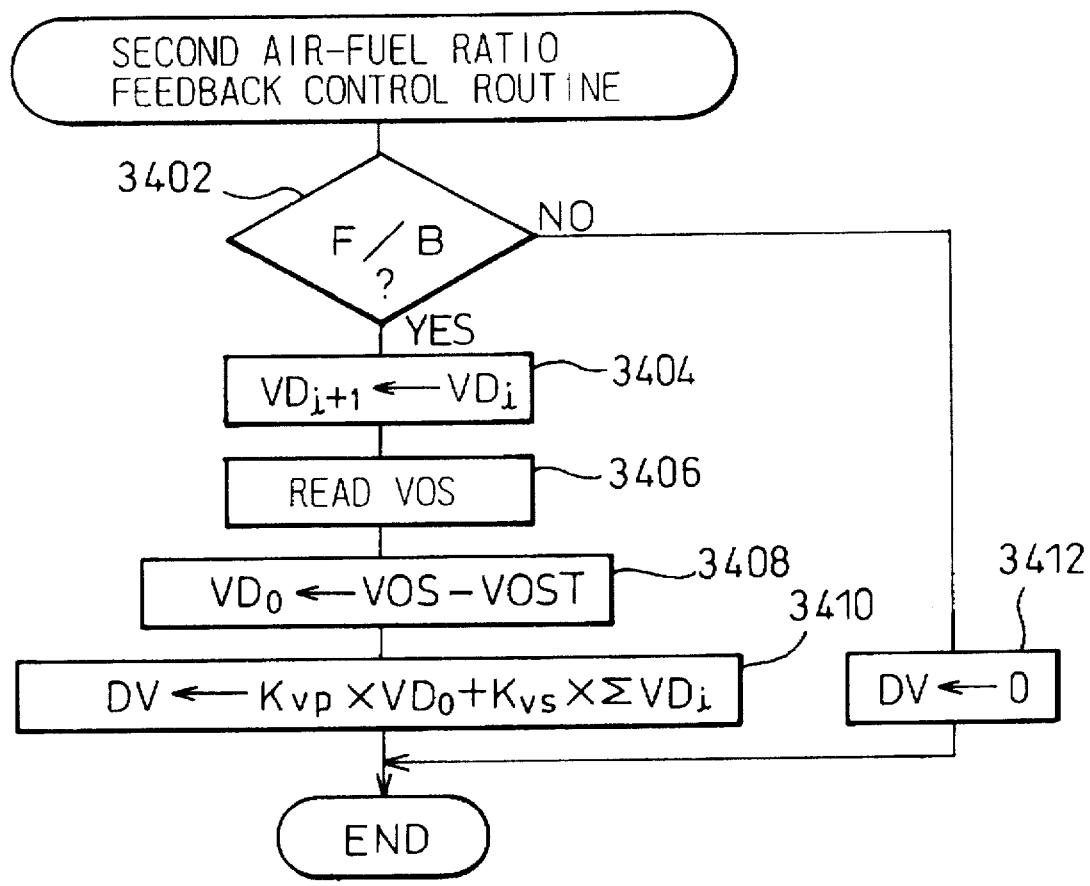

FIG. 34 shows a flowchart of the second air-fuel ratio feedback routine in which the correction factor DV for the output of the upstream linear air-fuel ratio sensor 13 is determined in accordance with the output of the downstream $O_2$ sensor 15.

In FIG. 34, at step 3402, it is determined whether the conditions for the second air-fuel ratio feedback routine is satisfied. The conditions in step 3402 is the same as those in the first air-fuel ratio feedback control (step 3302 in FIG. 33). If any of the conditions is not satisfied, the routine terminates immediately after setting the value of the correction factor DV to 0.

If all the conditions in step 3402 are satisfied, the routine executes steps 3404 through 3410 in which the values of VD stored in the RAM 105 are renewed (step 3404), the deviation $VD_0$ between the output VOS of the downstream $O_2$ sensor 15 and the output of the downstream $O_2$ sensor which corresponds to the stoichiometric air-fuel ratio VOST is calculated (step 306, 308), and the correction factor DV is calculated based on the value $VD_0$ as the sum of the proportional term $K_{vp} \times VD_0$ and the integral term $K_{vs} \times \Sigma VD_i$ (step 3410). $K_{vp}$ and $K_{vs}$ in step 3410 are constants which correspond to a proportional gain and a integral gain, respectively.

By the air-fuel ratio feedback control in FIGS. 32 through 34, the amount of oxygen stored in the catalytic converter is always maintained at a constant value (about 50% of the maximum $O_2$ storage capability, in this embodiment).

It will be understood from FIG. 33 that no restriction is imposed on the correction factor DF in the air-fuel ratio feedback control in order to maintain the amount of oxygen stored in the catalytic converter at a constant value, though the values of the correction factors (FAF and RSR) in the air-fuel ratio feedback control in FIGS. 4 through 7 are restricted by the maximum and the minimum value in order to prevent the degree of richness and the degree of leanness become too high (step 423 in FIG. 5 and steps 608, 609, 611 and 612 in FIG. 7). Therefore, in some cases, the fuel injection amount is largely increased to reduce the oxygen amount in the catalytic converter, or largely decreased to increase the oxygen amount in the catalytic converter. This causes the degree of richness or leanness of the exhaust gas relatively high in some cases. As explained before, when the degree of richness or leanness of the exhaust gas flowing into the catalytic converter becomes high, since the amount of oxygen released or absorbed by the catalytic converter per unit time becomes large, and, therefore, the fluctuation of the air-fuel ratio of the exhaust gas downstream of the catalytic converter becomes large even if the catalytic converter has not deteriorated. Further, when the flow rate of the exhaust gas becomes large, the amount of oxygen released or absorbed by the catalytic converter also becomes large. This also cause the fluctuation of the air-fuel ratio of the exhaust gas to become large. Therefore, when the degree of richness or leanness of the air-fuel ratio of the exhaust gas is high (i.e., the deviation of the air-fuel ratio of the exhaust gas from the stoichiometric air-fuel ratio is large), the maximum flow rate at which the determination is permitted must be lowered in order to determine the deterioration of the catalytic converter correctly.

Therefore, in this embodiment, the allowable flow range is determined in accordance with the deviation of the air-fuel ratio detected by the upstream linear air-fuel ratio sensor 13 in such a manner that the flow range of intake air in which the determining operation is allowed becomes narrower as the deviation becomes larger.

Figure 35:
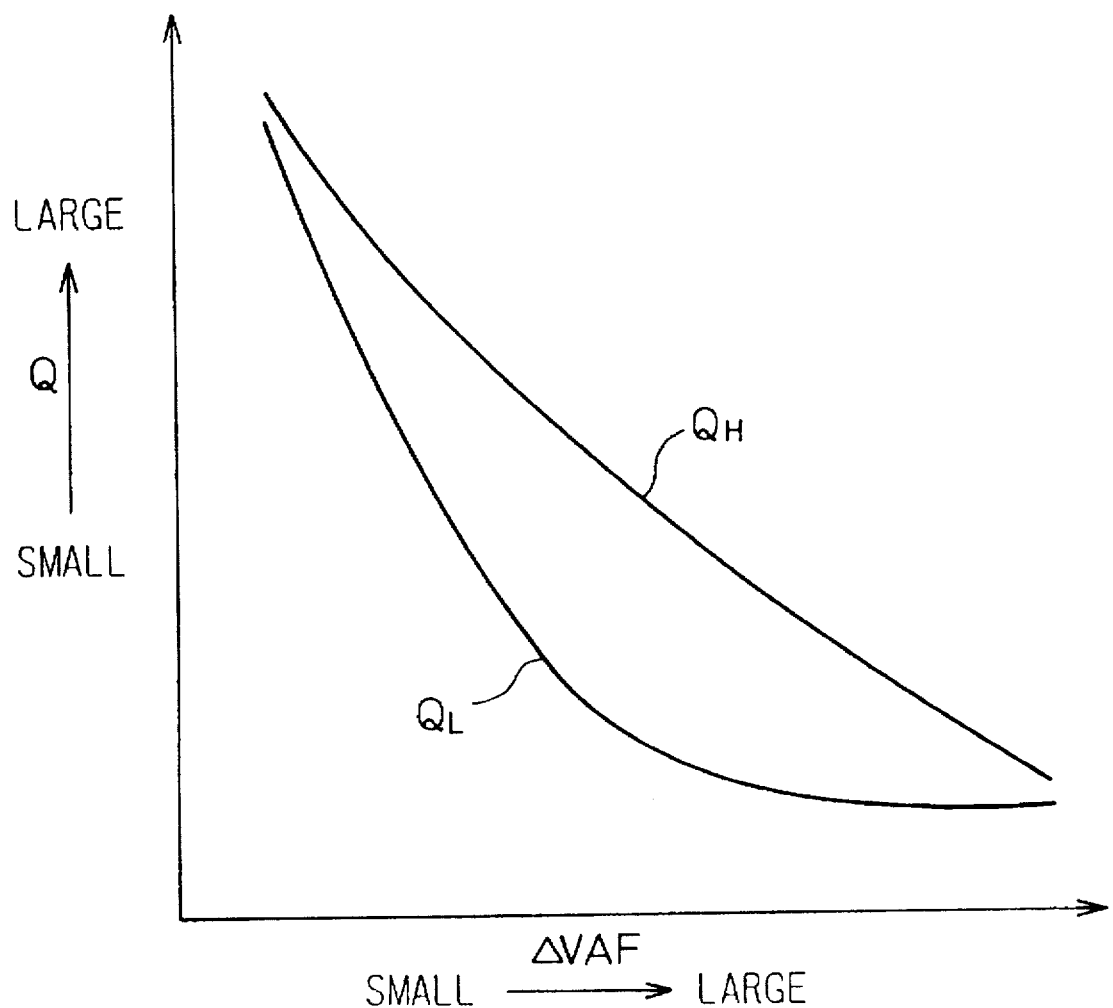
FIG. 35 is a graph illustrating the setting of the allowable flow range according to an embodiment of the present invention.

FIG. 35 shows the settings of the allowable flow range of this embodiment. In FIG. 35, the vertical axis represents the flow rate Q of intake air and the horizontal axis represents the deviation $\Delta$VAF of the air-fuel ratio detected by the upstream linear air-fuel ratio sensor 13 from the stoichiometric air-fuel ratio. The curve $Q_H$ in FIG. 35 designates the maximum flow rate which allows a normal catalytic converter to be determined as being normal, and $Q_L$ designates the minimum flow rate which allows a deteriorated catalytic converter to be determined as being deteriorated. As shown by FIG. 35, the maximum flow rate $Q_H$ and the minimum flow rate $Q_L$ both decrease as the deviation $\Delta$VAF becomes large, and the range between $Q_H$ and $Q_L$ becomes narrow when the deviation $\Delta$VAF is very small or very large. When the deviation $\Delta$VAF is very small (i.e., when the air-fuel ratio flows into the catalytic converter is very near to the stoichiometric air-fuel ratio), since the fluctuation of the air-fuel ratio of the downstream exhaust gas becomes smaller, the minimum allowable flow rate $Q_L$ must be set at a larger value to always determine the deteriorated catalytic converter as being deteriorated. Therefore, the range between $Q_H$ and $Q_L$ becomes small when $\Delta$VAF is very small. On the contrary, when the deviation $\Delta$VAF is very large, since the fluctuation of the air-fuel ratio of the downstream exhaust gas becomes larger, the maximum allowable flow rate $Q_H$ must be set at a smaller value to always determine the normal catalytic converter as being normal. This causes the range between $Q_H$ and $Q_L$ to become small. Therefore, when the $\Delta$VAF is very large or very small, the allowable flow range $Q_H$-$Q_L$ becomes narrow.

Figure 36:
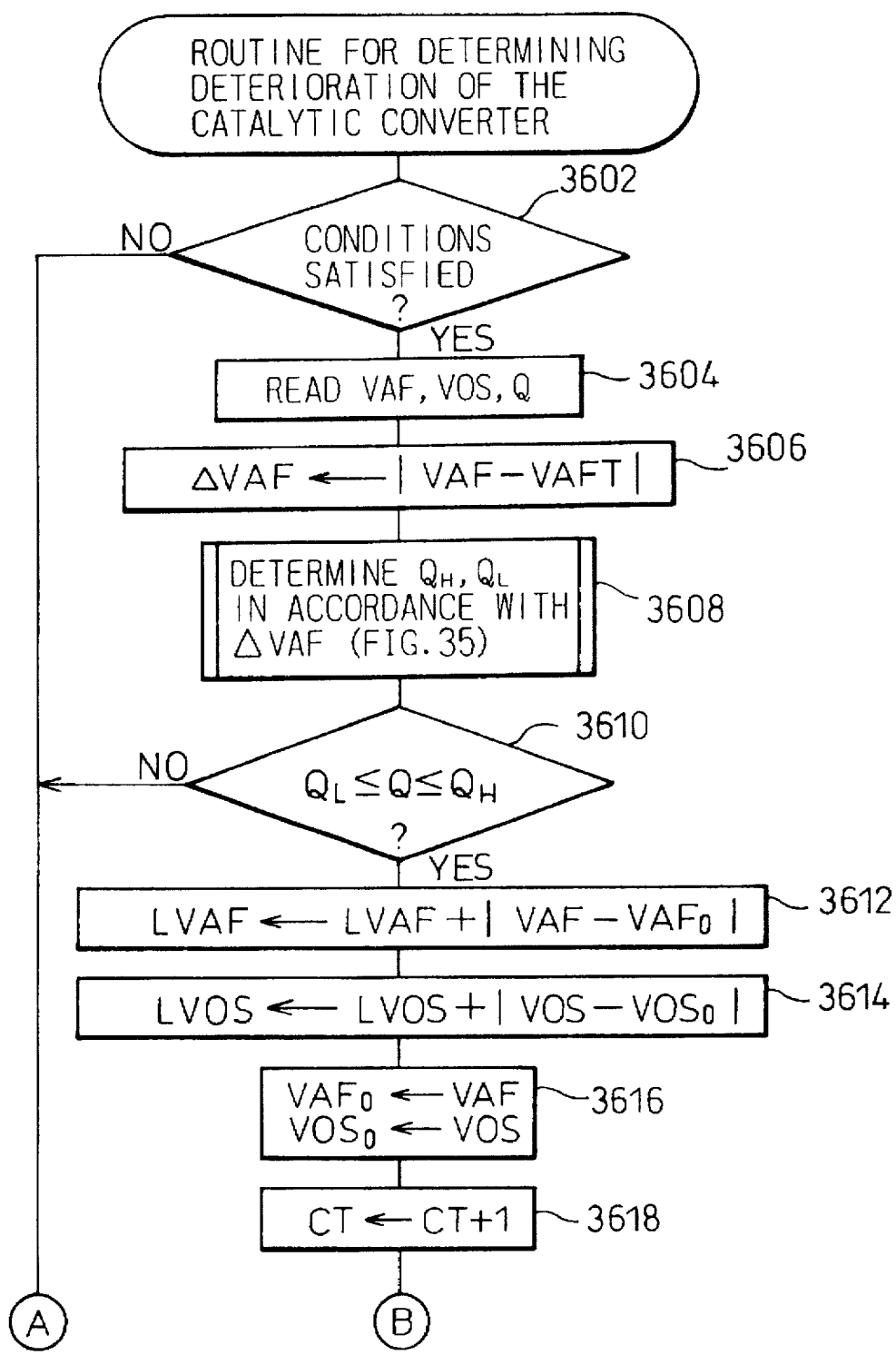
FIGS. 36 and 37 show a flowchart of determining operation of the deterioration of the catalytic converter according to an embodiment of the present invention.
Figure 37:
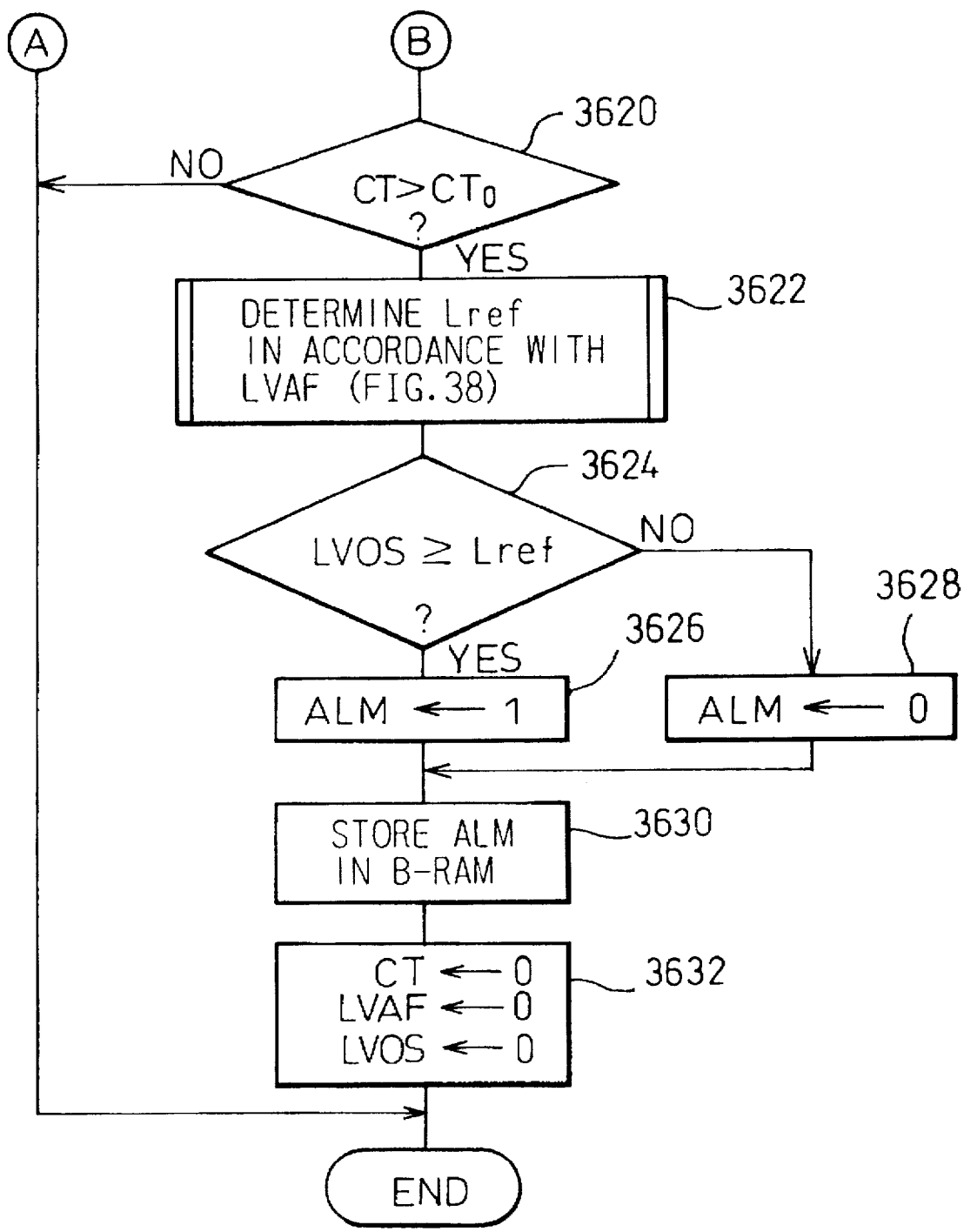

FIGS. 36 and 37 show the flowchart of the determining operation of the deterioration of the catalytic converter in this embodiment. This routine is performed by the catalytic converter at predetermined regular intervals.

In this routine, the control circuit 10 calculates the maximum and minimum allowable flow rate $Q_H$ and $Q_L$ in accordance with the deviation $\Delta$VAF, and calculates the length LVAF of the response curve of the output VAF of the upstream linear air-fuel ratio sensor 13 and the LVOS of the response curve of the output VOS of the downstream $O_2$ sensor in the manners similar to those of LVOM and LVOS in FIGS. 15 and 16. Then, the control, circuit 10 determines whether the catalytic converter has deteriorated based on the calculated values of LVAF and LVOS. The flowchart in FIGS. 36 and 37 is similar to the flowchart in FIGS. 15 and 16, and is explained in brief hereinafter.

In FIG. 36, when the conditions for performing the determination are satisfied (step 3602), VAF, VOS and the inlet flow rate Q are read at step 3604. The flow rate Q in this embodiment is calculated from the intake manifold pressure PM and the engine speed Ne. The routine then calculates the deviation $\Delta$VAF by $\Delta$VAF=|VAF−VAFT| (step 3606). VAFT is the output of the upstream linear air-fuel ratio sensor 13 which corresponds to the stoichiometric air-fuel ratio. The maximum allowable flow rate $Q_H$ and the minimum allowable flow rate $Q_L$ are determined based on this deviation $\Delta$VAF using the relationships in FIG. 35 (step 3608). At step 3610, it is determined if the flow rate Q calculated at step 3604 is within the range between $Q_H$ and $Q_L$. If the flow rate Q is larger than $Q_H$, or smaller than $Q_L$, the routine terminates immediately (FIG. 16). If $Q_L \leq Q \leq Q_H$ at step 3610, the routine calculates the length LVAF and LVOS of the response curves of the upstream linear air-fuel ratio sensor 13 and the downstream $O_2$ sensor 15 (steps 3612 through 3616) in the same manner as that of LVOM and LVOS in FIGS. 15 and 16 (in steps 3612 and 3614, the subscript "0" is used to designate the values obtained when the routine was last executed to avoid the confusion with the subscript "i" in FIGS. 32 through 34). When the values of LVAF and LVOS are accumulated for a predetermined time (steps 3618 and 3620), the determination (step 3624 through 3632) is performed. Namely, a threshold value $L_{ref}$ of LVOS for determining the deterioration is calculated in accordance with the value of LVAF at step 3622. In this embodiment, the deterioration of the catalytic converter is determined by comparing the value of LVOS with the threshold value $L_{ref}$ (step 3624) instead of comparing the ratio LVAF/LVOM with the threshold value K (step 1523 in FIG. 16).

Figure 38:
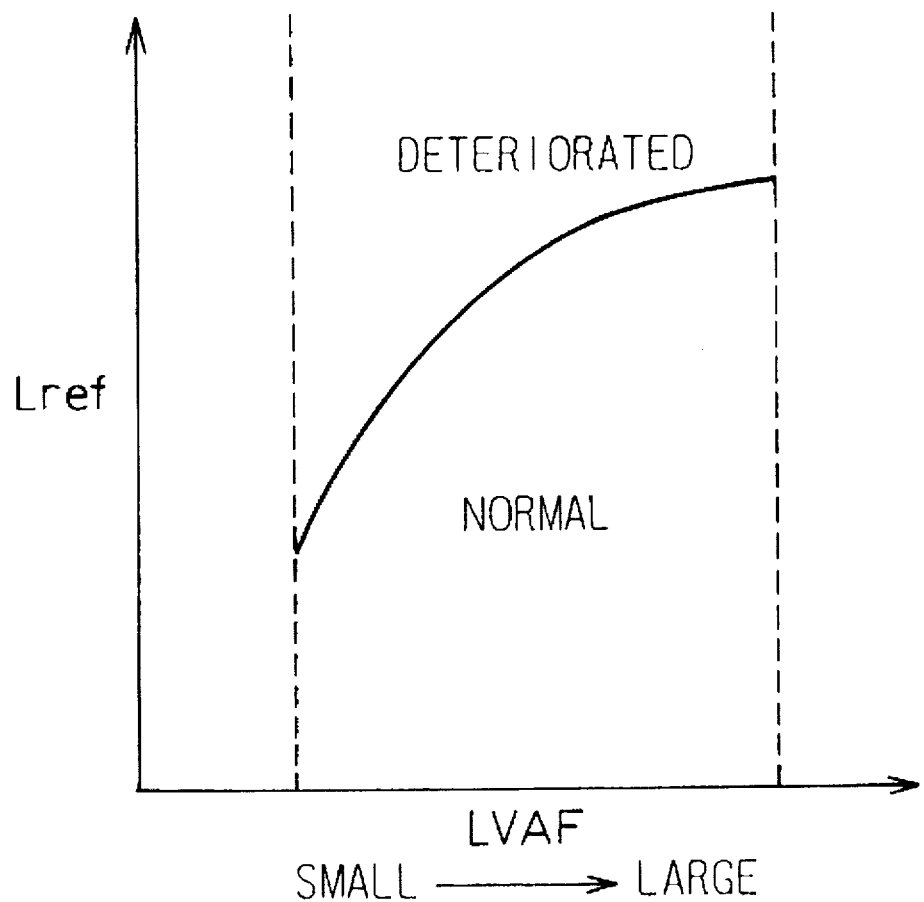
FIG. 38 is a graph showing a threshold value used in the flowchart in FIGS. 36 and 37 for determining deterioration of the catalytic converter.

The relationship between $L_{ref}$ and LVAF is shown in FIG. 38. In this embodiment, the threshold value $L_{ref}$ becomes larger as the value LVAF becomes larger as shown in FIG. 38. When LVOS<$L_{ref}$ at step 3624, it is determined that the catalytic converter has not deteriorated, and the alarm flag ALM is set at 0 (step 3628). If LVOS$\geq L_{ref}$ at step 3624, it is determined that the catalytic converter has deteriorated, and the alarm flag ALM is set at 1. As explained in FIG. 16, this activates the alarm to inform the driver of the automobile that the catalytic converter has deteriorated. Then, the value of the flag ALM is stored in the backup RAM 106, and the values CT, LVAF and LVOS are cleared (steps 3630 and 3632) before the routine terminates.

According to this embodiment, since the allowable flow range is changed in accordance with the deviation of the exhaust gas flowing into the catalytic converter from the stoichiometric air-fuel ratio, the error in the determination of the deterioration of the catalytic converter caused by the difference in the air-fuel ratio of the exhaust gas can be eliminated.

From the explanation of the various embodiments set forth above, it will be understood that, according to the present invention, the deterioration of the catalytic converter can be correctly determined by changing the allowable flow range of intake air, in which the determining operation is allowed, in accordance with the operating conditions of the engine.

We claim:

1. A device for determining deterioration of a catalytic converter having an $O_2$ storage capability and disposed in an exhaust gas passage of an engine comprising:

an upstream air-fuel ratio sensor disposed in an exhaust gas passage of an engine upstream of a catalytic converter for detecting an air-fuel ratio of an exhaust gas upstream of the catalytic converter;

a downstream air-fuel ratio sensor disposed in the exhaust gas passage of the engine downstream of the catalytic converter for detecting the air-fuel ratio of the exhaust gas downstream of the catalytic converter;

air-fuel ratio feedback control means for controlling the air-fuel ratio of the exhaust gas flowing into the catalytic converter based on, at least, the output signal of the upstream air-fuel ratio sensor in such a manner that the air-fuel ratio of the exhaust gas flowing into the catalytic converter becomes a predetermined target value;

determining means for determining whether the catalytic converter has deteriorated based on, at least, the output of the downstream air-fuel ratio sensor when the air-fuel ratio of the exhaust gas is controlled by the air-fuel ratio feedback control means;

air flow detecting means for detecting the flow rate of intake air drawn into the engine;

prohibiting means for prohibiting the determining means from performing the determining operation of deterioration of the catalytic converter when the flow rate of intake air drawn into the engine is larger than or smaller than a predetermined allowable flow range; and determining condition setting means for setting said allowable flow range in accordance with the operating conditions of the engine.

2. A device for determining deterioration of a catalytic converter according to claim 1, wherein said determining condition setting means comprises a temperature detecting means for detecting the temperature of the catalytic converter and flow range setting means for determining said allowable flow range in accordance with the temperature detected by said temperature detecting means.

3. A device for determining deterioration of a catalytic converter according to claim 1, wherein said determining condition setting means comprises engine speed detecting means for detecting the engine speed and flow range setting means for determining said allowable flow range in accordance with the engine speed detected by said engine speed detecting means.

4. A device for determining deterioration of a catalytic converter according to claim 3, wherein said determining condition setting means further comprises an operation parameter detecting means for detecting operating parameters of the engine which includes at least one of the temperature of the intake air and the temperature of the engine, and a correction means for correcting the allowable flow range determined by the flow range setting means in accordance with the operating parameters detected by said operation parameter detecting means, and wherein said prohibiting means prohibits the determining means from performing said determining operation based on the allowable flow range after it is corrected by said correction means.

5. A device for determining deterioration of a catalytic converter according to claim 3, wherein said engine is used for driving an automobile, and said determining condition setting means further comprises traveling speed detecting means for detecting the traveling speed of the automobile and a correction means for correcting the allowable flow range determined by the flow range setting means in accordance with the traveling speed detected by said traveling speed detecting means, and wherein said prohibiting means prohibits the determining means from performing said determining operation based on the allowable flow range after it is corrected by said correction means.

6. A device for determining deterioration of a catalytic converter according to claim 3, wherein said engine is used for driving an automobile, and said determining condition setting means further comprises decelerating condition detecting means for detecting a decelerating condition in which the automobile is decelerated or the engine is in an idle operation and correction means for correcting the allowable flow range determined by the flow range se%ting means in such a manner that the allowable range becomes narrower after the decelerating condition has terminated for a period determined in accordance with the length of the period in which the decelerating conditions continued, and wherein said prohibiting means prohibits the determining means from performing said determining operation based on the allowable flow range after it is corrected by said correction means.

7. A device for determining deterioration of a catalytic converter according to claim 6, wherein said correction means corrects the allowable flow range in different manners depending of whether the automobile is equipped with a manual transmission or an automatic transmission.

8. A device for determining deterioration of a catalytic converter according to claim 1, wherein said upstream air-fuel ratio sensor is a linear air-fuel ratio sensor for generating a signal changing continuously in accordance with the change in the exhaust gas air-fuel ratio, and wherein said determining condition setting means comprises flow range setting means for determining the allowable air flow range in accordance with the deviation of the air-fuel ratio of the exhaust gas flowing into the catalytic converter from the stoichiometric air-fuel ratio.

* * * * *